United States Patent
Shin et al.

(10) Patent No.: US 11,116,005 B2
(45) Date of Patent: Sep. 7, 2021

(54) METHOD AND DEVICE FOR TRANSMITTING NPRACH PREAMBLE IN NARROWBAND IOT SYSTEM SUPPORTING FRAME STRUCTURE TYPE 2

(71) Applicant: LG Electronics Inc., Seoul (KR)

(72) Inventors: Seokmin Shin, Seoul (KR); Changhwan Park, Seoul (KR); Joonkui Ahn, Seoul (KR); Daesung Hwang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/623,318

(22) PCT Filed: Jun. 25, 2018

(86) PCT No.: PCT/KR2018/007179
§ 371 (c)(1),
(2) Date: Dec. 16, 2019

(87) PCT Pub. No.: WO2019/004680
PCT Pub. Date: Jan. 3, 2019

(65) Prior Publication Data
US 2020/0178296 A1  Jun. 4, 2020

Related U.S. Application Data

(60) Provisional application No. 62/525,155, filed on Jun. 26, 2017, provisional application No. 62/565,059, filed on Sep. 28, 2017.

(51) Int. Cl.
*H04W 4/00* (2018.01)
*H04W 74/00* (2009.01)
(Continued)

(52) U.S. Cl.
CPC .......... *H04W 74/004* (2013.01); *H04L 5/001* (2013.01); *H04L 5/0012* (2013.01);
(Continued)

(58) Field of Classification Search
CPC .......... H04W 74/004; H04W 72/0453; H04W 74/0833; H04W 74/002; H04W 74/0866;
(Continued)

(56) References Cited

U.S. PATENT DOCUMENTS

| | | |
|---|---|---|
| 9,661,663 B1 | 5/2017 | Lin et al. |
| 2011/0096748 A1 | 4/2011 | Meyer et al. |

(Continued)

FOREIGN PATENT DOCUMENTS

WO   WO2017105005   6/2017

OTHER PUBLICATIONS

Ericsson, NPRACH false alarm reduction for NB-IoT, R1-1706891, 3GPP TSG-RAN WG1 #89, Hangzhou, China, May 15-19, 2017, 9 pages.

(Continued)

*Primary Examiner* — Mang Hang Yeung
(74) *Attorney, Agent, or Firm* — Fish & Richardson P.C.

(57) ABSTRACT

The present specification provides a method for transmitting a narrowband physical random access channel (NPRACH) preamble in a narrow band (NB)-Internet of things (IoT) system supporting a frame structure type 2.
More specifically, the method performed by a user equipment includes receiving, from a base station, control information related to an uplink-downlink configuration; and transmitting, to the base station, the NPRACH preamble based on parameters related to a NPRACH preamble transmission related to the received control information.

16 Claims, 53 Drawing Sheets

(51) Int. Cl.
    *H04L 5/00*       (2006.01)
    *H04L 27/26*     (2006.01)
    *H04W 72/04*    (2009.01)
    *H04W 74/08*    (2009.01)

(52) U.S. Cl.
    CPC ........ *H04L 5/0053* (2013.01); *H04L 27/2607* (2013.01); *H04W 72/0453* (2013.01); *H04W 74/0833* (2013.01)

(58) Field of Classification Search
    CPC ..... H04L 5/001; H04L 5/0012; H04L 5/0053; H04L 27/2607; H04L 27/2646; H04L 27/261; H04L 27/2602; H04L 1/1861; H04L 5/0092; H04L 5/1469; H04L 27/2605; H04L 5/0048; H04L 5/0026; H04L 27/26025
    USPC .......................................................... 370/329
    See application file for complete search history.

(56) References Cited

U.S. PATENT DOCUMENTS

2015/0181624 A1    6/2015   Hwang et al.
2018/0131547 A1*  5/2018   Wang .................... H04L 5/0094

OTHER PUBLICATIONS

LG Electronics, NPRACH reliability for NB-IoT, R1-1707576, 3GPP TSG RAN WG1 Meeting #89, Hangzhou, P.R. China, May 15-19, 2017, 5 pages.

Wang et al., "A Primer on 3GPP Narrowband Internet of Things", IEEE Communications Magazine (vol. 55, Issue: 3), Mar. 13, 2017, 9 pages.

EP extended European search report in European Appln. No. 18824560.9, dated Nov. 30, 2020, 10 pages.

LG Electronics, "Discussion on TDD for NB-IoT in uplink aspects," R1-1713110, 3GPP TSG RAN WG1 Meeting #90, Prague, Czech Republic, dated Aug. 21-25, 2017, 4 pages.

Samsung, "Dynamic reconfiguration of TDD UL-DL configuration," R1-122267, 3GPP TSG RAN WG1 Meeting #69, Prague, Czech Republic, dated May 21-25, 2012, 2 pages.

3$^{rd}$ Generation Partnership Project; Technical Specification Group Radio Access Network, "Evolved Universal Terrestrial Radio Access (E-UTRA); Physical Channels and Modulation (Release 13)," 3GPP TS 36,211, V13.6.0, dated Jun. 2017, 172 pages.

Ericsson, "NPRACH reliability forNB-IoT," R1-1705185, 3GPP TSG-RAN WG1 #88bis, Spokane, USA, Apr. 3-7, 2017, 4 pages.

Japanese Office Action in Japanese Appln. No. 2020-520414, dated Apr. 6, 2021, 17 pages (with English translation).

* cited by examiner

Figure 50

| Above proposed method | Option A (T2-T3 Interchange) | Option B (T1-T3 Interchange) | Option C (T1-T4 Interchange) |
|---|---|---|---|
| 11 11 11 11 | 11 11 11 11 | 11 11 11 11 | 11 11 11 11 |
| 10 10 10 10 | 10 10 10 10 | 10 10 10 10 | 10 10 10 10 |
| 9 9 9 9 | 9 9 9 9 | 9 9 9 9 | 9 9 9 9 |
| 8 8 8 8 | 8 8 8 8 | 8 8 8 8 | 8 8 8 8 |
| 7 7 7 7 | 7 7 7 7 | 7 7 7 7 | 7 7 7 7 |
| 6 6 6 6 | 6 6 6 6 | 6 6 6 6 | 6 6 6 6 |
| 5 5 5 5 | 5 5 5 5 | 5 5 5 5 | 5 5 5 5 |
| 4 4 4 4 | 4 4 4 4 | 4 4 4 4 | 4 4 4 4 |
| 3 3 3 3 | 3 3 3 3 | 3 3 3 3 | 3 3 3 3 |
| 2 2 2 2 | 2 2 2 2 | 2 2 2 2 | 2 2 2 2 |
| 1 1 1 1 | 1 1 1 1 | 1 1 1 1 | 1 1 1 1 |
| 0 0 0 0 | 0 0 0 0 | 0 0 0 0 | 0 0 0 0 |

METHOD AND DEVICE FOR TRANSMITTING NPRACH PREAMBLE IN NARROWBAND IOT SYSTEM SUPPORTING FRAME STRUCTURE TYPE 2

CROSS-REFERENCE TO RELATED APPLICATIONS

This application is the National Stage filing under 35 U.S.C. 371 of International Application No. PCT/KR2018/007179, filed on Jun. 25, 2018, which claims the benefit of U.S. Provisional Application No. 62/525,155 filed on Jun. 26, 2017 and U.S. Provisional Application No. 62/565,059 filed on Sep. 28, 2017, the contents of which are all hereby incorporated by reference herein in their entirety.

TECHNICAL FIELD

The present invention relates to a narrowband IoT system, and more particularly to a method for transmitting a NPRACH preamble in a narrowband IoT system supporting a frame structure type 2 and a device therefor.

BACKGROUND ART

The mobile communication system is developed to provide the voice service while guaranteeing the activity of a user. However, the mobile communication system is extended to the data service in addition to the voice service. Currently, since the shortage of resource is caused owing to the explosive traffic increase and users requires higher services, more developed mobile communication system is needed.

The requirement for the next mobile communication system should support the acceptance of explosive data traffic increase, the innovative increase of transmission rate per user, the acceptance of the number of connection devices which are dramatically increased, very low End-to-End Latency, high energy efficiency. To this end, various techniques have been researched such as the Dual Connectivity, the Massive Multiple Input Multiple Output (Massive MIMO), the In-band Full Duplex, the Non-Orthogonal Multiple Access (NOMA), the Super wideband support, the Device Networking, and so on.

DISCLOSURE

Technical Problem

An object of the present specification is to provide a NPRACH preamble configuration method for transmitting a NPRACH preamble using UL/DL configuration of legacy LTE when TDD is supported in a NB-IoT system.

Technical problems to be solved by the present invention are not limited by the above-mentioned technical problems, and other technical problems which are not mentioned above can be clearly understood from the following description by those skilled in the art to which the present invention pertains.

Technical Solution

The present specification provides a method for transmitting, by a user equipment, a narrowband physical random access channel (NPRACH) preamble in a narrow band (NB)-Internet of things (IoT) system supporting a frame structure type 2, the method comprising receiving, from a base station, control information related to an uplink-downlink configuration; and transmitting, to the base station, the NPRACH preamble based on parameters related to a NPRACH preamble transmission related to the received control information, wherein the NPRACH preamble includes one or more symbol groups, wherein one symbol group includes one cyclic prefix (CP) and at least one symbol, wherein the parameters related to the NPRACH preamble transmission include a first parameter representing a number of symbols included in the one symbol group and a second parameter representing a length of the CP included in the one symbol group, wherein the first parameter and the second parameter are configured to be different from a third parameter and a fourth parameter respectively corresponding to the first parameter and the second parameter, and wherein the third parameter and the fourth parameter are parameters related to a NPRACH preamble transmission supported in a frame structure type 1.

In the present specification, parameters related to the NPRACH preamble are differently configured according to uplink-downlink configuration information supported by the base station.

In the present specification, the first parameter and the second parameter have a value less than the third parameter and the fourth parameter, respectively.

In the present specification, a value of the first parameter is a natural number less than 5.

In the present specification, the symbol groups are transmitted through a first frequency hopping and a second frequency hopping.

In the present specification, a value of the second frequency hopping is six times a value of the first frequency hopping.

In the present specification, the parameters related to the NPRACH preamble transmission further include a fifth parameter representing a number of consecutive symbol groups included in one preamble and a sixth parameter representing a total number of symbol groups included in the one preamble.

In the present specification, a value of the fifth parameter is 2, and a value of the sixth parameter is 4.

The present specification provides a user equipment transmitting a narrowband physical random access channel (NPRACH) preamble in a narrow band (NB)-Internet of things (IoT) system supporting a frame structure type 2, the user equipment comprising a radio frequency (RF) module configured to transmit and receive a radio signal; and a processor configured to control the RF module, wherein the processor is configured to receive, from a base station, control information related to an uplink-downlink configuration; and transmit, to the base station, the NPRACH preamble based on parameters related to a NPRACH preamble transmission related to the received control information, wherein the NPRACH preamble includes one or more symbol groups, wherein one symbol group includes one cyclic prefix (CP) and at least one symbol, wherein the parameters related to the NPRACH preamble transmission include a first parameter representing a number of symbols included in the one symbol group and a second parameter representing a length of the CP included in the one symbol group, wherein the first parameter and the second parameter are configured to be different from a third parameter and a fourth parameter respectively corresponding to the first parameter and the second parameter, and wherein the third parameter and the fourth parameter are parameters related to a NPRACH preamble transmission supported in a frame structure type 1.

Advantageous Effects

The present specification has an effect capable of using UL/DL configuration of legacy LTE by defining a new NPRACH preamble format when TDD is supported in a NB-IoT system.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 50 illustrates an example of a method of interchanging the transmission order between symbol groups of a NPRACH preamble proposed by the present specification.

MODE FOR INVENTION

Figure 1:
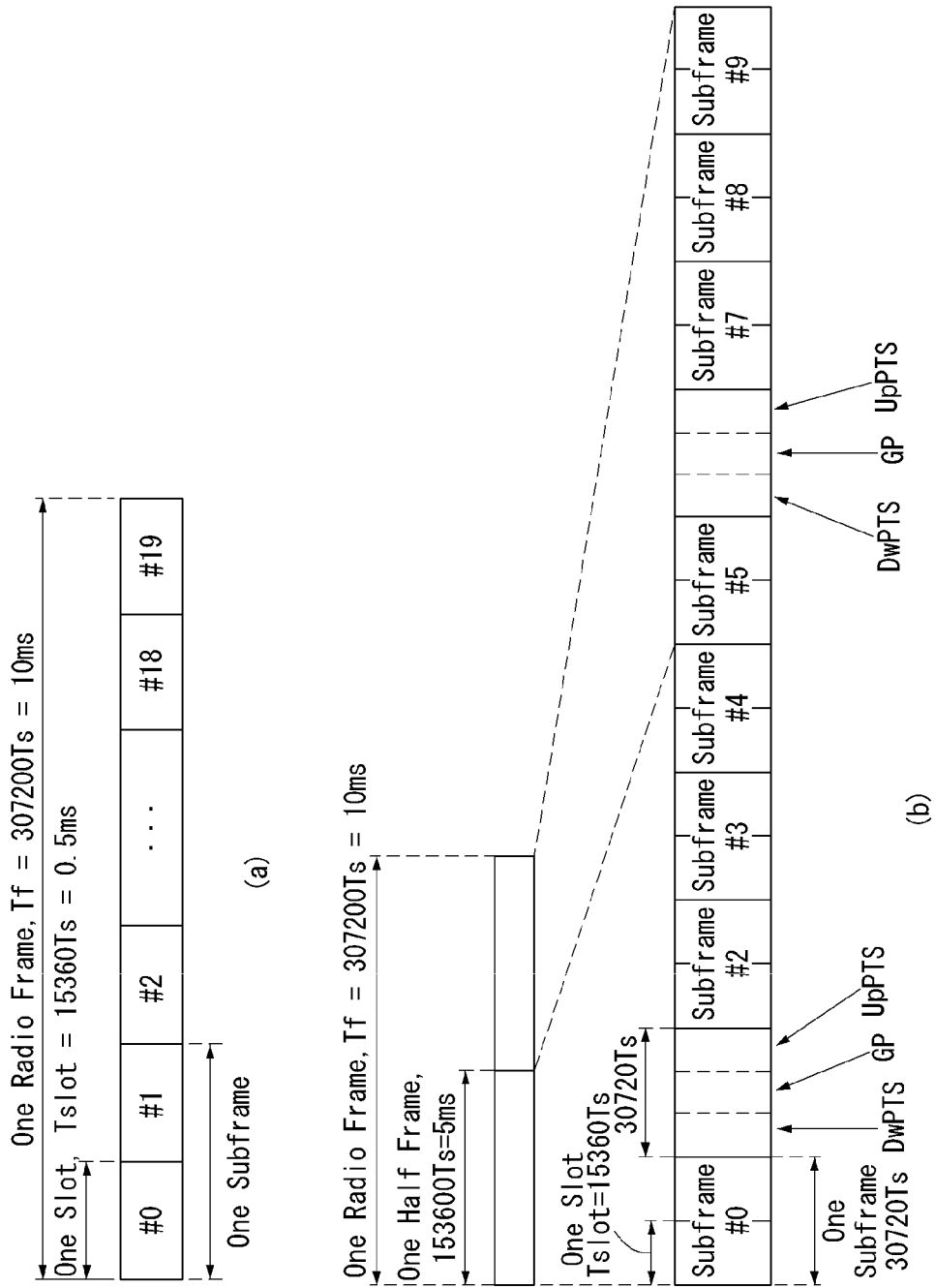
FIG. 1 illustrates a structure of a radio frame in a wireless communication system to which the present invention is applicable.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Overview of Wireless Communication System to which the Present Invention is Applicable FIG. 1 illustrates a structure of a radio frame in a wireless communication system to which the present invention is applicable.

3GPP LTE/LTE-A supports radio frame structure type 1 applicable to frequency division duplex (FDD) and radio frame structure type 2 applicable to time division duplex (TDD).

In FIG. 1, the size of a radio frame in a time domain is represented as a multiple of a time unit of $T\_s=1/(15000*2048)$. Downlink and uplink transmissions consist of a radio frame having a duration of $T\_f=307200*T\_s=10$ ms.

FIG. 1(*a*) illustrates the radio frame structure type 1. The radio frame structure type 1 is applicable to both full duplex FDD and half duplex FDD.

A radio frame consists of 10 subframes. One radio frame consists of 20 slots of $T\_slot=15360*T\_s=0.5$ ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 1(b) illustrates frame structure type 2.

The radio frame type 2 consists of two half-frames of length 153600*T_s=5 ms each. Each half-frame consists of five subframes of length 30720*T_s=1 ms.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe in a radio frame, 'D' represents a subframe for a downlink transmission, 'U' represent a subframe for an uplink transmission, 'S' represents a special subframe that includes three types, a Downlink Pilot Time Slot (DwPTS), a Guard Period (GP) and an Uplink Pilot Time Slot (UpPTS).

The DwPTS is used for an initial cell search, synchronization or channel estimation in a terminal. The UpPTS is used for the channel estimation in a BS and synchronizing an uplink transmission synchronization of a terminal. The GP is a period for removing interference occurred in uplink owing to multi-path latency of a downlink signal between uplink and downlink.

Each subframe i includes slot 2i and slot 2i+1 of T_slot=15360*T_s=0.5 ms length.

There are seven types of uplink-downlink configurations and the position and/or number of downlink subframe, special subframe and uplink subframe are different for each configuration.

The time switched from downlink to uplink or the time switched from uplink to downlink is referred to as a switching point. The periodicity of the switching point means a period in which the phenomenon of unlink subframe and downlink subframe being switched is repeated in the same pattern, and both 5 ms and 10 ms are supported. In the case of a period of 5 ms downlink-uplink switching point, the special subframe(s) is existed in every half-frame, and in the case of a period of 10 ms downlink-uplink switching point, the special subframe(s) is existed in the first half-frame only.

For all configurations, 0th, fifth subframes and the DwPTS are durations only for a downlink transmission. The subframe directly following the UpPTS and subframe are durations for an uplink transmission always.

Such an uplink-downlink configuration is the system information, and may be known to a BS and a terminal. A BS may notify the change of the uplink-downlink allocation state of a radio frame by transmitting an index of configuration information only whenever the uplink-downlink configuration information is changed. In addition, the configuration information is a sort of downlink control information and may be transmitted through a Physical Downlink Control Channel (PDCCH) like other scheduling information, or it is the broadcast information and may be commonly transmitted to all terminals in a cell through a broadcast channel.

Table 2 represents a configuration (lengths of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

The radio frame structure according to an example of FIG. 1 is just an example, but the number of subcarriers included in a radio frame, the number of slots included in a subframe or the number of OFDM symbols included in a slot may be changed in various manners.

Figure 2:
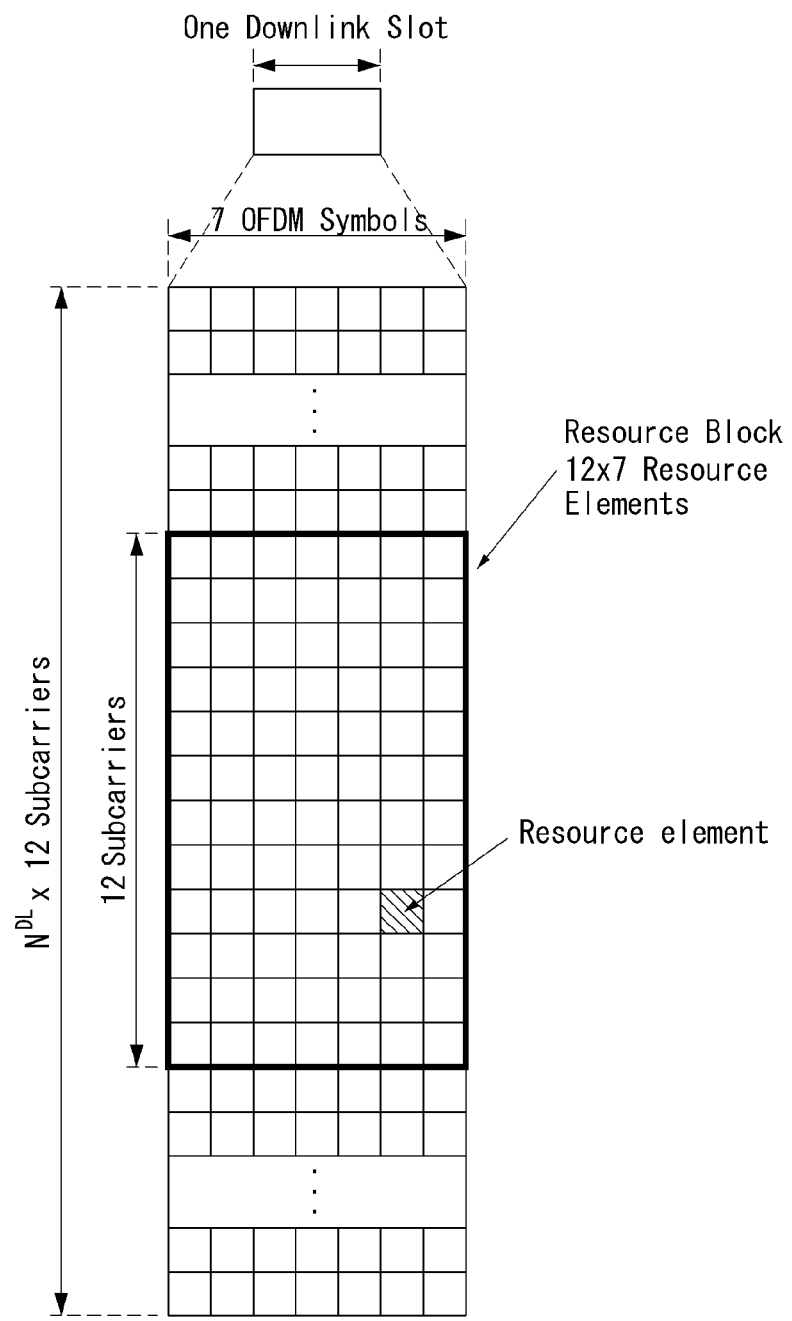
FIG. 2 illustrates a resource grid for one downlink slot in a wireless communication system to which the present invention is applicable.

FIG. 2 illustrates a resource grid for one downlink slot in a wireless communication system to which the present invention is applicable.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
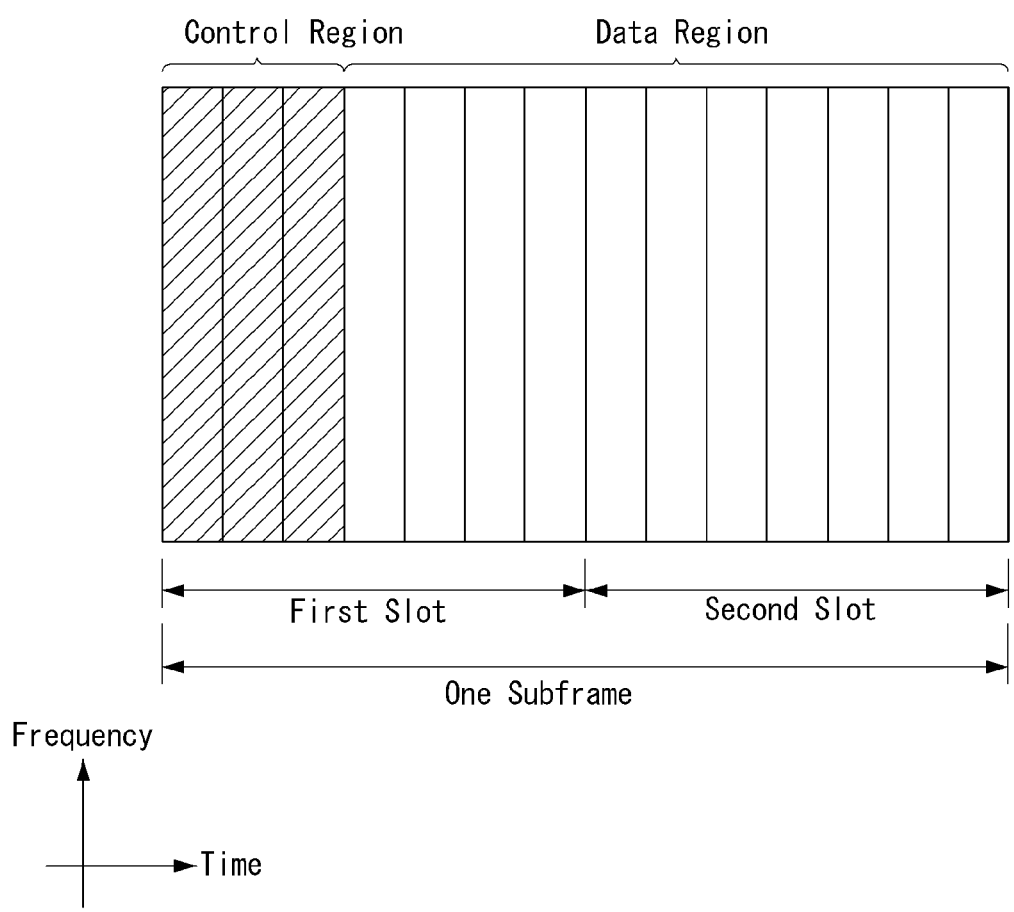
FIG. 3 illustrates a structure of a downlink subframe in a wireless communication system to which the present invention is applicable.

FIG. 3 illustrates a structure of a downlink subframe in a wireless communication system to which the present invention is applicable.

Referring to FIG. 3, up to first three OFDM symbols in the first slot of the subframe are a control region to which control channels are allocated, and residual OFDM symbols are a data region to which a physical downlink shared channel (PDSCH) is allocated. Examples of downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (i.e., the size of the control region) of OFDM symbols used for transmission of the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
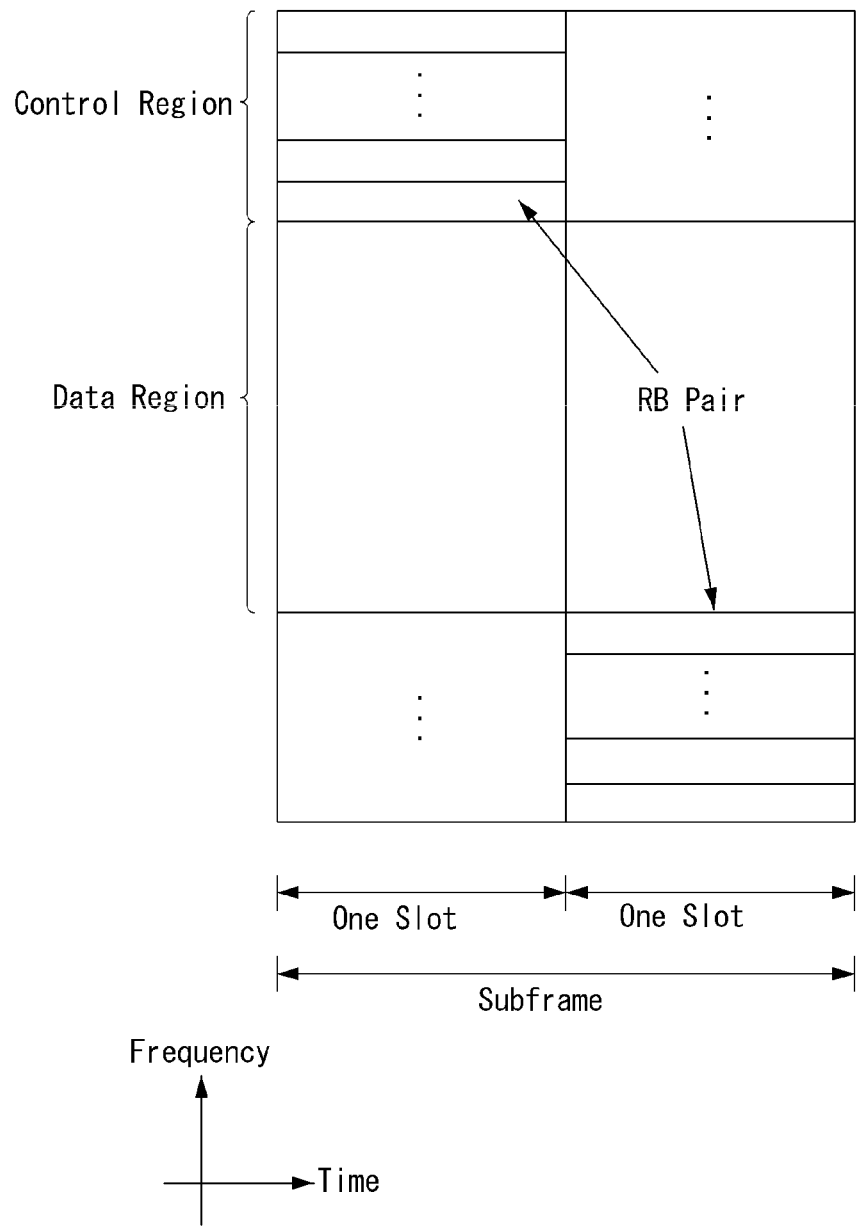
FIG. 4 illustrates a structure of an uplink subframe in a wireless communication system to which the present invention is applicable.

FIG. 4 illustrates a structure of an uplink subframe in a wireless communication system to which the present invention is applicable.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (or carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (i.e., LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell). The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (or cell index) in ServCellIndex becomes the P cell.

The P cell means a cell that operates on a primary frequency (or primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnection-Reconfigutaion) message of an upper layer including mobile control information (mobilityControlInfo).

The S cell means a cell that operates on a secondary frequency (or secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 5:
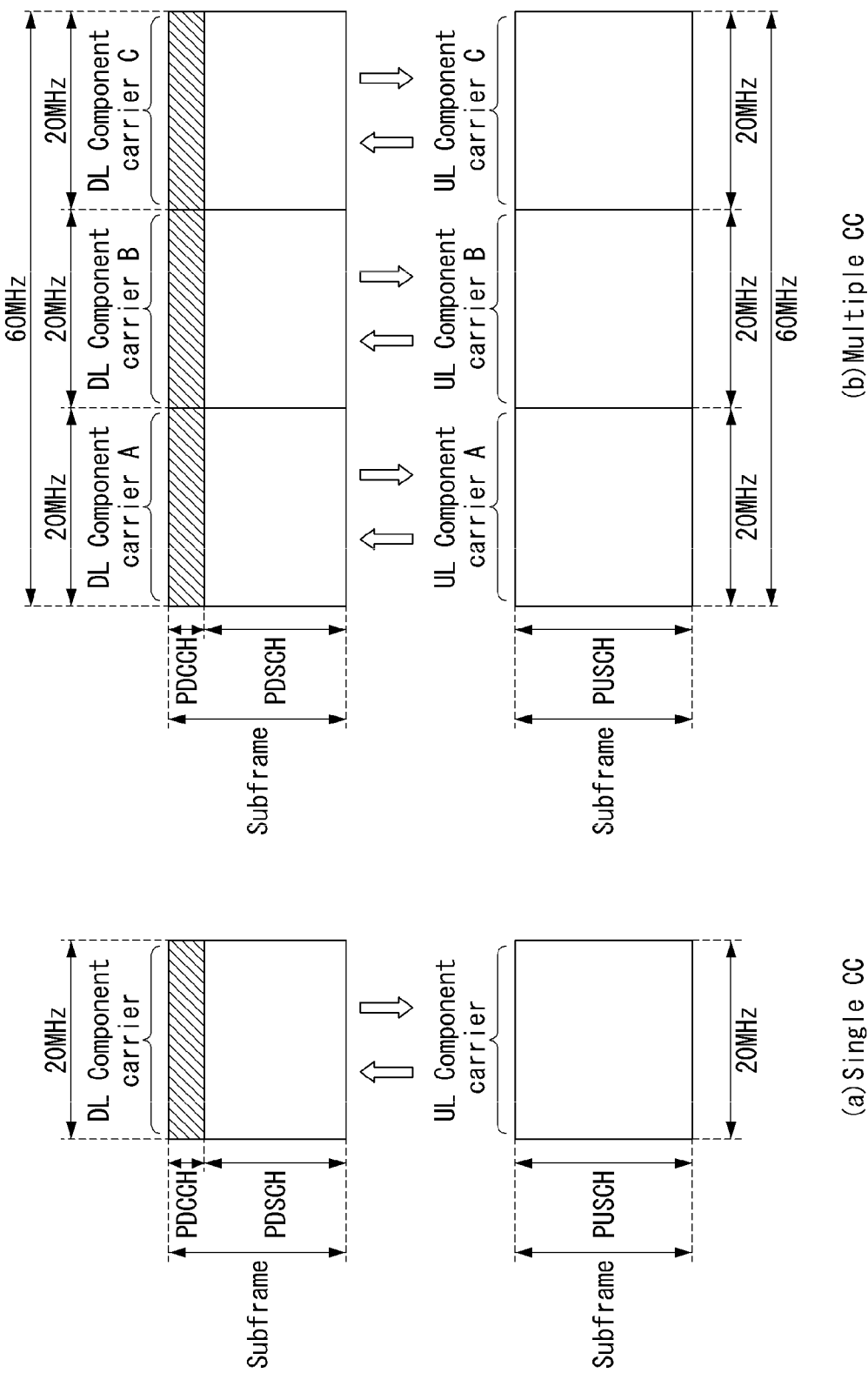
FIG. 5 illustrates an example of a component carrier and carrier aggregation in a wireless communication system to which the present invention is applicable.

FIG. 5 illustrates an example of a component carrier and carrier aggregation in the wireless communication system to which the present invention is applicable.

FIG. 5($a$) illustrates a single carrier structure used in an LTE system. The component carrier includes the DL CC and the UL CC. One component carrier may have a frequency range of 20 MHz.

FIG. 5($b$) illustrates a carrier aggregation structure used in the LTE system. In the case of FIG. 5($b$), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (or DL CC) of the downlink resource and a carrier frequency (or UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (or UL CC) in which data for the HARQ is transmitted and the UL CC (or DL CC) in which the HARQ ACK/NACK signal is transmitted.

Figure 6:
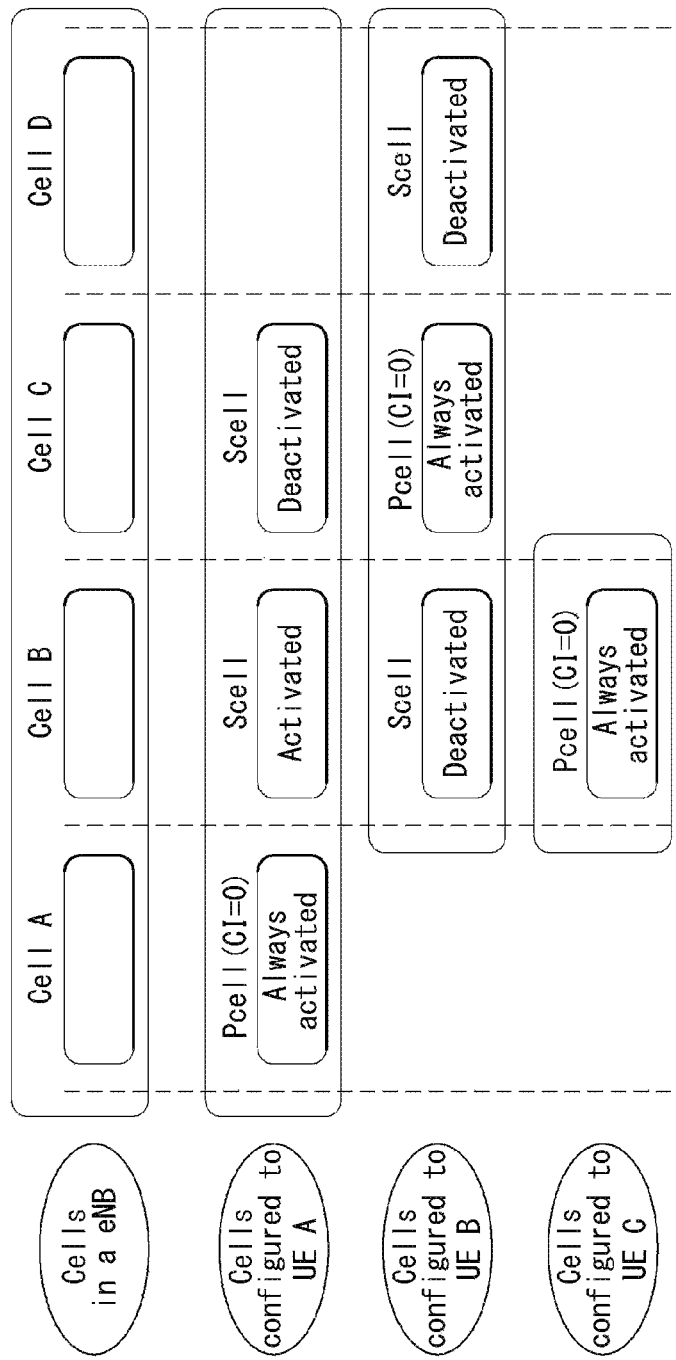
FIG. 6 illustrates a cell classification in a system supporting carrier aggregation.

FIG. 6 illustrates a cell classification in a system that supports the carrier aggregation.

Referring to FIG. 6, a configured cell is a cell that should be carrier-merged based on a measurement report among cells of a base station as illustrated in FIG. 5, may be configured for each terminal. The configured cell may reserve a resource for an ACK/NACK transmission for a PDSCH transmission beforehand. An activated cell is a cell that is configured to transmit PDSCH/PUSCH actually among the configured cells, and performs a channel state information (CSI) report for the PDSCH/PUSCH transmission and a sounding reference signal (SRS) transmission. A de-activated cell is a cell that does not perform the PDSCH/PUSCH transmission by a command of the base station or a timer operation, may also stop the CSI report and the SRS transmission.

A narrowband physical random access channel is described below.

A physical layer random access preamble is based on single-subcarrier frequency hopping symbol groups.

Figure 7:
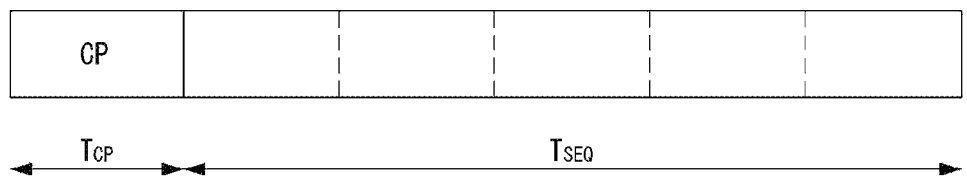
FIG. 7 illustrates an example of a symbol group of a NPRACH preamble.

The symbol group is illustrated in FIG. 7 and includes a cyclic prefix (CP) of length $T_{CP}$ and a sequence of 5 identical symbols with total length $T_{SEQ}$.

Parameters of the physical layer random access preamble are listed in Table 3 below.

That is, FIG. 7 illustrates an example of a symbol group of a NPRACH preamble, and Table 3 represents an example of random access preamble parameters.

TABLE 3

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The NPRACH preamble including 4 symbol groups transmitted without gaps is transmitted $N_{rep}^{NPRACH}$ times.

The transmission of a random access preamble, if triggered by the MAC layer, is restricted to certain time and frequency resources.

A NPRACH configuration provided by higher layers includes the following parameters.

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), the number of subcarriers allocated to NPRACH $N_{sc}^{NPRACH}$ (nprach-NumSubcarriers), the number of starting subcarriers allocated to contention based NPRACH random access $N_{sc\_cont}^{NPRACH}$ (nprach-NumCBRA-StartSubcarriers), the number of NPRACH repetitions per attempt $N_{rep}^{NPRACH}$ (numRepetitionsPerPreambleAttempt), NPRACH starting time $N_{start}^{NPRACH}$ (nprach-StartTime), fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

The NPRACH transmission can start only $N_{start}^{NPRACH} \cdot 30720T_s$ time units after the start of a radio frame fulfilling $n_f \mod(N_{period}^{NPRACH}/10)=0$.

After transmissions of $4 \cdot 64(T_{CP}+T_{SEQ})$ time units, a gap of $40 \cdot 30720T_s$ time units is inserted.

NPRACH configurations are invalid where $N_{scoffset}^{NPRACH}+N_{sc}^{NPRACH}>N_{sc}^{UL}$.

The NPRACH starting subcarriers allocated to the contention based random access are split into two sets of subcarriers, i.e., $\{0, 1, \ldots, N_{sc\_cont}^{NPRACH} N_{MSG3}^{NPRACH} - 1\}$ and $\{N_{sc\_cont}^{NPRACH} N_{MSG3}^{NPRACH}, \ldots, N_{sc\_cont}^{NPRACH} - 1\}$.

Here, if the second set is present, the second set indicates UE support for multi-tone msg3 transmission.

A frequency location of the NPRACH transmission is constrained within $N_{sc}^{RA}=12$ subcarriers. The frequency hopping is used within the 12 subcarriers, and a frequency location of an i-th symbol group is given by $n_{sc}^{RA}=n_{start}+\tilde{n}_{SC}^{RA}(i)$, where $n_{start}=N_{scoffset}^{NPRACH}+\lfloor n_{init}/N_{sc}^{RA} \rfloor \cdot N_{sc}^{RA}$, and conforms to Equation 1.

$$\tilde{n}_{sc}^{RA}(i) = \begin{cases} (\tilde{n}_{sc}^{RA}(0) + & i \bmod 4 = 0 \text{ and } i > 0 \\ f(i/4)) \bmod N_{sc}^{RA} & \\ \tilde{n}_{sc}^{RA}(i-1) + 1 & i \bmod 4 = 1, 3 \text{ and} \\ & \tilde{n}_{sc}^{RA}(i-1) \bmod 2 = 0 \\ \tilde{n}_{sc}^{RA}(i-1) - 1 & i \bmod 4 = 1, 3 \text{ and} \\ & \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$ [Equation 1]

$$f(t) = \left( f(t-1) + \left( \sum_{n=10t+1}^{10t+9} c(n) 2^{n-(10t+1)} \right) \bmod(N_{sc}^{RA}-1) + 1 \right)$$

$$\bmod N_{sc}^{RA}$$

$$f(-1) = 0$$

In Equation 1, $n_{init}$ is the subcarrier selected by the MAC layer from $\{0, 1, \ldots, N_{sc}^{NPRACH}-1\}$. A pseudo random generator is initialized with $c_{init}=N_{ID}^{Ncell}$.

Baseband Signal Generation

A time-continuous random access signal $s_i(t)$ for a symbol group i is defined by Equation 2 below.

$$s_i(t) = \beta_{NPRACH} e^{j2\pi(n_{SC}^{RA}(i)+Kk_0+1/2)\Delta f_{RA}(t-T_{CP})}$$ [Equation 2]

Here, $0 \leq t < T_{SEQ}+T_{CP}$, $\beta_{NPRACH}$ is an amplitude scaling factor in order to conform to the transmit power $P_{NPRACH}$, $k_0=-N_{sc}^{UL}/2$, and $K=\Delta f/\Delta f_{RA}$ accounts for a difference in a subcarrier spacing between the random access preamble and uplink data transmission.

A location in the frequency domain is controlled by the parameter $n_{SC}^{RA}(i)$.

A variable $\Delta f_{RA}$ is given by Table 4 below.

That is, Table 4 represents an example of random access baseband parameters.

TABLE 4

| Preamble format | $\Delta f_{RA}$ |
|---|---|
| 0, 1 | 3.75 kHz |

PUSCH-Config

IE PUSCH-ConfigCommon is used to designate a common PUSCH configuration and a reference signal configuration for PUSCH and PUCCH. IE PUSCH-ConfigDedicated is used to designate a UE-specific PUSCH configuration.

TABLE 5

```
-- ASN1START
TDD-PUSCH-UpPTS-r14 ::=   CHOICE {
    release                   NULL,
    setup                     SEQUENCE {
        symPUSCH-UpPTS-r14    ENUMERATED {sym1, sym2,
                              sym3, sym4, sym5,
sym6}
```

TABLE 5-continued

```
    OPTIONAL, -- Need ON
        dmrs-LessUpPTS-r14      ENUMERATED {true}   OPTIONAL   --
Need OR
        }
  }
}
-- ASN1STOP
```

In Table 5, symPUSCH-UpPTS represents the number of data symbols configured for PUSCH transmission in UpPTS.

sym2, sym3, sym4, sym5, and sym6 values may be used for a normal cyclic prefix, and sym1, sym2, sym3, sym4, and sym5 values may be used for an extended cyclic prefix.

Mapping to Physical Resources

For UpPTS, if dmrsLess-UpPts is configured to 'true', mapping to physical resources starts at $l=N_{symb}^{UL}-symPUSCH\_UpPts$ symbol of a second slot of a special subframe. Otherwise, the mapping to physical resources starts at $l=N_{symb}^{UL}-symPUSCH\_UpPts-1$ of the second slot of the special subframe.

A method for designing a narrowband random access channel (NRACH) preamble is described below when frame structure Type 2 (TDD) is supported in a narrowband (NB)-Internet of Things (IoT) system supporting cellular IoT proposed by the present specification.

Narrowband (NB)-LTE refers to a system for supporting low complexity and low power consumption, which has a system bandwidth corresponding to one physical resource block (PRB) of a LTE system.

This may be mainly used for a communication scheme for implementing Internet of things (IoT) by supporting a device such as machine-type communication (MTC) in a cellular system.

The NB-IoT system has an advantage in that frequencies can be efficiently used by using the same OFDM parameters, such as subcarrier spacing, as those in the LTE system and allocating 1 PRB for NB-LTE to a legacy LTE band without additional band allocation.

In case of downlink, a physical channel of NB-LTE is defined as NPSS/NSSS, NPBCH, NPDCCH/NEPDCCH, NPDSCH, etc. and is named by adding N in order to distinguish the NB-LTE from the LTE.

Figure 8:
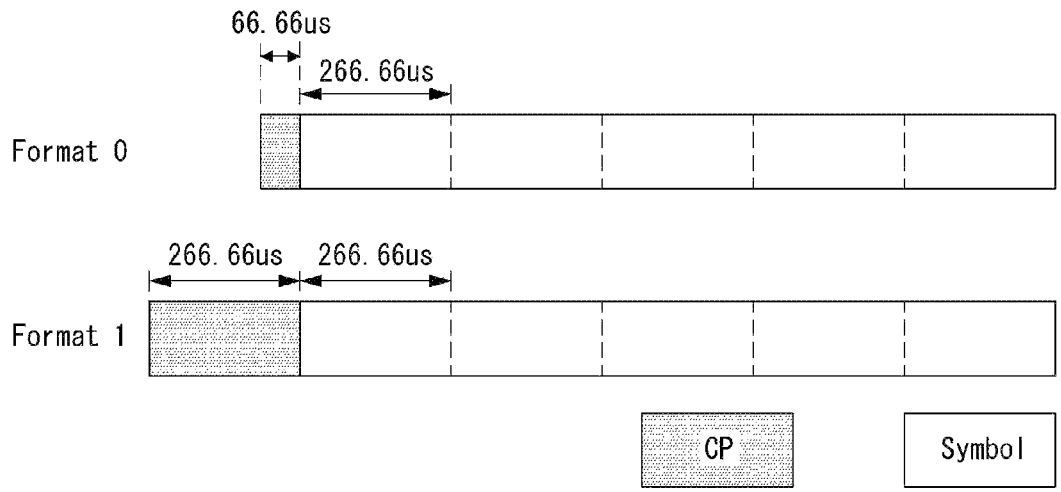
FIG. 8 illustrates an example of a NPRACH preamble format in a NB-IoT system.

A NPRACH preamble used in frequency division duplex (FDD) NB-IoT up to Rel.14 has two formats, and a detailed shape thereof is illustrated in FIG. 8.

That is, FIG. 8 illustrates an example of a NPRACH preamble format in the NB-IoT system.

Referring to FIG. 8, a NPRACH preamble performs a single tone transmission, has a subcarrier spacing of 3.75 kHz, and forms one symbol group by a combination of five symbols and one CP.

In this instance, NPRACH preamble format 0 consists of 66.66 us CP and five consecutive 266.66 us symbols, and NPRACH preamble format 1 consists of 266.66 us CP and five consecutive 266.66 us symbols.

A length of a symbol group of the NPRACH preamble format 0 is 1.4 ms, and a length of a symbol group of the NPRACH preamble format 1 is 1.6 ms.

A basic unit for repetition gathers four symbol groups to form a single repetition.

Thus, a length of four consecutive symbol groups forming the single repetition is 5.6 ms in the NPRACH preamble format 0 and is 6.4 ms in the NPRACH preamble format 1.

Figure 9:
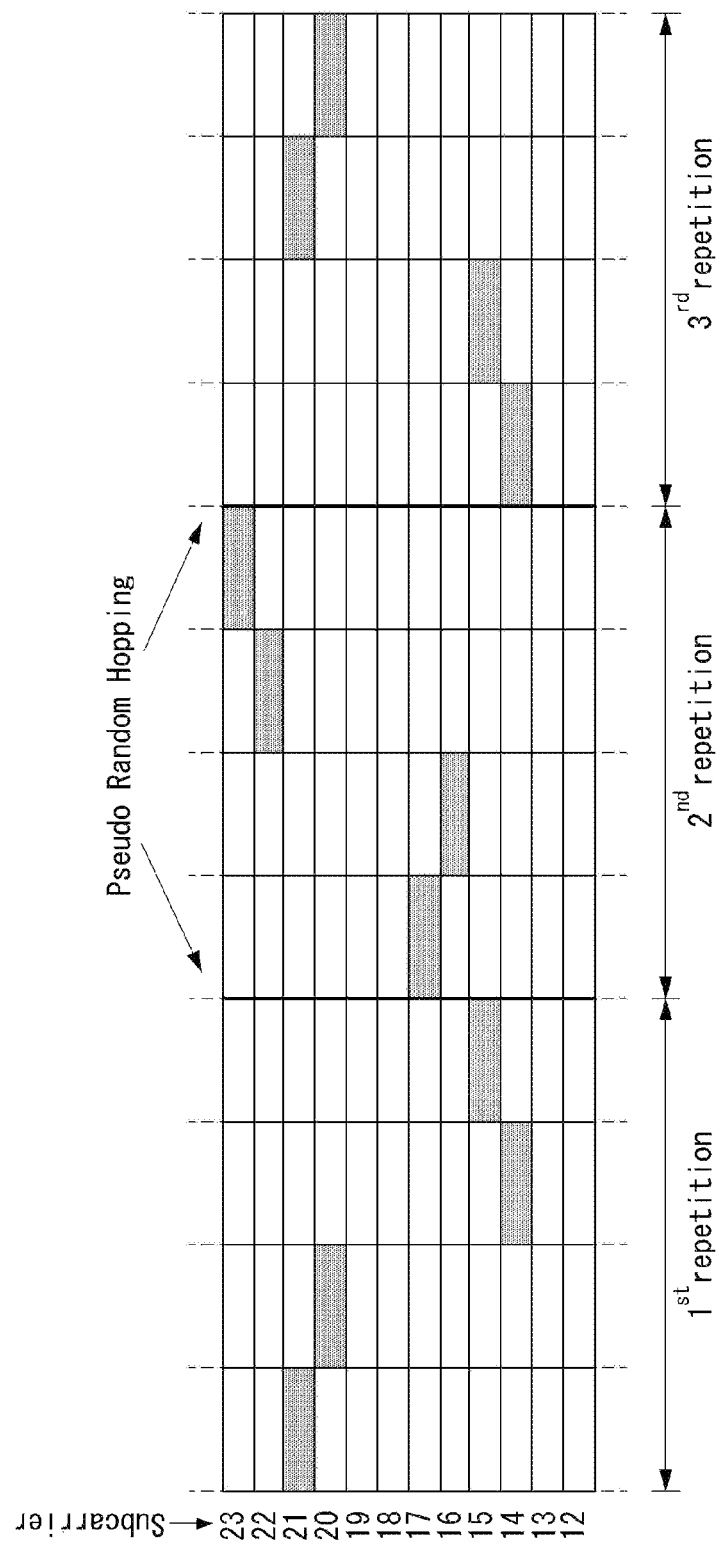
FIG. 9 illustrates an example of a repetition and random hopping method of a NPRACH preamble.

Further, as illustrated in FIG. 9, the NPRACH preamble is configured to perform a first hopping with a spacing that is equal to a subcarrier spacing and a second hopping with a spacing that is six times the subcarrier spacing.

FIG. 9 illustrates an example of a repetition and random hopping method of a NPRACH preamble.

In frame structure type 2 (TDD) to be introduced in Rel. 15 NB-IoT system, it is not easy to use, as it is, a legacy NB-IoT (Rel. 14) NPRACH preamble format considering a UL/DL configuration of legacy LTE.

However, although a TDD standalone mode may be configured to use the legacy NB-IoT NPRACH preamble format by introducing a new UL/DL configuration, an in-band mode or a guard band mode, which has been generally considered, is not easy to use the legacy NB-IoT NPRACH preamble format as it is.

Accordingly, the present specification provides a method for designing the NPRACH preamble when the frame structure type 2 is applied to the NB-IoT system.

Even in the following embodiments, the idea of the present invention can be applied to channels other than PRACH and can be extended to a multi-tone transmission scheme as well as a single-tone transmission scheme.

Further, although the present specification has been described focusing on the TDD in-band mode or the guard band mode, it is obvious that methods proposed by the present specification can be used in the standalone mode.

Enhanced NPRACH Preamble for Frame Structure Type 2 (TDD)

As illustrated in FIG. 9 above, it is advantageous to configure the first hopping and the second hopping to be transmitted in consecutive UL subframes, in terms of performance.

However, if a legacy NPRACH preamble format is used even in the TDD, there is no UL/DL configuration (see Table 1) capable of consecutively transmitting four symbol groups.

Therefore, when a NPRACH preamble is designed in the TDD, it may be considered to (1) reduce the number of symbols to be included in one symbol group, (2) reduce a symbol length while increasing a subcarrier spacing, or (3) reduce a CP length.

Alternatively, the NPRACH preamble may be designed by combining the (1) to (3) described above.

Table 6 represents consecutive UL subframes per each configuration in the UL/DL configuration of Table 2.

TABLE 6

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 6, if it is checked how many UL SFs (subframes) can be consecutively used in the legacy UL/DL configuration, configurations #0, #1, #3, #4, and #6 except for configurations #2 and #5 each include at least two consecutive UL subframes.

Further, considering UpPTS of a special subframe (it is possible to configure up to 6 symbols), up to 428 us (71.33 us*6) can be further used.

In this instance, a legacy LTE/MTC system has been configured to respective UEs via dedicated signaling referred to as symPUSCH-UpPTS.

Assuming that a TDD NPRACH preamble can be used in UpPTS, the number of symbols included in the UpPTS can be configured cell-specifically and semi-statistically through a system information block (SIB).

In addition, because it is determined how many symbols can be used in the UpPTS depending on a special subframe configuration value, the number of UpPTS symbols for TDD NPRACH preamble that is semi-statistically configured through the SIB may be based on (or dependent on) the special subframe configuration.

That is, it may be configured such that the UpPTS is used in NPARCH preamble transmission only in a previously promised special subframe configuration (e.g., #0 and #5).

Further, when NPRACH resource allocation information is sent to the UE, the UE may explicitly inform of whether the UpPTS can be used for the NPRACH transmission.

In addition, the UE may be configured to implicitly indicate whether to use the UpPTS by transmitting an UpPTS symbol parameter for the TDD NPRACH preamble.

In this case, if it is configured to use the UpPTS, the UE may be configured to transmit the NPRACH preamble from the beginning of an UpPTS symbol configured from a base station.

Alternatively, if it is configured not to use the UpPTS, the UE may be configured to transmit the NPRACH preamble to an UL subframe start point located immediately after a special subframe.

In addition, if the UE is informed that the UpPTS symbol can be used for the NPRACH preamble, or even if not, the UE may be configured to start the NPRACH preamble transmission at a NPRACH preamble transmission start time configured by the base station if the base station separately configures the NPRACH preamble transmission start time.

Further, a method may be considered to secure an implicit guard time by configuring, by the base station, TA (time from a downlink time synchronization time to a time at which the NPRACH is transmitted in advance) per CE level and/or per NPRACH format (repetition number within the symbol group).

In this instance, an applied default TA may be configured not to conform to NPRACH resources transmitting the NPRACH and conform to default TA of resource minimally transmitting the NPRACH.

In addition, if the base station informs the UE that the NPRACH preamble can be transmitted in the UpPTS, or if the NPRACH preamble transmission in the UpPTS is previously promised between the UE and the base station, the following methods may be considered.

First, a small gap hopping (e.g., a hopping with a gap equal to a subcarrier spacing, for example, 3.75 kHz) may be configured to be performed within the NPRACH preamble transmitted over a UpPTS of a special SF and up to an UL SF immediately following the special SF.

Characteristically, a cyclic prefix (CP) in the symbol group of the PRACH preamble may be configured to be lengthened and used.

Second, if the numbers of consecutive UL subframes are not the same within 10 msec (e.g., UL/DL configuration #6 consisting of three consecutive UL subframes and two consecutive UL subframes), it may be configured to increase the CP of the symbol group in a longer duration of UL subframes which consecutively appear, and perform the small gap hopping.

Last, as a length of the UpPTS symbol capable of transmitting the NPRACH preamble varies, a length of the CP in the symbol group may be configured to vary.

Further, it may be configured such that the number of symbols in the symbol group varies depending on the length of the UpPTS symbol capable of transmitting the NPRACH preamble.

In addition, it may be considered that the UE selects and transmits a NPRACH preamble format depending on the UL/DL configuration that the cell configures to the UE.

Characteristically, the UE may be configured to select the NPRACH preamble format depending on a minimum value of the number of consecutively appearing UL subframes among the UL/DL configurations.

The UL/DL configurations may be divided into case 1 in which a minimum value of the number of consecutively appearing UL subframes is 3 SFs in the UL/DL configurations #0 and #3, case 2 in which a minimum value of the number of consecutively appearing UL subframes is 2 SFs in the UL/DL configurations #1, #4 and #6, and case 3 in which a minimum value of the number of consecutively appearing UL subframes is 1 SF in the UL/DL configurations #2 and #5.

The UE may be configured to select a different NPRACH preamble format for each of the three cases.

Hereinafter, when the frame structure type 2 is applied to the NB-IoT system, various methods related to the design of the NRACH preamble are described in more detail.

(Method 1)

Method 1 is a method for increasing a subcarrier spacing of a NPRACH preamble by N times than the existing one (i.e., a symbol duration is reduced by 1/N times than the existing one) and reducing a CP length by 1/T than the existing one.

That is, the Method 1 is a method for down-scaling the symbol duration by N times while there is no change in the number of symbols in a symbol group.

The Method 1 is to increase the subcarrier spacing of the NPRACH preamble by N times than a subcarrier spacing value of a legacy NPRACH preamble.

In this instance, it may be configured such that a symbol length is reduced by 1/N times, and a considered CP length is reduced by 1/T, where N is a positive integer and T is a real number.

The Method 1 is described in more detail by way of example. In the following examples, N and T can have different values.

Embodiment 1

Embodiment 1 is an example in which N=2 and T=2.

When a value of N is 2, a subcarrier spacing of a new NPRACH preamble is 7.5 kHz that is two times 3.75 kHz.

At the same time, a symbol duration is reduced to ½ times from 266.66 us to 133.33 us.

Since T is 2, a CP length is reduced to ½ times. Even in this case, if CPs of two different lengths are supported, and symbol number included in one symbol group is the same as a structure of a legacy NPRACH preamble, new PRACH preamble format 0 and new PRACH preamble format 1 may be configured as illustrated in FIG. 10.

Figure 10:
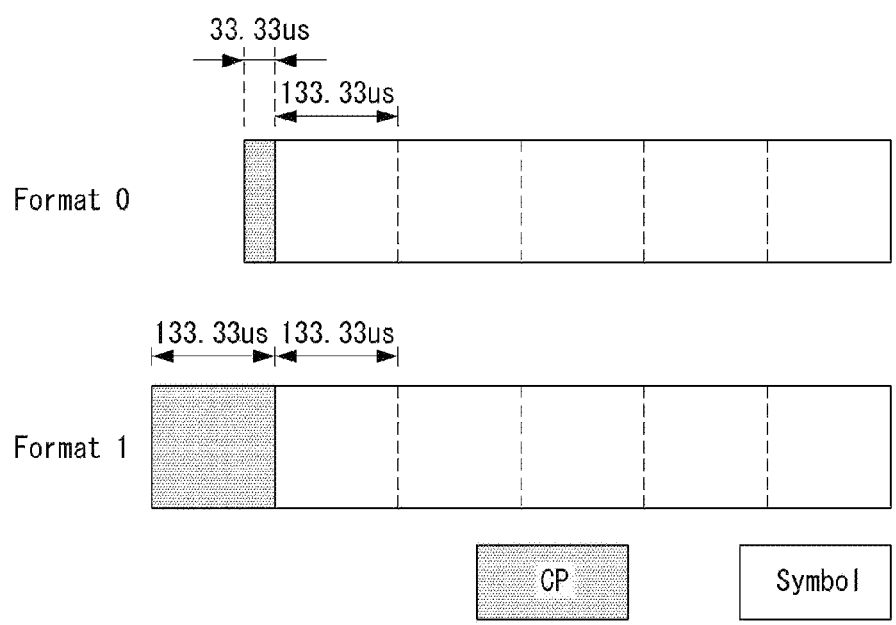
FIG. 10 illustrates an example of a NPRACH preamble format proposed by the present specification.

FIG. 10 illustrates an example of a NPRACH preamble format proposed by the present specification.

Referring to FIG. 10, a length of a symbol group forming the PRACH preamble format 0 is 0.7 ms, and a length of a symbol group forming the PRACH preamble format 1 is 0.8 ms.

That is, because a length of two consecutive symbol groups is less than 2 ms even if the PRACH preamble format 1 is used, the two symbol groups can be consecutively transmitted.

Thus, in this case, when each UE transmits a NPRACH preamble, two symbol groups forming a first hopping may be configured to be consecutively transmitted to two UL SFs, and a second hopping may be configured to be transmitted between two consecutive UL SFs.

Figure 11:
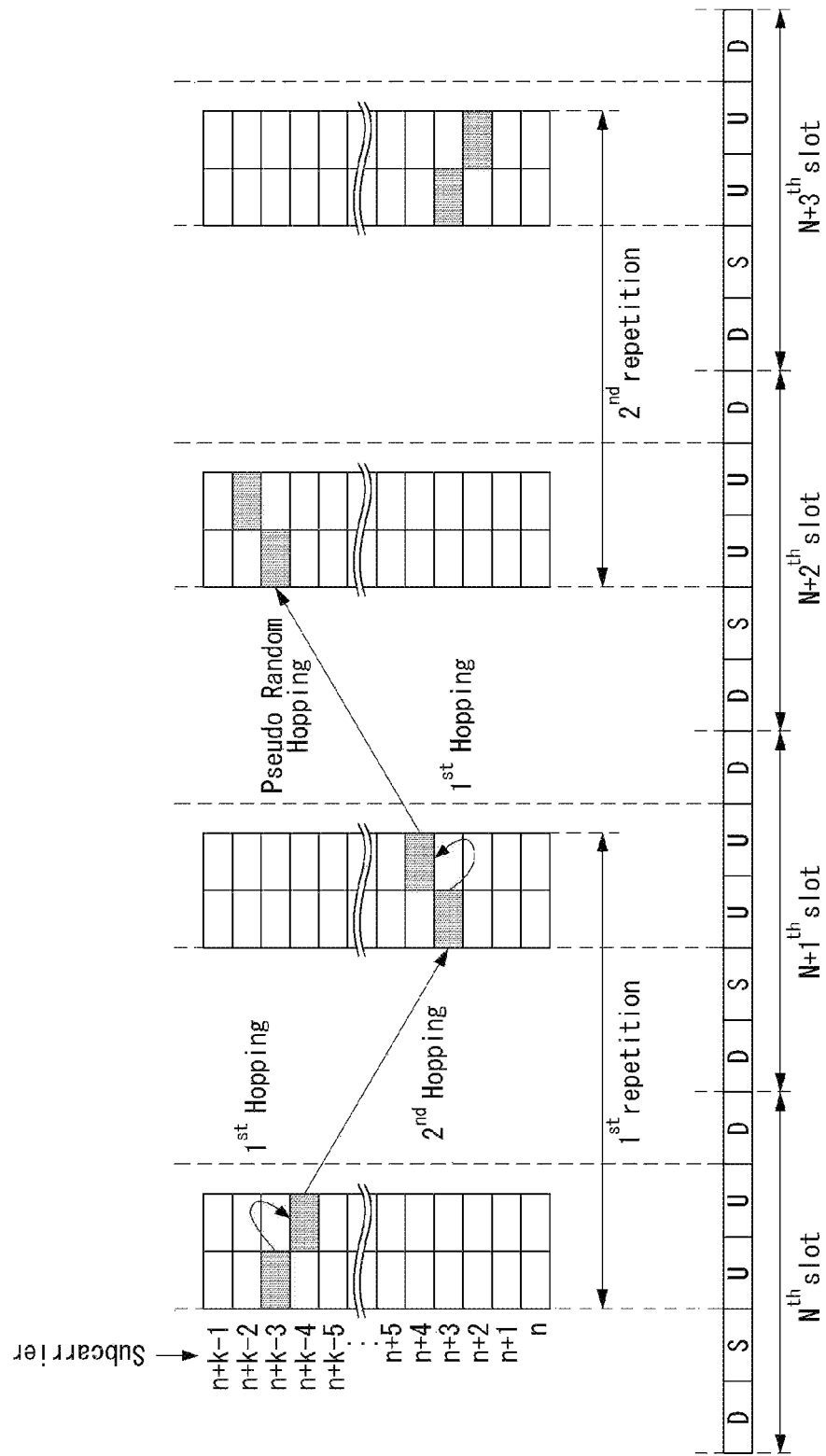
FIG. 11 illustrates an example of a hopping pattern for a NPRACH preamble symbol group proposed by the present specification.

This is illustrated as the following FIG. 11.

FIG. 11 illustrates an example of a hopping pattern for a NPRACH preamble symbol group proposed by the present specification.

Referring to FIG. 11, a total of k subcarriers from a subcarrier n to a subcarrier n+k−1 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, performance degradation due to change in channel may occur as compared to consecutively transmitting four symbol groups.

However, because the two symbol groups forming the first hopping are consecutively transmitted, TA estimation per UE at a base station end can proceed without major problems.

However, because the subcarrier spacing of the NPRACH preamble has increased, there is a drawback in that the frequency resources decrease as compared to the existing one.

That is, 48 frequency resources were available in case of the existing 3.75 kHz subcarrier spacing, but 24 frequency resources can be used in case of 7.5 kHz subcarrier spacing.

Further, as a CP length shortens, there may be a drawback of a reduction in a cell coverage that the corresponding cell can serve.

Embodiment 2

Embodiment 2 is an example in which N=4 and T=4.

When a value of N is 4, a subcarrier spacing of a new NPRACH preamble is 15 kHz that is four times 3.75 kHz.

At the same time, a symbol duration is reduced to ¼ times from 266.66 us to 66.66 us. Further, since T is 4, a CP length is reduced to ¼ times.

Figure 12:
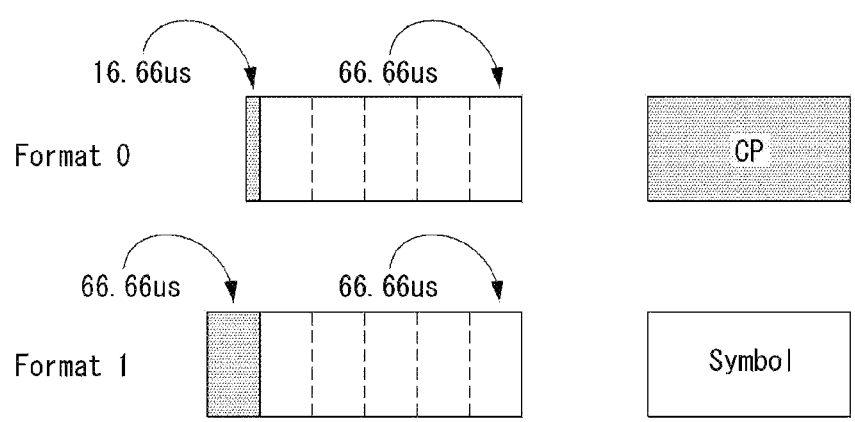
FIG. 12 illustrates an example of a NPRACH preamble format proposed by the present specification.

Even in this case, if CPs of two different lengths are supported, and symbol number included in one symbol group is the same as a structure of a legacy NPRACH preamble, new PRACH preamble format 0 and new PRACH preamble format 1 may be configured as illustrated in FIG. 12.

FIG. 12 illustrates an example of a NPRACH preamble format proposed by the present specification.

Referring to FIG. 12, a length of a symbol group forming the PRACH preamble format 0 is 0.35 ms, and a length of a symbol group forming the PRACH preamble format 1 is 0.4 ms.

That is, because a length of four consecutive symbol groups is less than 2 ms even if the PRACH preamble format 1 is used, the four symbol groups can be consecutively transmitted.

Thus, in this case, when each UE transmits a NPRACH preamble, four symbol groups forming a first hopping and a second hopping may be configured to be consecutively transmitted to two UL SFs, similar to an existing method.

Figure 13:
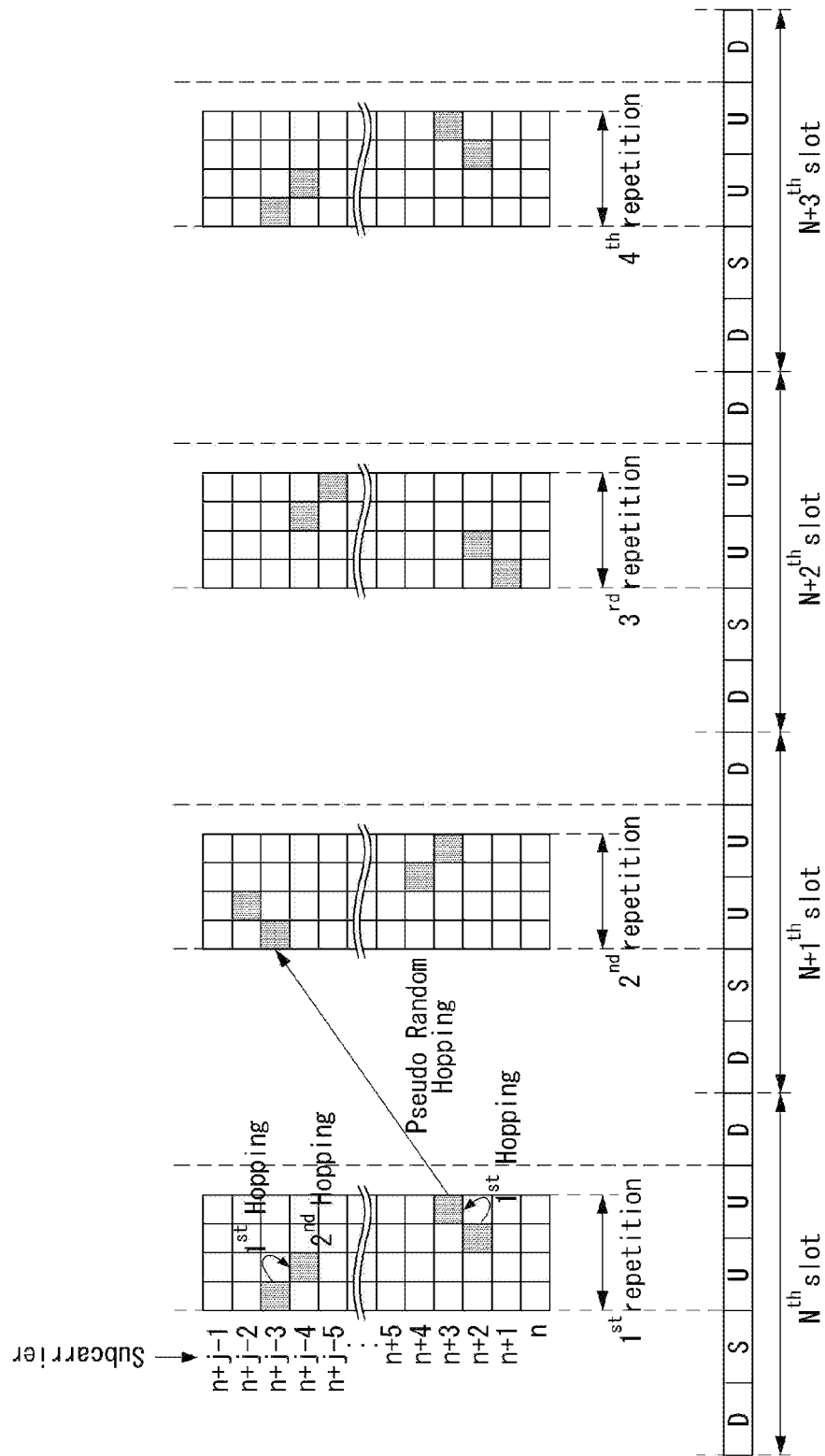
FIG. 13 illustrates another example of a hopping pattern for a NPRACH preamble symbol group proposed by the present specification.

This is illustrated as the following FIG. 13.

FIG. 13 illustrates another example of a hopping pattern for a NPRACH preamble symbol group proposed by the present specification.

Referring to FIG. 13, a total of j subcarriers from a subcarrier n to a subcarrier n+j−1 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, TA estimation per UE at a base station end can proceed without major problems because the four symbol groups are consecutively transmitted.

However, because the subcarrier spacing of the NPRACH preamble has increased, there is a drawback in that the frequency resources decrease as compared to the existing one.

That is, 48 frequency resources were available in case of the existing 3.75 kHz subcarrier spacing, but 12 frequency resources can be used in case of 15 kHz subcarrier spacing.

Further, as the CP length shortens, there may be a drawback of a reduction in a cell coverage that the corresponding cell can serve.

Embodiment 3

Embodiment 3 is an example in which N=2 and T=1.

When a value of N is 2, a subcarrier spacing of a new NPRACH preamble is 7.5 kHz that is two times 3.75 kHz.

At the same time, a symbol duration is reduced to ½ times from 266.66 us to 133.33 us. However, since T is 1, a CP length does not change.

Figure 14:
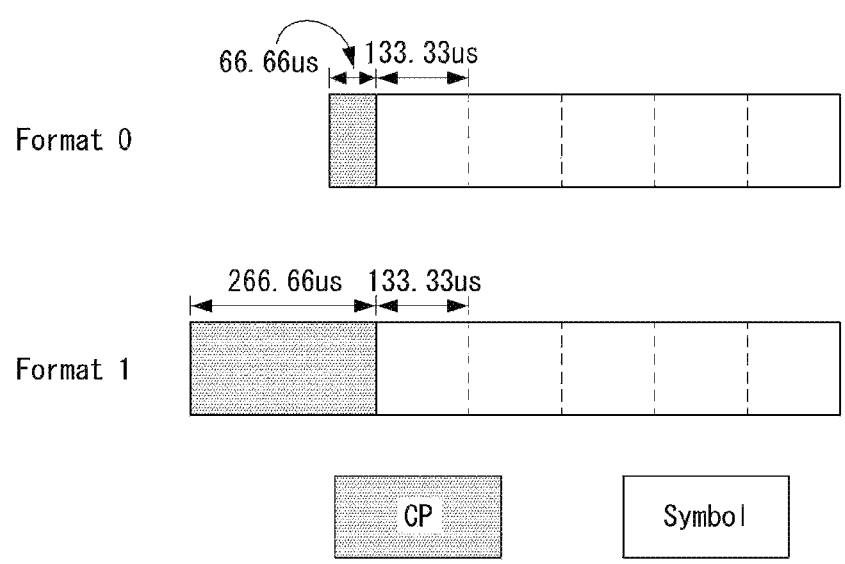
FIG. 14 illustrates another example of a NPRACH preamble format proposed by the present specification.

Even in this case, if CPs of two different lengths are supported, and symbol number included in one symbol group is the same as a structure of a legacy NPRACH preamble, new PRACH preamble format 0 and new PRACH preamble format 1 may be configured as illustrated in FIG. 14.

FIG. 14 illustrates another example of a NPRACH preamble format proposed by the present specification.

Referring to FIG. 14, a length of a symbol group forming the PRACH preamble format 0 is 0.733 ms, and a length of a symbol group forming the PRACH preamble format 1 is 0.933 ms.

That is, because a length of two consecutive symbol groups is less than 2.214 ms (2 UL SFs+3 symbols for UpPTS) even if the PRACH preamble format 1 is used, the two symbol groups can be consecutively transmitted.

Thus, in this case, when each UE transmits a NPRACH preamble, two symbol groups forming a first hopping may be configured to be consecutively transmitted to the UpPTS and two UL SFs, and a second hopping may be configured to be transmitted to appear between the UpPTS and two consecutive UL SFs. This is illustrated as the following FIG. 15.

Figure 15:
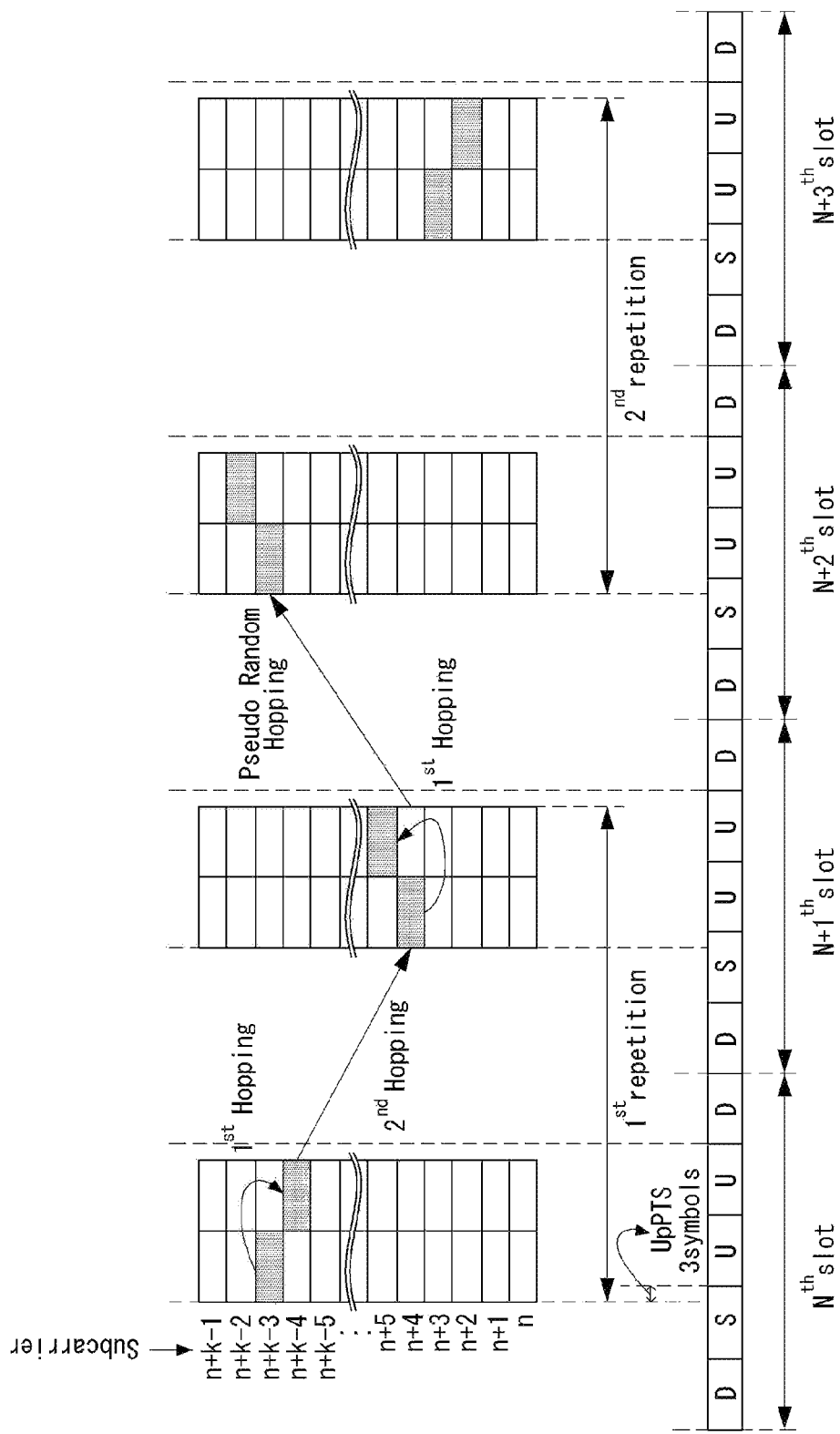
FIG. 15 illustrates another example of a hopping pattern for a NPRACH preamble symbol group proposed by the present specification.

FIG. 15 illustrates another example of a hopping pattern for a NPRACH preamble symbol group proposed by the present specification.

Referring to FIG. 15, a total of k subcarriers from a subcarrier n to a subcarrier n+k−1 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, performance degradation due to change in channel may occur as compared to consecutively transmitting four symbol groups.

However, because the two symbol groups forming the first hopping are consecutively transmitted, TA estimation per UE at a base station end can proceed without major problems.

Because the subcarrier spacing of the NPRACH preamble has increased, there is a drawback in that the frequency resources decrease as compared to the existing one. That is, 48 frequency resources were available in case of the existing 3.75 kHz subcarrier spacing, but 24 frequency resources can be used in case of 7.5 kHz subcarrier spacing. However, because the CP length does not change, there is an advantage in that a cell coverage can maintain the same level as a coverage of a FDD cell.

Embodiment 4

Embodiment 4 is an example in which N=4 and T=1.

When a value of N is 4, a subcarrier spacing of a new NPRACH preamble is 15 kHz that is four times 3.75 kHz. At the same time, a symbol duration is reduced to ¼ times from 266.66 us to 66.66 us.

However, since T is 1, a CP length does not change. Even in this case, if CPs of two different lengths are supported, and symbol number included in one symbol group is the same as a structure of a legacy NPRACH preamble, new PRACH preamble format 0 and new PRACH preamble format 1 may be configured as illustrated in FIG. 16.

Figure 16:
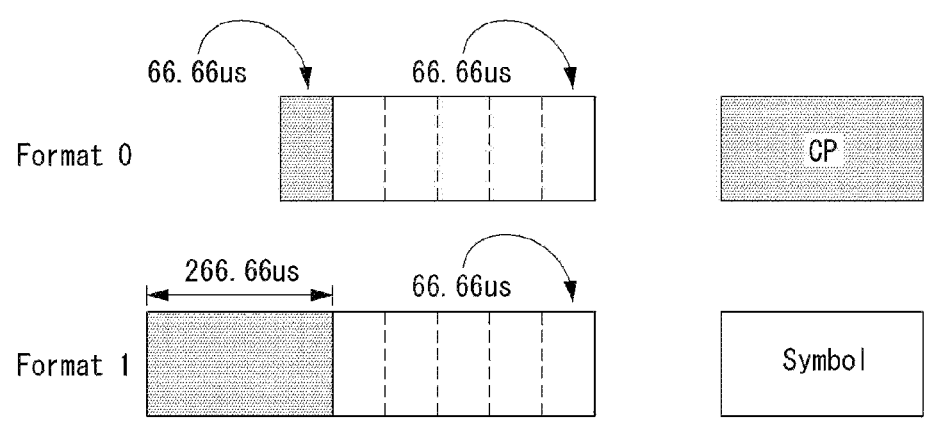
FIG. 16 illustrates another example of a NPRACH preamble format proposed by the present specification.

FIG. 16 illustrates another example of a NPRACH preamble format proposed by the present specification.

According to FIG. 16, a length of a symbol group forming the PRACH preamble format 0 is 0.4 ms, and a length of a symbol group forming the PRACH preamble format 1 is 0.6 ms.

It may be configured to mainly use the PRACH preamble format 0 on the assumption that a coverage of a cell using UL/DL configuration #2 is not generally large.

Thus, because a length of two consecutive symbol groups is less than 1 ms in case of using the PRACH preamble format 0, the two symbol groups can be consecutively transmitted.

Thus, in this case, when each UE transmits a NPRACH preamble, two symbol groups forming a first hopping may be configured to be consecutively transmitted to one UL SF, and two symbol groups forming a second hopping may be also configured to be consecutively transmitted to one UL SF.

Figure 17:
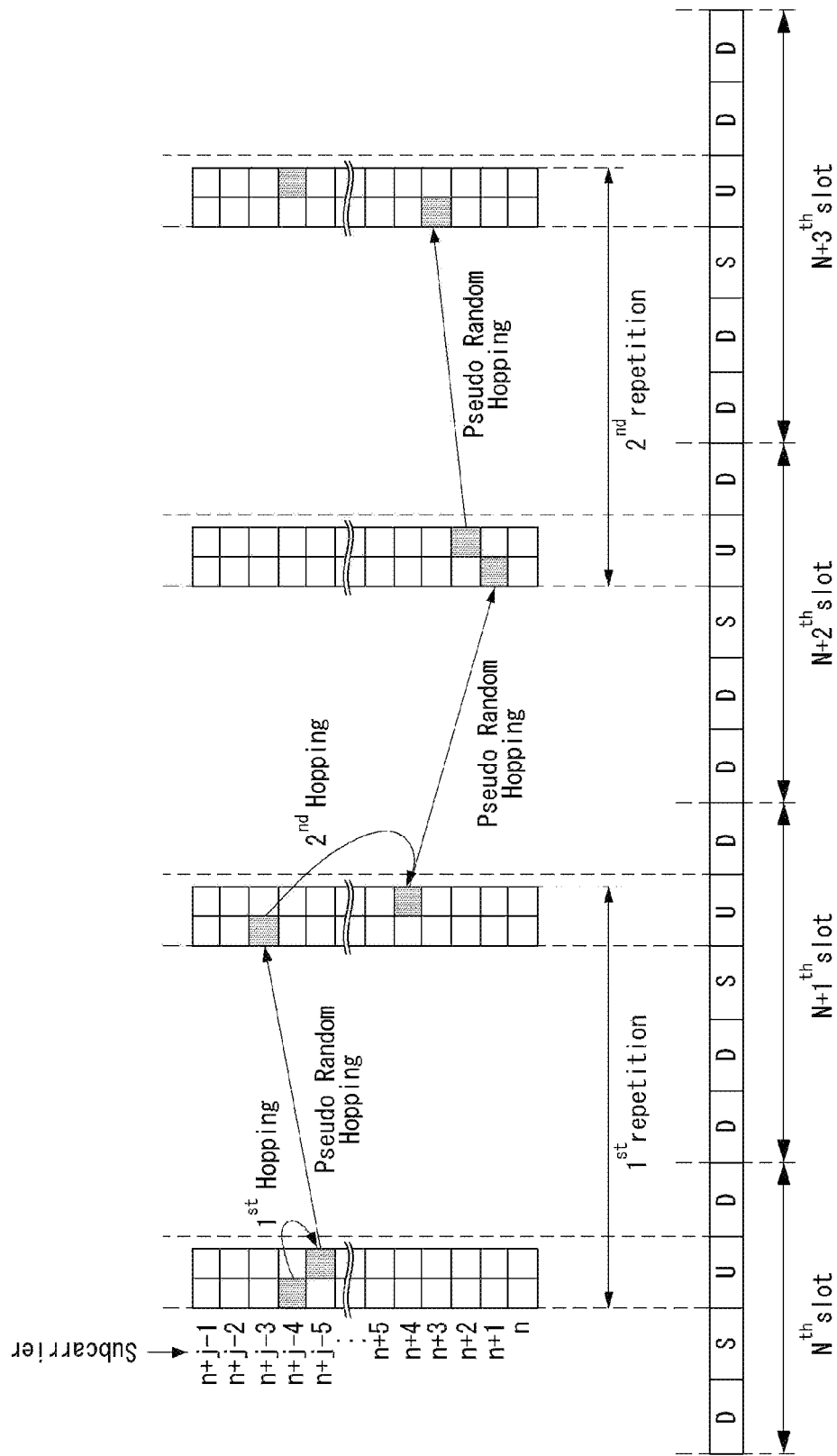
FIGS. 17 and 18 illustrate another example of a hopping pattern for a NPRACH preamble symbol group proposed by the present specification.
Figure 18:
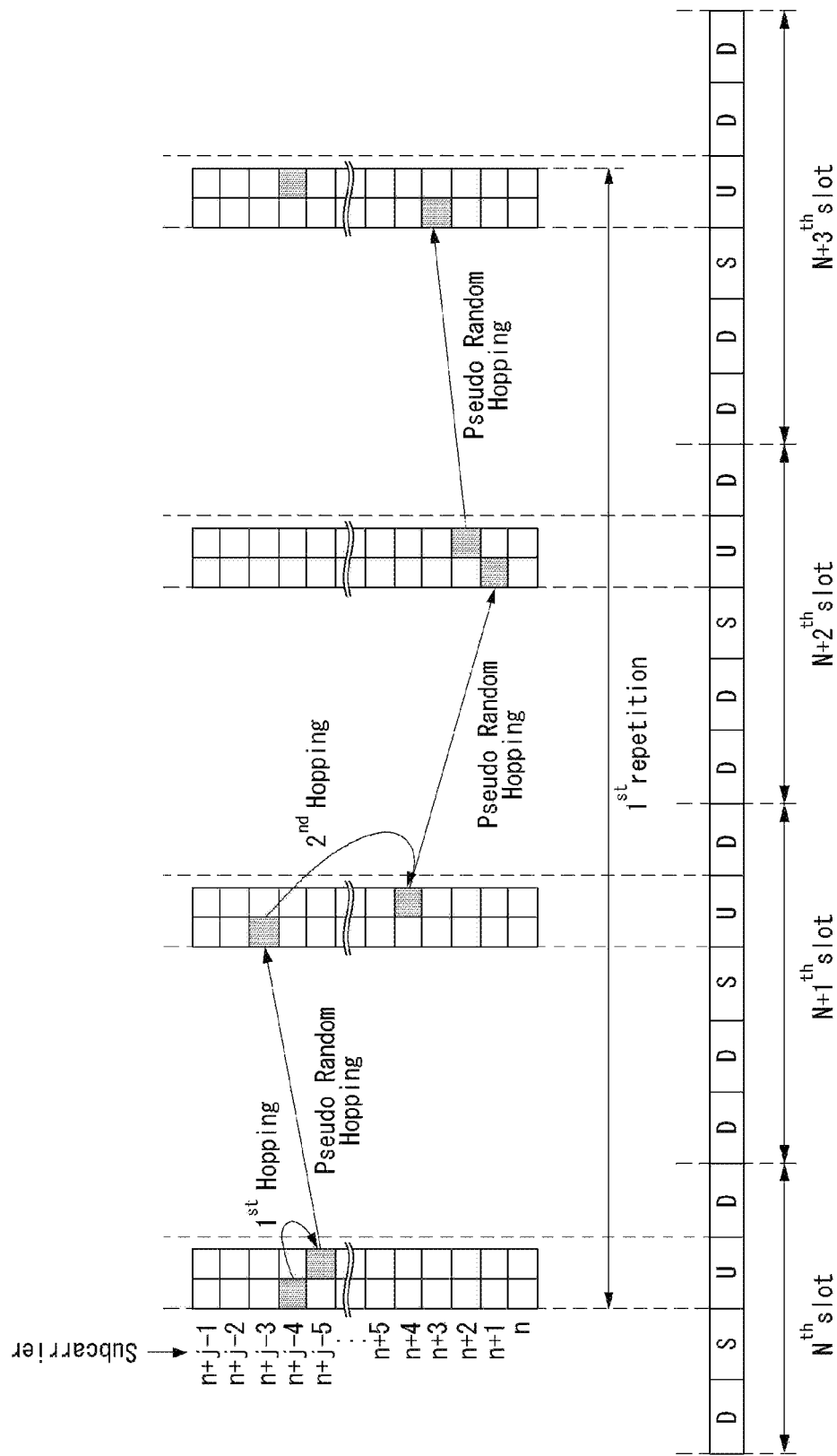

This is illustrated in FIGS. 17 and 18 as follows.

FIGS. 17 and 18 illustrate another example of a hopping pattern for a NPRACH preamble symbol group proposed by the present specification.

Referring to FIGS. 17 and 18, a total of j subcarriers from a subcarrier n to a subcarrier n+j−1 have been allocated as frequency resources for a NPRACH preamble, and they illustrate how the NPRACH preamble is transmitted according to the situation of UL/DL configuration #2 of legacy LTE TDD.

Further, G symbol groups may be contained in a single repetition.

FIG. 17 illustrates an example in which a symbol group is contained in a single repetition four times, and FIG. 18 illustrates an example in which a symbol group is contained in a single repetition eight times.

Characteristically, when a subcarrier spacing is 15 kHz, the first hopping may be configured to hop by a difference of a single tone (i.e., 15 kHz), and the second hopping may be configured to hop by a difference of two tones (i.e., 30 kHz).

When the NPRACH preamble is transmitted in this manner, performance degradation due to change in channel may occur as compared to consecutively transmitting four symbol groups. However, because the two symbol groups forming the first hopping and the two symbol groups forming the second hopping each are consecutively transmitted, TA estimation per UE at a base station end can proceed without major problems.

However, because the subcarrier spacing of the NPRACH preamble has increased, there is a drawback in that the frequency resources decrease as compared to the existing one.

That is, 48 frequency resources were available in case of the existing 3.75 kHz subcarrier spacing, but 12 frequency resources can be used in case of 15 kHz subcarrier spacing.

However, because a CP length has not changed, there is an advantage in that a cell coverage can maintain the same level as a coverage of a FDD cell.

In addition, in the same situation, an example of a cell using UL/DL configuration #1 is illustrated as the following FIG. 13.

(Method 2)

Method 2 is a method for changing the number of symbols forming a symbol group of a NPRACH preamble to M.

Here, M is a natural number of M<5, and in the Method 2, a subcarrier spacing, a symbol duration, and a CP length are not changed.

That is, the Method 2 changes the number of symbols forming the symbol group of the NPRACH preamble from the existing five to M less than five.

Hereinafter, the Method 2 is described in more detail by way of example.

Embodiment 1

Embodiment 1 is an example in which M=3.

When M is 3, it means that the number of symbols forming one symbol group is 3. Because a subcarrier spacing does not change, new PRACH preamble format 0 and new PRACH preamble format 1 may be configured as illustrated in FIG. 19 if two different CP lengths are used as it is.

Figure 19:
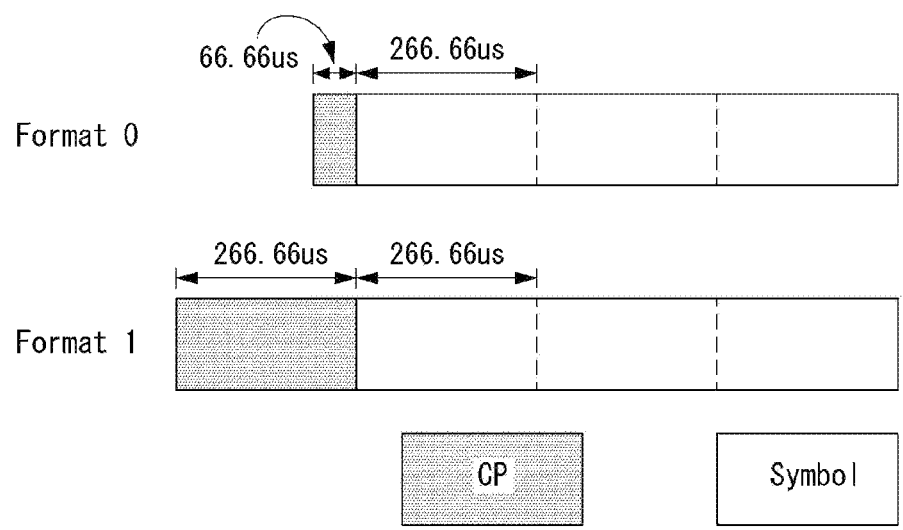
FIG. 19 illustrates another example of a NPRACH preamble format proposed by the present specification.

FIG. 19 illustrates another example of a NPRACH preamble format proposed by the present specification.

According to FIG. 19, a length of a symbol group forming the PRACH preamble format 0 is 0.866 ms, and a length of a symbol group forming the PRACH preamble format 1 is 1.066 ms.

That is, because a length of two consecutive symbol groups is less than 2.428 ms (2 UL SFs+6 symbols for UpPTS) even if the PRACH preamble format 1 is used, the two symbol groups can be consecutively transmitted.

Thus, when each UE transmits a NPRACH preamble, two symbol groups forming a first hopping may be configured to be consecutively transmitted to the UpPTS and two UL SFs, and a second hopping may be configured to be transmitted to appear between the UpPTS and two consecutive UL SFs.

Figure 20:
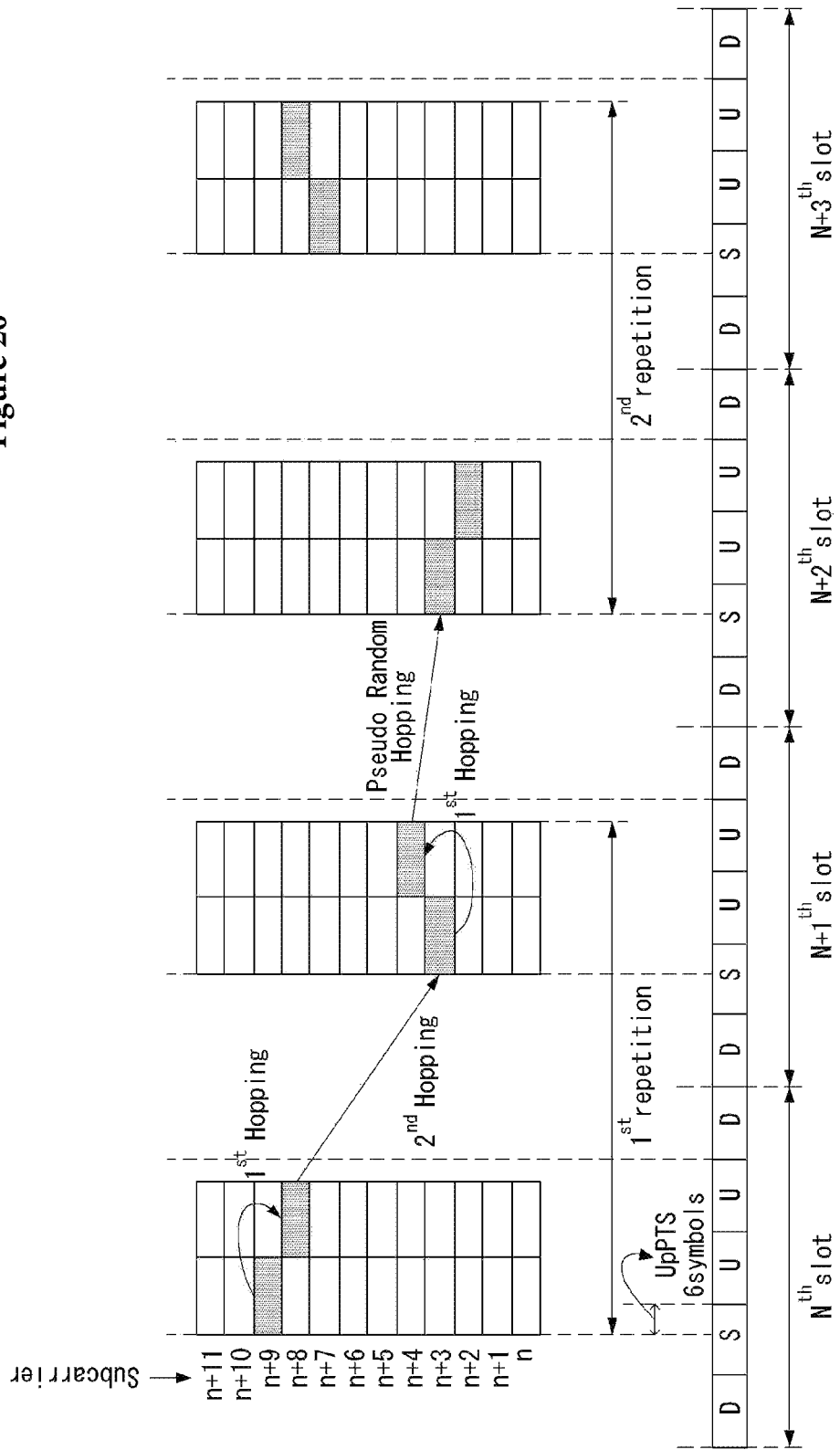
FIG. 20 illustrates another example of a hopping pattern for a NPRACH preamble symbol group proposed by the present specification.

This is illustrated as the following FIG. 20. Referring to FIG. 20, a total of 12 subcarriers from a subcarrier n to a subcarrier n+11 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, performance degradation due to change in channel may occur as compared to consecutively transmitting four symbol groups. However, because the two symbol groups forming the first hopping are consecutively transmitted, TA estimation per UE at a base station end can proceed without major problems.

Further, because the subcarrier spacing has not changed, the frequency resources have not changed, and also because the CP length has not changed, there is an advantage in that a cell coverage can be maintained.

However, because the number of symbols has decreased as compared to an existing preamble, energy may decrease and thus a repetition number required to achieve the same performance may increase.

An implicit guard time may be configured to be longer than the CP length, in order to maintain the cell coverage due to the CP length.

Accordingly, in the example of FIG. 20, if UpPTS 6 symbols are configured, the cell coverage can be maintained because the implicit guard time (i.e., 294.66 us, 2428−2133.33=294.66 (us)) is configured to be longer than the CP (i.e., 66.66 us or 266.66 us) length.

FIG. 20 illustrates another example of a hopping pattern for a NPRACH preamble symbol group proposed by the present specification.

Embodiment 2

Embodiment 2 is an example in which M=2.

When M is 2, the number of symbols forming one symbol group is 2. Because a subcarrier spacing does not change, new PRACH preamble format 0 and new PRACH preamble format 1 may be configured as illustrated in FIG. 21 if two different CP lengths are used as it is.

Figure 21:
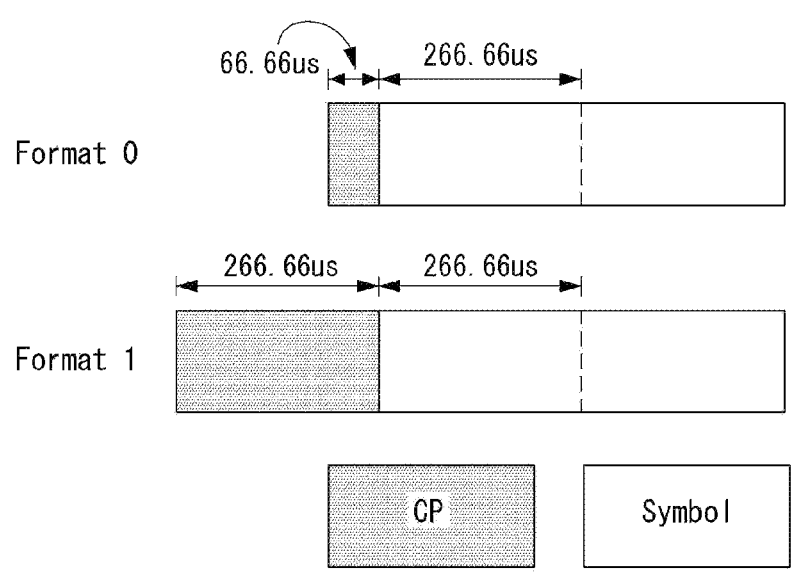
FIG. 21 illustrates another example of a NPRACH preamble format proposed by the present specification.

FIG. 21 illustrates another example of a NPRACH preamble format proposed by the present specification.

Referring to FIG. 21, a length of a symbol group forming the PRACH preamble format 0 is 0.6 ms, and a length of a symbol group forming the PRACH preamble format 1 is 0.8 ms.

That is, because a length of two consecutive symbol groups is less than 2 ms even if the PRACH preamble format 1 is used, the two symbol groups can be consecutively transmitted.

Thus, when each UE transmits a NPRACH preamble, two symbol groups forming a first hopping may be configured to be consecutively transmitted to two UL SFs, and a second hopping may be configured to be transmitted to appear between two consecutive UL SFs.

Figure 22:
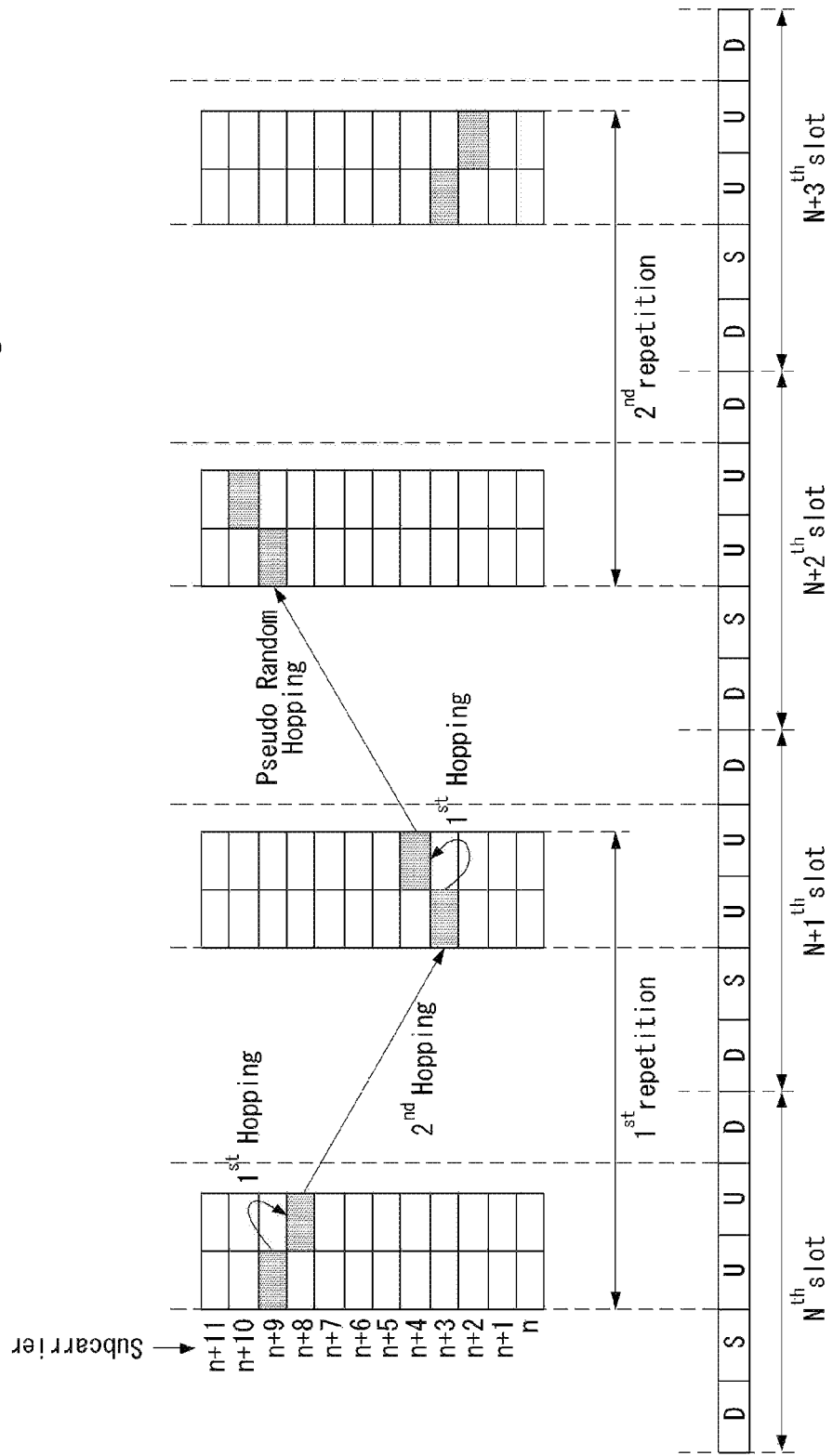
FIG. 22 illustrates another example of a hopping pattern for a NPRACH preamble symbol group proposed by the present specification.

This is illustrated as the following FIG. 22.

FIG. 22 illustrates another example of a hopping pattern for a NPRACH preamble symbol group proposed by the present specification.

Referring to FIG. 22, a total of 12 subcarriers from a subcarrier n to a subcarrier n+11 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, performance degradation due to change in channel may occur as compared to consecutively transmitting four symbol groups. However, because the two symbol groups forming the first hopping are consecutively transmitted, TA estimation per UE at a base station end can proceed without major problems.

Further, because the subcarrier spacing has not changed, the frequency resources have not changed, and also because the CP length has not changed, there is an advantage in that a cell coverage can be maintained.

However, because the number of symbols decreases as compared to an existing PRACH preamble, energy may decrease and thus a repetition number required to achieve the same performance may increase. Further, this embodiment has an advantage of maintaining the cell coverage without additionally configuring the UpPTS as compared to the example of M=3 described above.

(Method 3)

Method 3 is a method for changing the number of symbols forming a symbol group of a NPRACH preamble to M and changing a CP length.

Here, M is a natural number of M<5.

In the Method 3, a subcarrier spacing and a symbol duration are not changed.

That is, the Method 3 changes the number of symbols forming the symbol group of the NPRACH preamble from the existing five to M less than five and also changes the CP length.

Hereinafter, the Method 3 is described in more detail by way of example.

Embodiment 1

Embodiment 1 is an example in which M=3.

When M is 3, the number of symbols forming one symbol group is 3. Considering that 66.66 us, 133.33 us, and 200 us are used as a value of CP length (because a subcarrier spacing has not changed), new PRACH preamble format 0, new PRACH preamble format 1, and new PRACH preamble format 2 may be configured as illustrated in FIG. 23.

Figure 23:
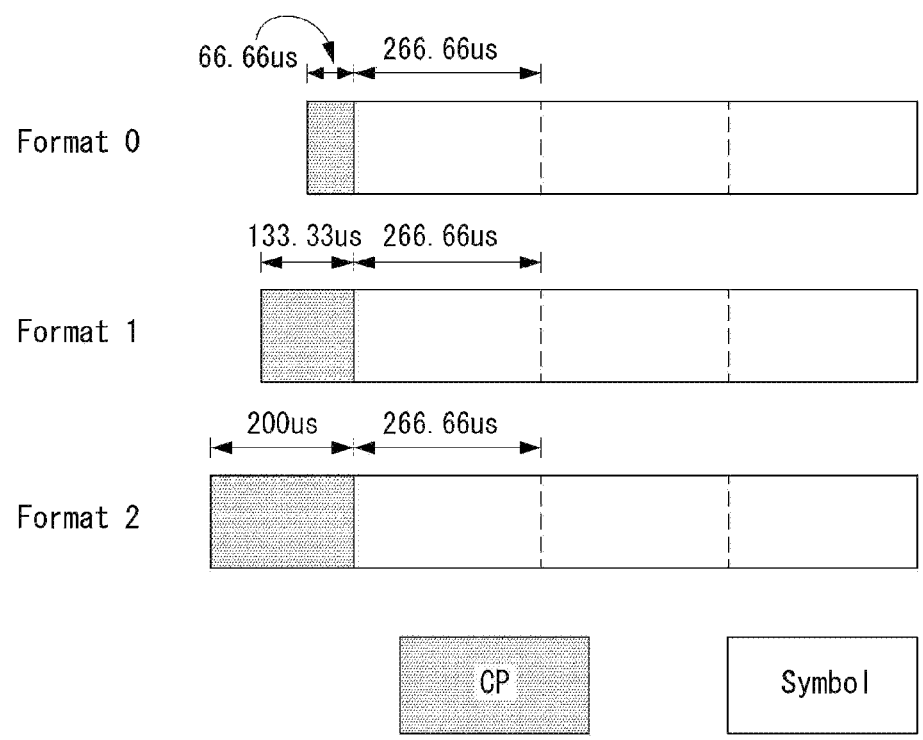
FIG. 23 illustrates another example of a NPRACH preamble format proposed by the present specification.

FIG. 23 illustrates another example of a NPRACH preamble format proposed by the present specification.

If only two CP lengths are used as different CP lengths like characteristics of the FDD, it may be configured to use the PRACH preamble format 0 as a default and to use only one of the PRACH preamble format 1 and the PRACH preamble format 2.

Referring to FIG. 23, a length of a symbol group forming the PRACH preamble format 0 is 0.866 ms, a length of a symbol group forming the PRACH preamble format 1 is 0.933 ms, and a length of a symbol group forming the PRACH preamble format 2 is 1 ms.

That is, because a length of two consecutive symbol groups is less than 2.214 ms (2 UL SFs+3 symbols for UpPTS) even if the PRACH preamble format 2 is used, the two symbol groups can be consecutively transmitted.

Thus, when each UE transmits a NPRACH preamble, two symbol groups forming a first hopping may be configured to be consecutively transmitted to the UpPTS and two UL SFs, and a second hopping may be configured to be transmitted to appear between the UpPTS and two consecutive UL SFs.

Figure 24:
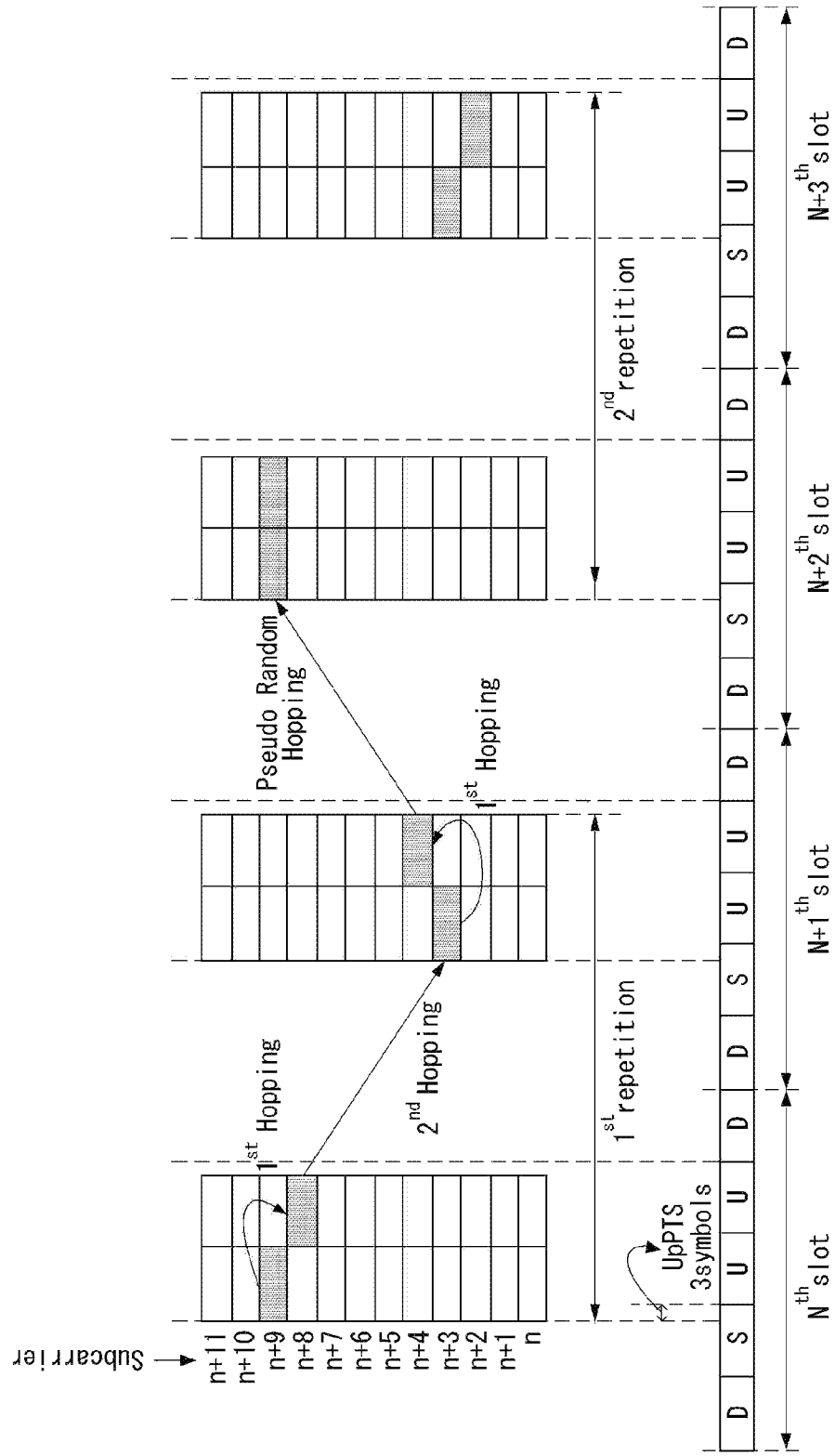
FIG. 24 illustrates another example of a hopping pattern for a NPRACH preamble symbol group proposed by the present specification.

This is illustrated in FIG. 24 as follows.

FIG. 24 illustrates another example of a hopping pattern for a NPRACH preamble symbol group proposed by the present specification.

Referring to FIG. 24, a total of 12 subcarriers from a subcarrier n to a subcarrier n+11 have been allocated as frequency resources for a NPRACH preamble, and it illustrates how the NPRACH preamble is transmitted according to the situation of UL/DL configuration #1 of legacy LTE TDD.

When the NPRACH preamble is transmitted in the method illustrated in FIG. 24, performance degradation due to change in channel may occur as compared to consecutively transmitting four symbol groups.

Because the two symbol groups forming the first hopping are consecutively transmitted, TA estimation per UE at a base station end can proceed without major problems.

Further, because the subcarrier spacing has not changed, the frequency resources have not changed, and also because the CP length has not changed, there is an advantage in that a cell coverage can be maintained.

However, because the number of symbols has decreased as compared to an existing PRACH preamble, energy may decrease and thus a repetition number required to achieve the same performance may increase.

An implicit guard time may be configured to be longer than the CP length, in order to maintain the cell coverage due to the CP length.

Accordingly, in the example of FIG. 24, if UpPTS 3 symbols are configured, the cell coverage can be maintained because the implicit guard time (i.e., 214 us, 2214−2000=214 (us)) is configured to be longer than the CP (i.e., 66.66 us or 133.33 us or 200 us) length.

(Method 4)

Method 4 is a combination of the Method 1 and the Method 2 and is a method for increasing a subcarrier spacing of a NPRACH preamble by N times than the existing one (i.e., reducing a symbol duration and a CP length by 1/N times than the existing one) and changing the number of symbols forming a symbol group of a NPRACH preamble to M.

Here, M is a natural number of M<5.

That is, the Method 4 may be a method of combining a method for increasing the subcarrier spacing of the NPRACH preamble by N times than a subcarrier spacing value of a legacy NPRACH preamble according to the Method 1 mentioned above and a method for changing the number of symbols forming the symbol group of the NPRACH preamble from the existing five to M less than five according to the Method 2 mentioned above.

In this instance, it may be configured such that a symbol length is reduced by 1/N times, and a considered CP length is reduced by 1/N.

Here, N is a positive integer, and M is a natural number less than 5.

Hereinafter, the Method 4 is described in more detail by way of example.

Embodiment 1

Embodiment 1 is an example in which N=2 and M=4.

When a value of N is 2, a subcarrier spacing of a new NPRACH preamble is 7.5 kHz that is two times 3.75 kHz. At the same time, a symbol duration is reduced to ½ times from 266.66 us to 133.33 us. Further, a CP length is reduced to ½ times.

In addition, when that M is 4, it means that the number of symbols forming one symbol group is 4. Therefore, even in this case, if CPs of two different lengths are supported, new PRACH preamble format 0 and new PRACH preamble format 1 may be configured as illustrated in FIG. 25.

Figure 25:
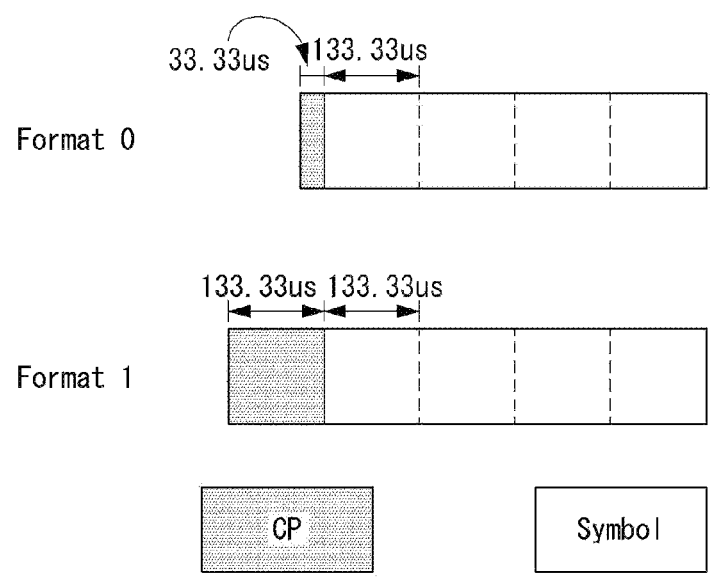
FIG. 25 illustrates another example of a NPRACH preamble format proposed by the present specification.

FIG. 25 illustrates another example of a NPRACH preamble format proposed by the present specification.

Referring to FIG. 25, a length of a symbol group forming the PRACH preamble format 0 is 0.566 ms, and a length of a symbol group forming the PRACH preamble format 1 is 0.666 ms.

That is, because a length of two consecutive symbol groups is less than 2 ms even if the PRACH preamble format 1 is used, the two symbol groups can be consecutively transmitted.

Thus, when each UE transmits a NPRACH preamble, two symbol groups forming a first hopping may be configured to be consecutively transmitted to two UL SFs, and a second hopping may be configured to be transmitted to appear between two consecutive UL SFs.

Figure 26:
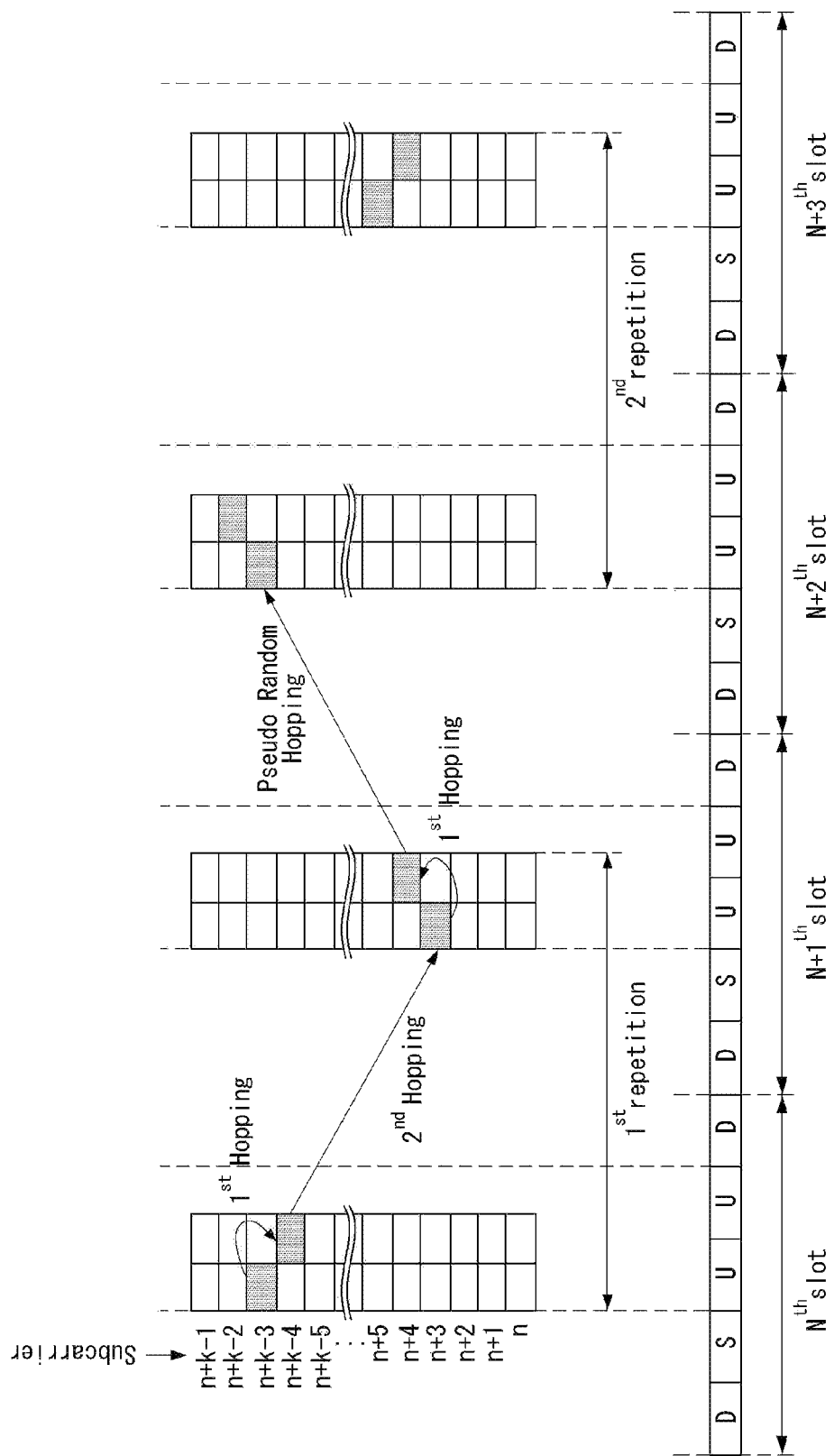
FIG. 26 illustrates another example of a hopping pattern for a NPRACH preamble symbol group proposed by the present specification.

This is illustrated in FIG. 26 as follows.

FIG. 26 illustrates another example of a hopping pattern for a NPRACH preamble symbol group proposed by the present specification.

Referring to FIG. 26, a total of k subcarriers from a subcarrier n to a subcarrier n+k−1 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, performance degradation due to change in channel may occur as compared to consecutively transmitting four symbol groups. However, because the two symbol groups forming the first hopping are consecutively transmitted, TA estimation per UE at a base station end can proceed without major problems.

Because the subcarrier spacing of the NPRACH preamble has increased, there is a drawback in that the frequency resources decrease as compared to the existing one.

That is, 48 frequency resources were available in case of the existing 3.75 kHz subcarrier spacing, but 24 frequency resources can be used in case of 7.5 kHz subcarrier spacing.

Further, as the CP length shortens, there is a drawback of a reduction in the cell coverage that the corresponding cell can serve. Because the number of symbols has decreased as compared to the existing preamble, energy may decrease and thus a repetition number required to achieve the same performance may increase.

Embodiment 2

Embodiment 2 is an example in which N=2 and M=3.

When a value of N is 2, a subcarrier spacing of a new NPRACH preamble is 7.5 kHz that is two times 3.75 kHz.

At the same time, a symbol duration is reduced to ½ times from 266.66 us to 133.33 us. Further, a CP length is reduced to ½ times.

In addition, when M is 3, the number of symbols forming one symbol group is 3. Therefore, even in this case, if CPs of two different lengths are supported, new PRACH preamble format 0 and new PRACH preamble format 1 may be configured as illustrated in FIG. 27.

Figure 27:
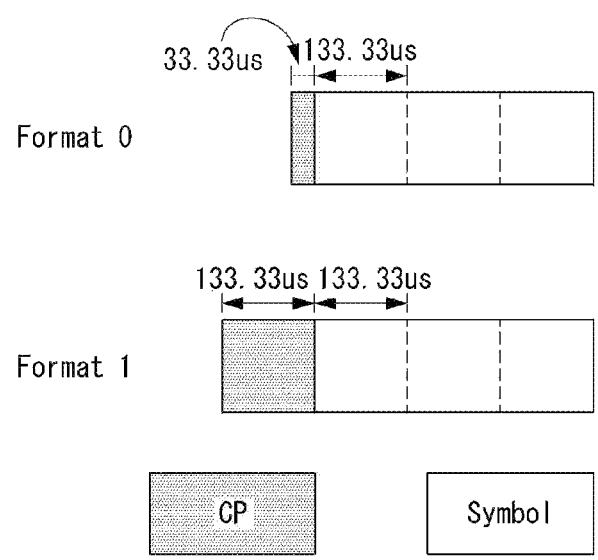
FIG. 27 illustrates another example of a NPRACH preamble format proposed by the present specification.

FIG. 27 illustrates another example of a NPRACH preamble format proposed by the present specification.

Referring to FIG. 27, a length of a symbol group forming the PRACH preamble format 0 is 0.433 ms, and a length of a symbol group forming the PRACH preamble format 1 is 0.533 ms.

That is, because a length of four consecutive symbol groups is less than 2.28533 ms (2 UL SFs+4 symbols for UpPTS) even if the PRACH preamble format 1 is used, the four symbol groups can be consecutively transmitted.

Thus, in this case, when each UE transmits a NPRACH preamble, four symbol groups forming a first hopping and a second hopping may be configured to be consecutively transmitted to the UpPTS and two UL SFs, similar to an existing method.

Figure 28:
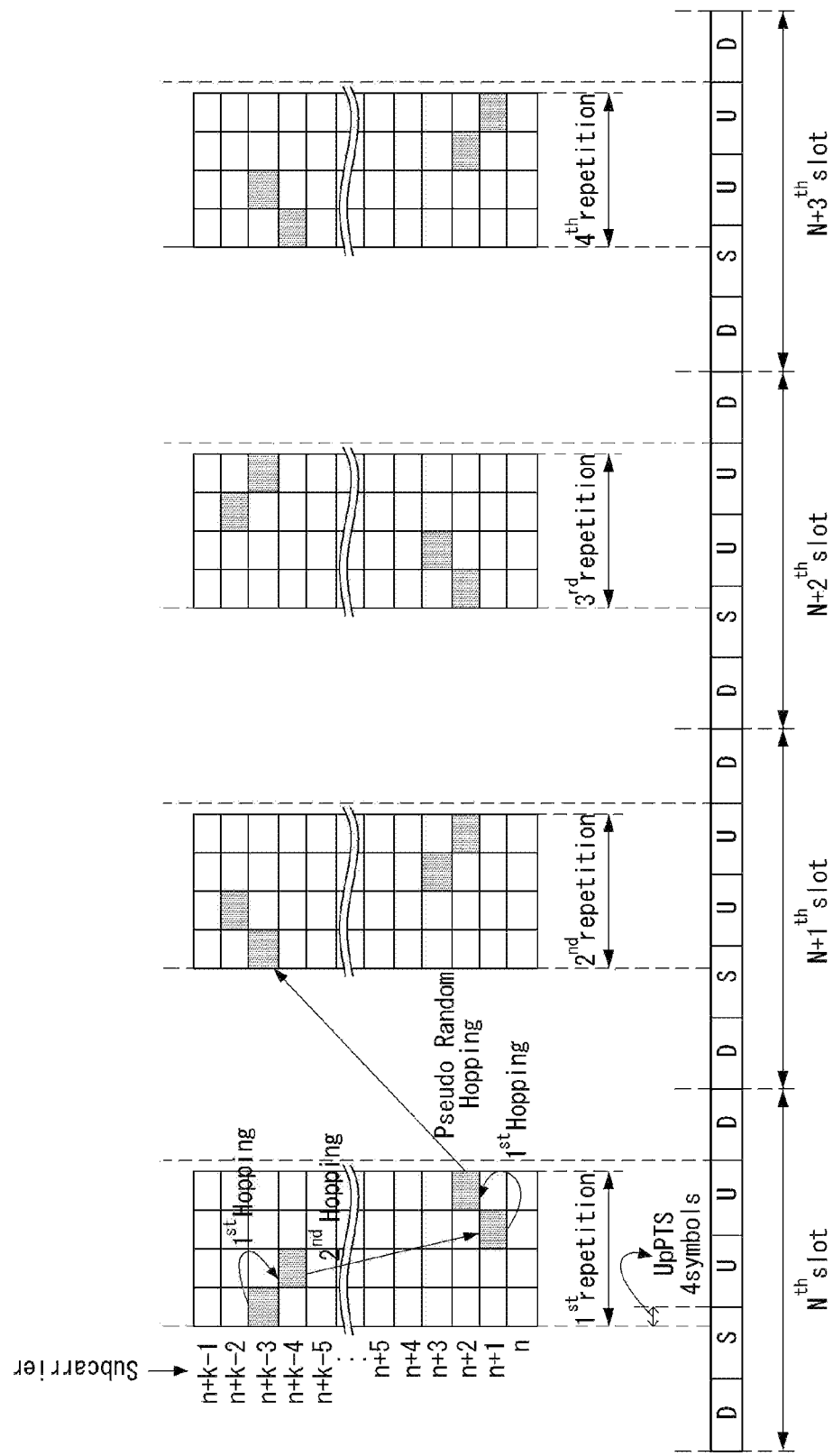
FIG. 28 illustrates another example of a hopping pattern for a NPRACH preamble symbol group proposed by the present specification.

This is illustrated as the following FIG. 28.

FIG. 28 illustrates another example of a hopping pattern for a NPRACH preamble symbol group proposed by the present specification.

Referring to FIG. 28, a total of k subcarriers from a subcarrier n to a subcarrier n+k−1 have been allocated as frequency resources for a NPRACH preamble, and it illustrates how the NPRACH preamble is transmitted according to the situation of UL/DL configuration #1 of legacy LTE TDD.

When the NPRACH preamble is transmitted in this manner, four symbol groups are consecutively transmitted. Therefore, TA estimation per UE at a base station end can proceed without major problems.

Because the subcarrier spacing of the NPRACH preamble has increased, there is a drawback in that the frequency resources decrease as compared to the existing one. That is, 48 frequency resources were available in case of the existing 3.75 kHz subcarrier spacing, but 24 frequency resources can be used in case of 7.5 kHz subcarrier spacing.

Further, as the CP length shortens, there is a drawback of a reduction in the cell coverage that the corresponding cell can serve. Because the number of symbols has decreased as compared to the existing preamble, energy may decrease and thus a repetition number required to achieve the same performance may increase.

An implicit guard time may be configured to be longer than the CP length, in order to maintain the cell coverage due to the CP length.

Accordingly, in the corresponding example, if UpPTS 4 symbols are configured, the cell coverage can be maintained because the implicit guard time (i.e., 152 us, 2285.33−2133.33=152 (us)) is configured to be longer than the CP (i.e., 66.66 us or 133.33 us) length.

(Method 5)

Method 5 relates to multi-tone NPRACH transmission for a TDD NB-IoT system.

If the Methods 1 to 4 mentioned above have considered a single tone in PRACH transmission, a TDD NPRACH may be configured such that the above proposed methods (the Methods 1 to 4) use multi-tone transmission.

In this instance, multi-tones may be contiguous or non-contiguous.

In addition, a multi-tone configuration may be a configuration in which contiguous and non-contiguous multi-tones coexist. Hereinafter, the Method 5 is described in more detail by way of example.

Embodiment 1

Embodiment 1 relates to non-contiguous dual tone transmission.

Considering an example in which a dual tone is non-contiguously transmitted, it is as follows.

A starting subcarrier resource to which a first tone will be transmitted may be configured to select one among regions configured with system information (SI), and a second tone may be configured to be transmitted away from the first tone by a previously promised frequency spacing or a certain frequency spacing (e.g., 6 subcarrier spacings) configured with the SI.

That is, it may be considered that a first hopping of a legacy NPRACH is maintained as it is, and a second hopping appears as a dual tone.

In this case, a unit of repetition may be also configured as a dual tone of two consecutive symbol groups and may be configured to determine a tone, to which the first tone will move, through a pseudo random hopping and to transmit the second tone away from the first tone by a certain frequency spacing as mentioned above.

If it goes beyond a configured frequency resource region, it may be configured to wrap-around in the frequency resource region.

Figure 29:
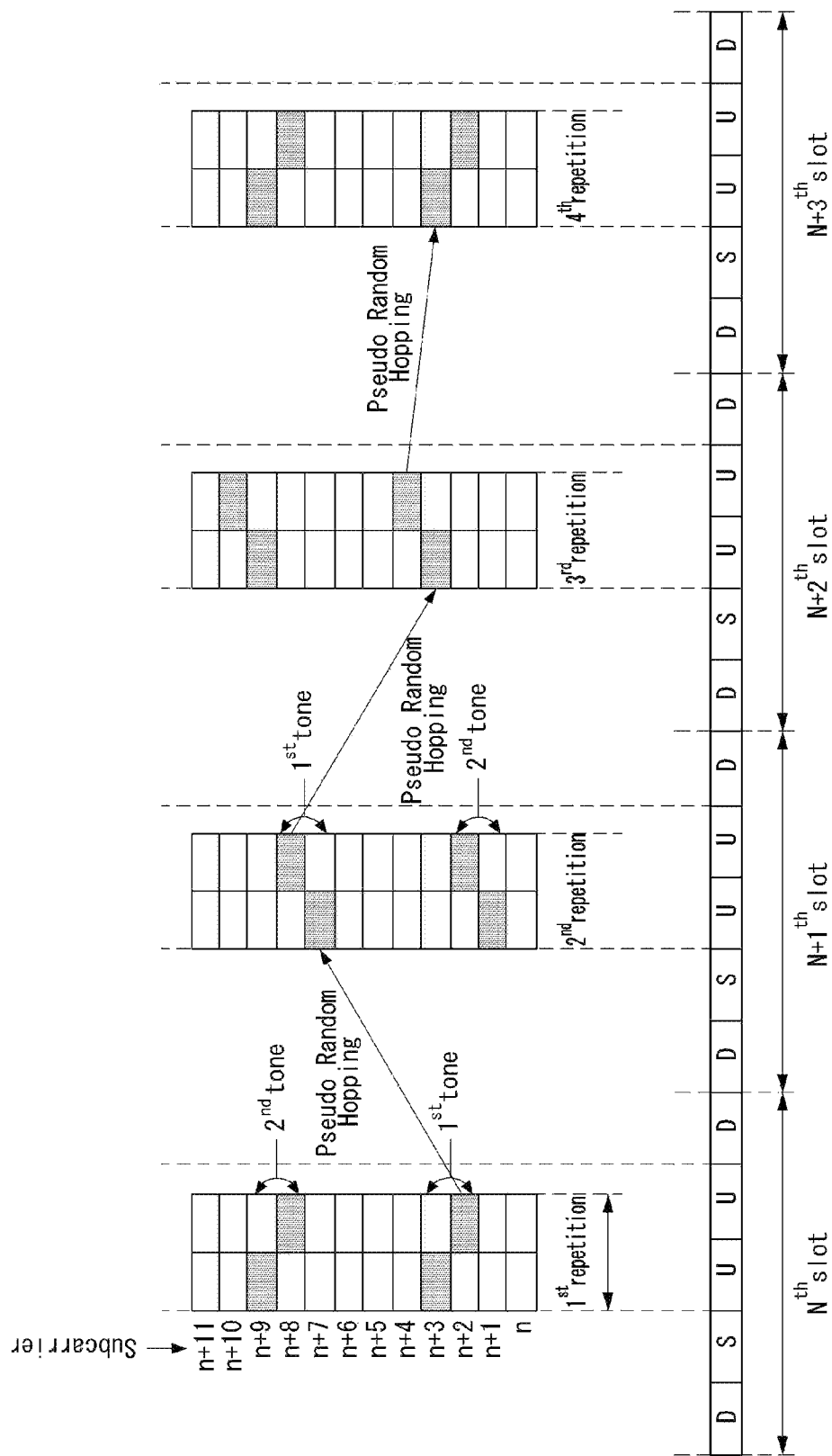
FIG. 29 illustrates another example of a hopping pattern for a NPRACH preamble symbol group proposed by the present specification.

In case of the Embodiment 2 of the Method 2 mentioned above (method for changing the number of symbols forming a symbol group of a NPRACH preamble to two), an example of non-contiguous dual tone transmission may be as the following FIG. 29.

FIG. 29 illustrates another example of a hopping pattern for a NPRACH preamble symbol group proposed by the present specification.

Referring to FIG. 29, a total of 12 subcarriers from a subcarrier n to a subcarrier n+11 have been allocated as frequency resources for a NPRACH preamble, and it illustrates how the NPRACH preamble is transmitted according to the situation of UL/DL configuration #1 of legacy LTE TDD.

If the NPRACH preamble is transmitted using this method, there is a disadvantage in terms of PAPR and resource allocation. However, an improvement of performance for preamble reception can be expected by additionally transmitting symbols, of which transmission has been insufficient with only a single tone, with the dual tone.

Further, a length of single repetition decreases, and thus an effect of a latency reduction can be obtained.

Embodiment 2

Embodiment 2 relates to contiguous triple tone transmission.

Considering an example in which a triple tone is contiguously transmitted, it is as follows.

A starting subcarrier resource to which a first tone will be transmitted may be configured to select one among regions configured with SI, and a second tone and a third tone may be configured to be contiguously transmitted in increments of one tone from the first tone.

If it goes beyond a configured frequency resource region, it may be configured to wrap-around in the frequency resource region.

In case of contiguous multi-tone, multi-tone preambles of two symbol groups forming a first hopping may be configured to be consecutively transmitted to two UL SFs, and a second hopping may be configured to be transmitted to appear between two consecutive UL SFs.

Figure 30:
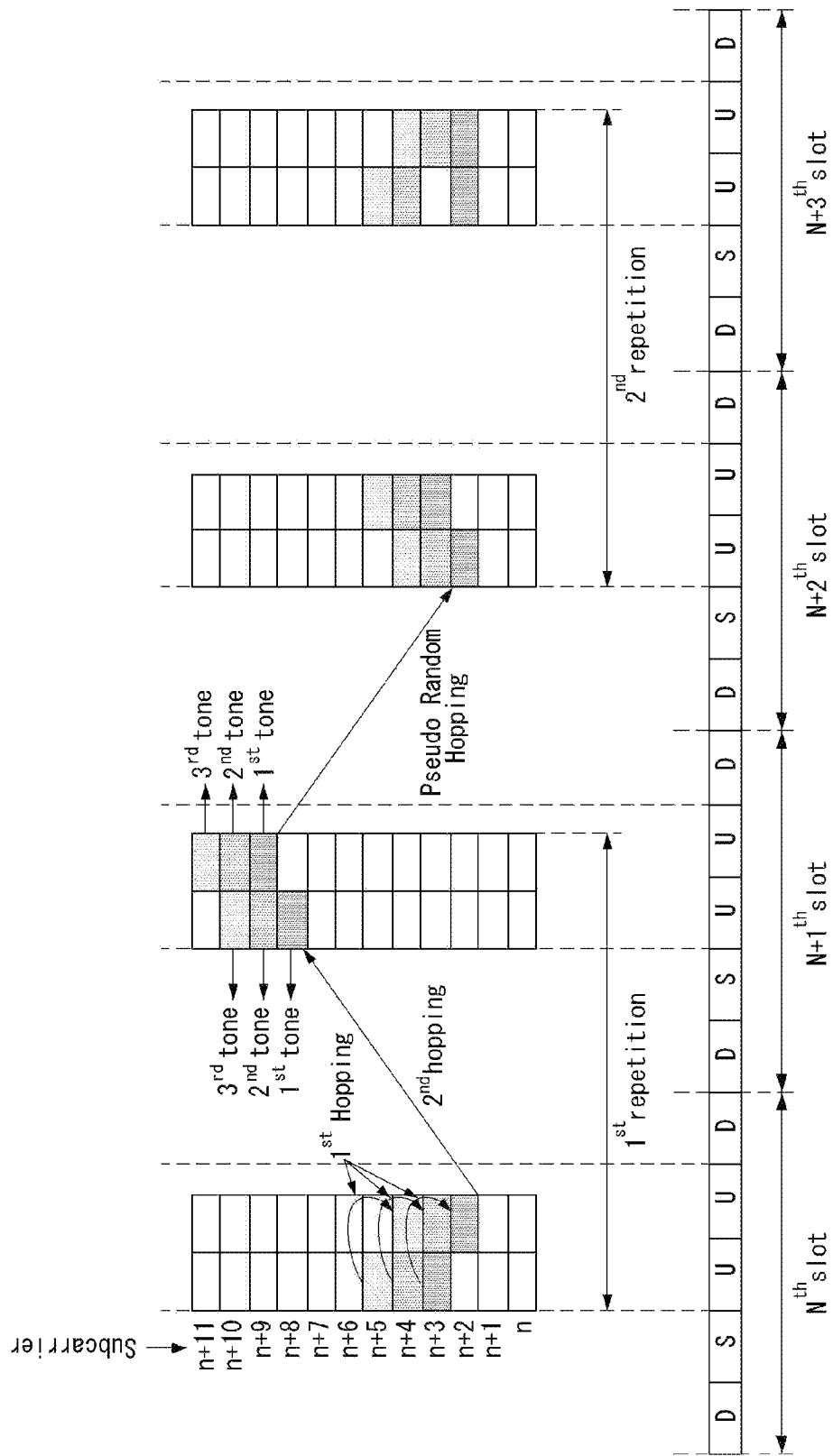
FIG. 30 illustrates another example of a hopping pattern for a NPRACH preamble symbol group proposed by the present specification.

A contiguous multi-tone scheme for the case of the Embodiment 2 of the Method 2 mentioned above (a method for changing the number of symbols forming a symbol group of a NPRACH preamble to two) is illustrated as the following FIG. 30.

FIG. 30 illustrates another example of a hopping pattern for a NPRACH preamble symbol group proposed by the present specification.

Referring to FIG. 30, a total of 12 subcarriers from a subcarrier n to a subcarrier n+11 have been allocated as frequency resources for a NPRACH preamble, and it illustrates how the NPRACH preamble is transmitted according to the situation of UL/DL configuration #1 of legacy LTE TDD.

If the NPRACH preamble is transmitted using this method, there is a disadvantage in terms of PAPR and resource allocation. However, an improvement of performance for preamble reception can be expected by additionally transmitting symbols, of which transmission has been insufficient with only a single tone, with the multi-tone.

In addition, if a multi-tone NPRACH preamble is defined, an operation of a UE capable of transmitting the multi-tone NPRACH preamble needs to be defined more clearly.

Currently, Rel. 14 NB-IoT system has already supported multi-tone transmission in message 3 (msg. 3, UE→eNB transmission), and the UE capable of multi-tone transmission selects a NPRACH preamble resource, that has been promised in advance that the msg. 3 can be transmitted with the multi-tone, and transmits a single tone preamble.

If Rel. 15 NB-IoT supports multi-tone preamble transmission, the eNB may be configured to, for backward compatibility, configure (A) NPRACH preamble resource that has been promised in advance that the msg. 3 can be transmitted with the single-tone, (B) NPRACH preamble resource that has been promised in advance that the msg. 3 can be transmitted with the multi-tone, and (C) multi-tone NPRACH preamble resource that has been promised in advance that the msg. 3 can be transmitted with the multi-tone.

Thus, in this case, the UE that is capable of the multi-tone transmission and satisfies a threshold of a repetition number configured to the (C) resource may be configured to start the NPRACH preamble transmission in the (C) resource.

If the UE does not receive a random access response (RAR) or msg. 4 from the eNB, the UE may be configured to move to the (C) resource corresponding to the following repetition number and transmit the NPRACH preamble.

However, there is no (C) resource corresponding to the following repetition number, the UE may be configured to move to the (B) resource and transmit the NPRACH preamble.

If there is no (B) resource or a threshold of a repetition number of the (B) resource is not satisfied, the UE may be configured to transmit the NPRACH preamble in the (A) resource.

The subsequent operation is the same as the RACH operation of the existing Rel. 13.

It is obvious that the UE using the (C) resource is capable of the multi-tone transmission in the msg. 3.

In addition, if a preamble can be transmitted using previously secured resources as in contention free (CF) NPRACH transmission, it may be considered to contiguously transmit all of multi-tones that the corresponding resources can use.

For example, if NPRACH resources previously secured to the UE, that will perform the contention free NPRACH transmission through the NPDCCH order, are K subcarriers, the UE may be configured to transmit the NPRACH preamble to one UL SF using contiguous K multi-tones.

Characteristically, K value may be 12, 24, 36, 48, etc.

Figure 31:
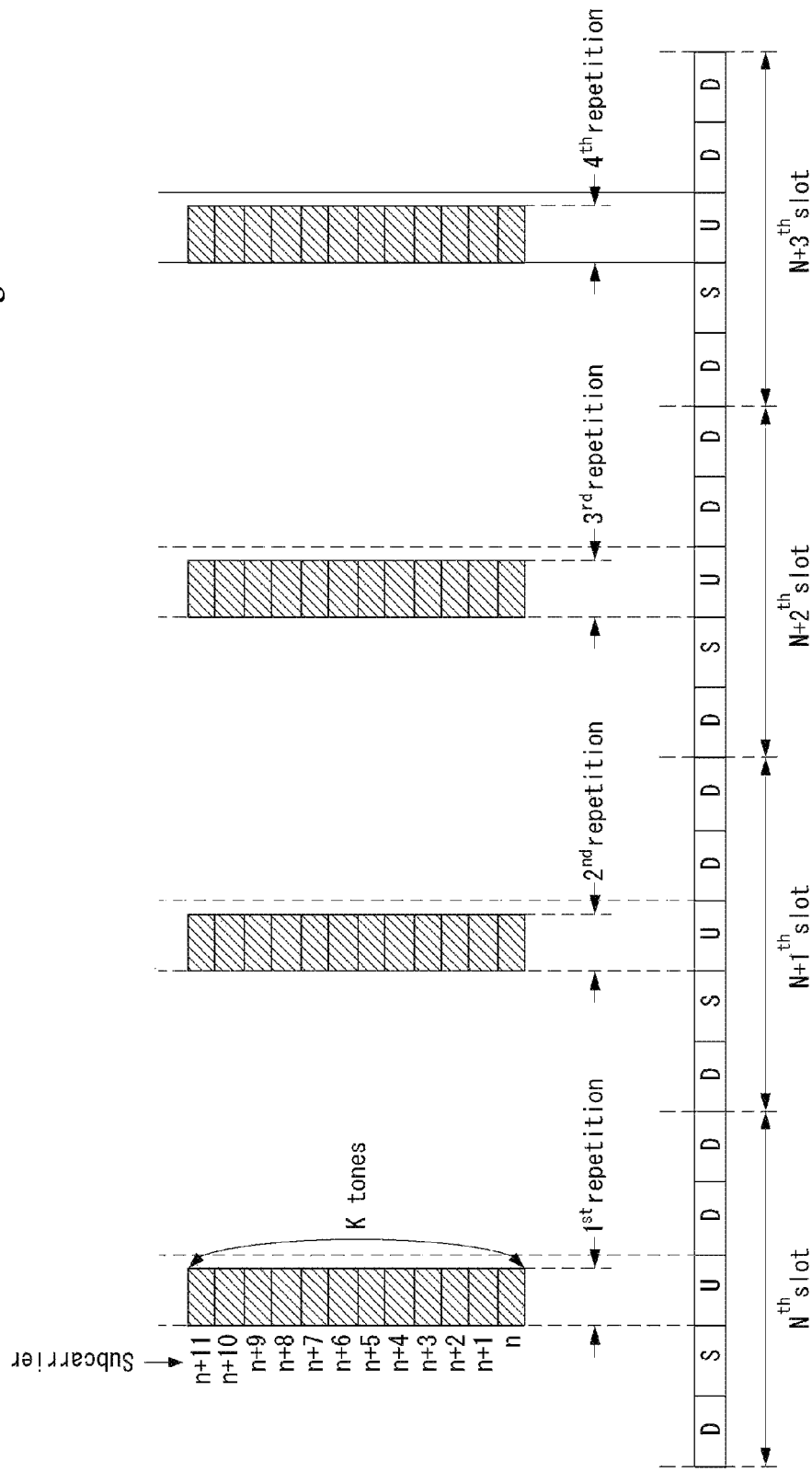
FIG. 31 illustrates an example of multi-tone NPRACH preamble transmission proposed by the present specification.

This transmission is illustrated as the following FIG. 31.

FIG. 31 illustrates an example of multi-tone NPRACH preamble transmission proposed by the present specification.

In this instance, the NPRACH preamble used in K tones may have a specific sequence form of length K.

For example, a sequence with a good PAPR performance, such as length-K ZC sequence, may be selected.

In addition, it may be configured such that a specific sequence and a scrambling sequence different from the specific sequence are multiplied by an element wise product to represent different sequences.

Characteristically, the scrambling sequence may select a sequence such as a PN sequence. If this method is used, contention free transmission is performed. Therefore, there is an advantage in that uplink synchronization can be adapted by using a less repetition number than the existing one using all the previously secured resources.

Embodiment 3

Embodiment 3 relates to NPRACH transmission using contiguous and non-contiguous triple tone.

Considering an example in which the triple tone is transmitted in the form in which contiguous and non-contiguous of the triple tone coexist, it is as follows. A starting subcarrier resource to which a first tone will be transmitted may be configured to select one among regions configured with SI, a second tone may be configured to be contiguously transmitted in increments of one tone from the first tone, and a third tone may be configured to be transmitted away from the second tone by a previously promised frequency spacing or a certain frequency spacing (e.g., 6 subcarrier spacings) configured with the SI.

If it goes beyond a configured frequency resource region, it may be configured to wrap-around in the frequency resource region.

In case of contiguous/non-contiguous multi-tone, multi-tone preambles of symbol groups forming a first hopping and a second hopping may be configured to be transmitted to one UL SF.

Figure 32:
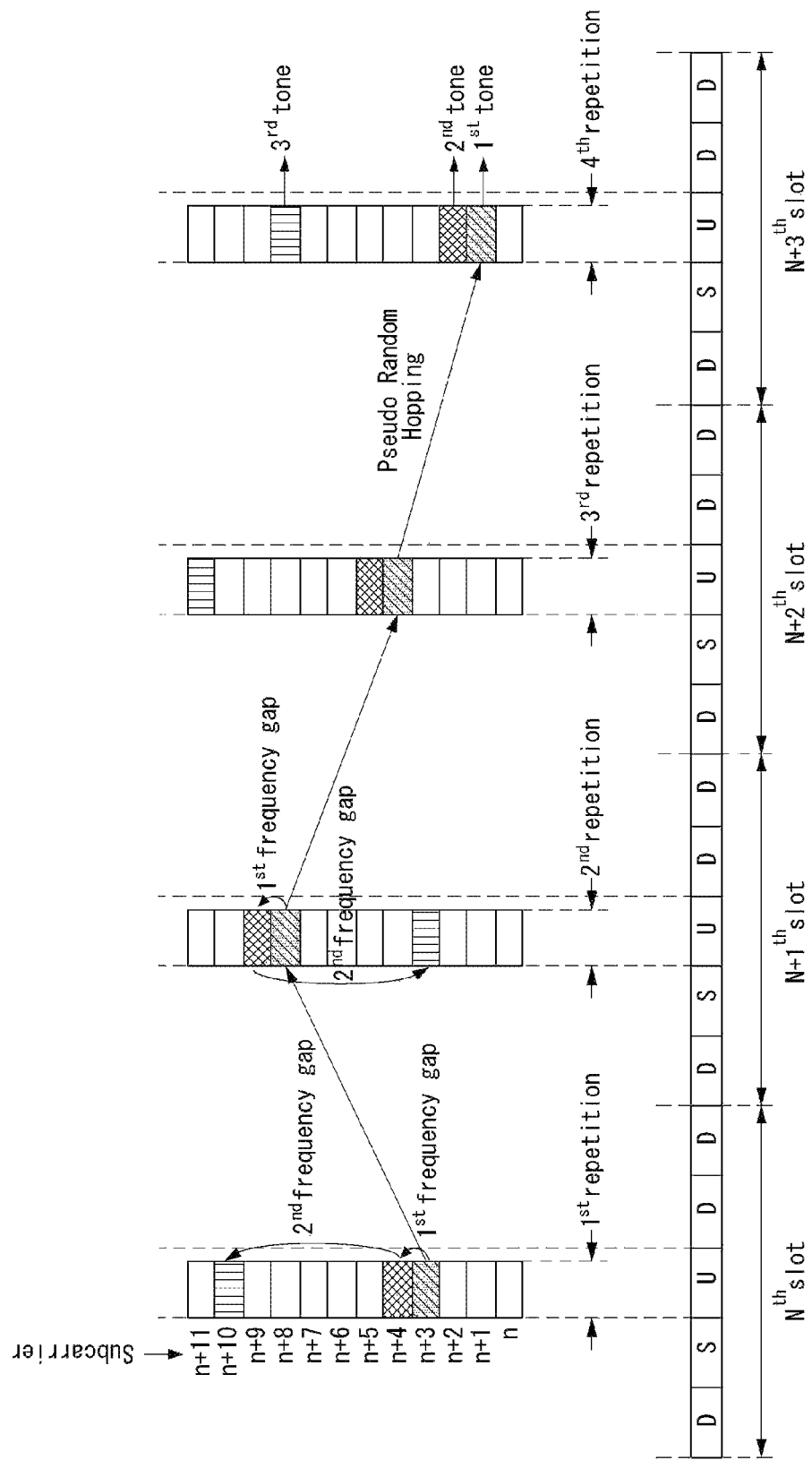
FIG. 32 illustrates another example of multi-tone NPRACH preamble transmission proposed by the present specification.

A contiguous/non-contiguous multi-tone scheme for the case of the Embodiment 2 of the Method 2 (a method for changing the number of symbols forming a symbol group of a NPRACH preamble to two) is illustrated as the following FIG. 32.

FIG. 32 illustrates another example of multi-tone NPRACH preamble transmission proposed by the present specification.

Referring to FIG. 32, a total of 12 subcarriers from a subcarrier n to a subcarrier n+11 have been allocated as frequency resources for a NPRACH preamble, and it illustrates how the NPRACH preamble is transmitted according to the situation of UL/DL configuration #2 of legacy LTE TDD.

If the NPRACH preamble is transmitted using this method, there is a disadvantage in terms of PAPR and resource allocation. However, an improvement of performance for preamble reception can be expected by additionally transmitting NPRACH symbols, of which transmission has been insufficient with only a single tone, with the multi-tone.

Embodiment 4

Embodiment 4 relates to different numerologies for multi-tone NPRACH preamble transmission.

In addition, considering an example in which a multi-tone is transmitted contiguously and non-contiguously, it is as follows.

At a timing at which a multi-tone (e.g., dual tone) is first transmitted contiguously, the multi-tone is transmitted using a relatively small subcarrier spacing (i.e., SCS). A starting subcarrier resource to which a first tone will be transmitted may be configured to select one among regions configured with SI, and a second tone may be configured to be contiguously transmitted in increments of one tone (one tone basis is configured with SCS) from the first tone.

At a timing at which a next multi-tone (e.g., dual tone) is transmitted, the multi-tone is transmitted using a relatively large subcarrier spacing (i.e., SCL). A starting subcarrier resource to which a first tone will be transmitted may be configured to select one among regions configured with SI, and a second tone may be configured to be contiguously transmitted in increments of one tone (one tone basis is configured with SCL) from the first tone.

Characteristically, the SCL may be M times the SCS. For example, the SCS may be 3.75 kHz, and the SCL may be 22.5 kHz that is six times the SCS. Further, when the multi-tone is transmitted using the SCL, the multi-tone may be configured to be transmitted applying a fractional offset.

In this instance, the fractional offset may select one among M (=SCL/SCS) values, and if M is an even number, the fractional offset may be determined as the following $\{-(0.5+(M/2-1))*SCS, -(0.5+(M/2-2))*SCS, \ldots, -(0.5+2)*SCS, -(0.5+1)*SCS, -(0.5+0)*SCS, +(0.5+0)*SCS, +(0.5+1)*SCS, +(0.5+2)*SCS, \ldots, +(0.5+(M/2-2))*SCS, +(0.5+(M/2-1))*SCS\}$.

Further, if M is an odd number, the fractional offset may be determined as the following $\{-(\lfloor M/2 \rfloor)*SCS, -(\lfloor M/2 \rfloor-1)*SCS, -(\lfloor M/2 \rfloor-2)*SCS, \ldots, -2*SCS, -SCS, 0, +SCS, +2*SCS, \ldots, +(\lfloor M/2 \rfloor-2)*SCS, +(\lfloor M/2 \rfloor-1)*SCS, +(\lfloor M/2 \rfloor)*SCS\}$.

More specifically, for example, if the SCS is 3.75 kHz and the SCL is 22.5 kHz, 3.75 kHz subcarrier spacing may come into 22.5 kHz subcarrier spacing 6 times. Therefore, M is 6, and one value among {−9.375 kHz, −5.625 kHz, −1.875 kHz, +1.875 kHz, +5.625 kHz, +9.375 kHz} from the center of the 22.5 kHz subcarrier spacing is selected and is determined as the fractional offset. The multi-tone may be configured to be transmitted moving by the fractional offset from the center of the subcarrier spacing.

In this instance, the fractional offset may be configured to be selected at the same location as the starting subcarrier resource, to which the first tone will be transmitted, when the multi-tone is transmitted using the SCS. This transmission method is illustrated as the following FIG. 33.

Figure 33:
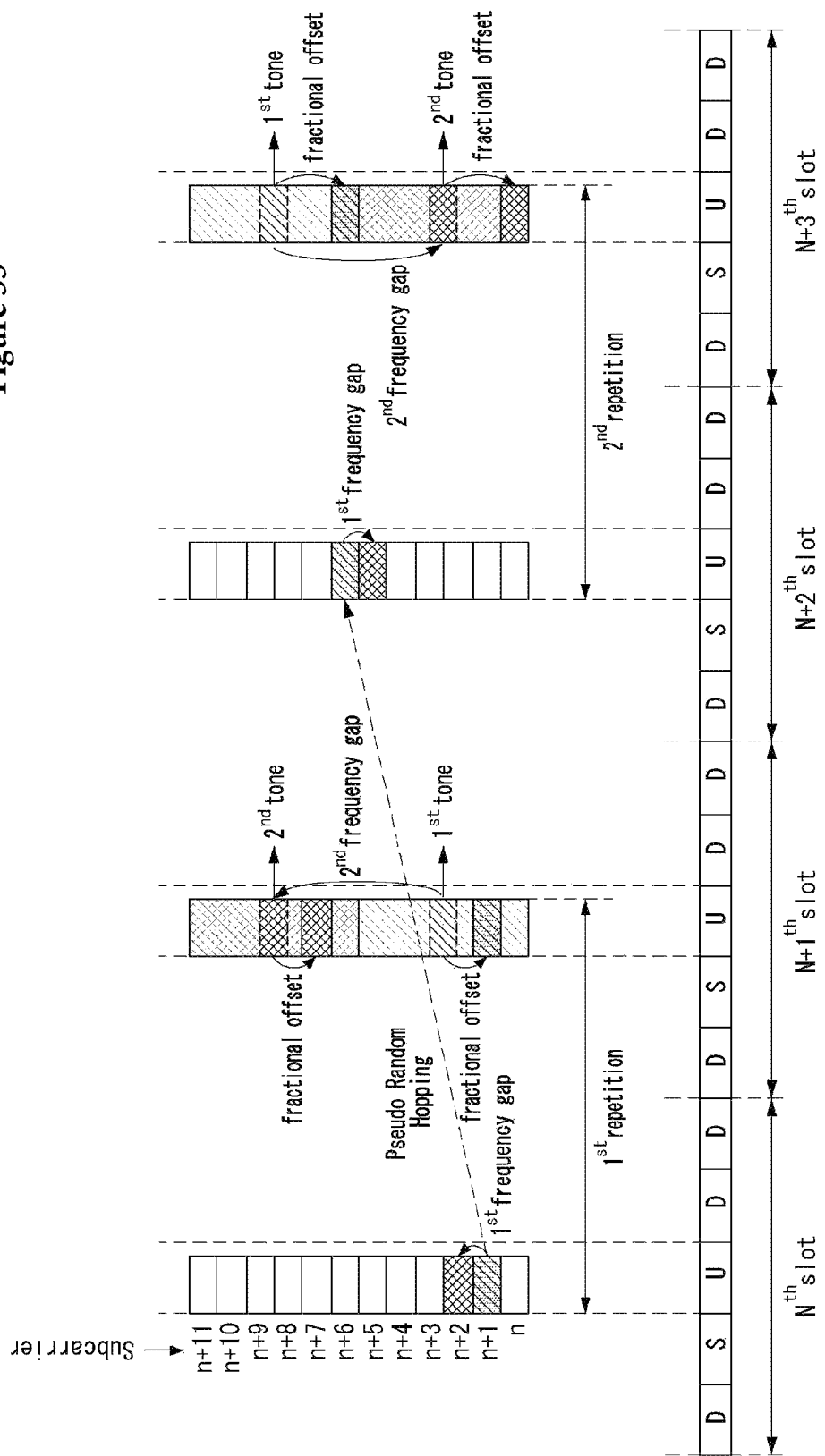
FIG. 33 illustrates another example of multi-tone NPRACH preamble transmission proposed by the present specification.

FIG. 33 illustrates another example of a multi-tone NPRACH preamble transmission proposed by the present specification.

Figure 34:
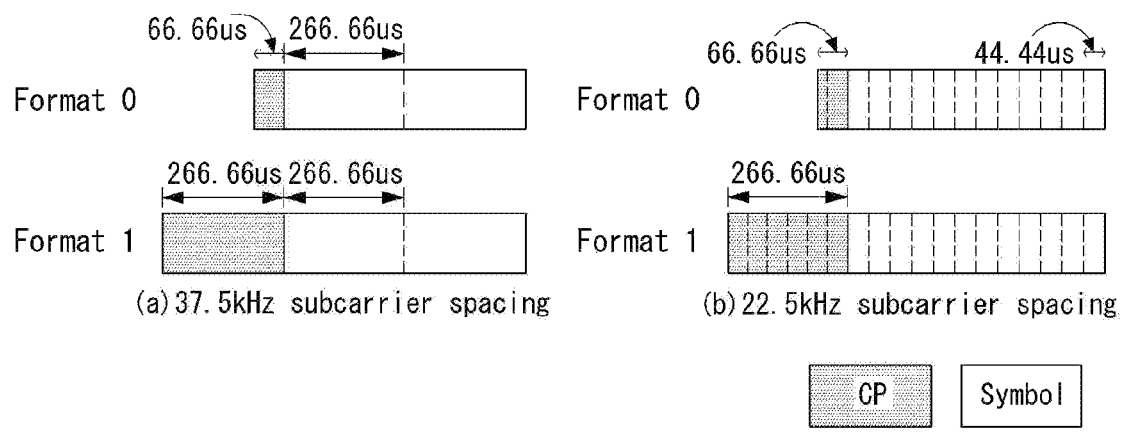
FIG. 34 illustrates another example of a NPRACH preamble format proposed by the present specification.

In addition, a symbol group corresponding to an example of using different numerologies is illustrated as the following FIG. 34.

FIG. 34 illustrates another example of a NPRACH preamble format proposed by the present specification.

Referring to FIG. 34, when 3.75 kHz subcarrier spacing is used, the number of symbols forming a symbol group is 2, and one CP comes into the 3.75 kHz subcarrier spacing.

Further, when 22.5 kHz subcarrier spacing is used to adapt a total length of preamble per each format, the number of symbols forming a symbol group is 12 that is M times greater than the 3.75 kHz subcarrier spacing, and a CP of the same length as used in the above preamble comes into the 22.5 kHz subcarrier spacing.

Characteristically, the corresponding CP may be configured to consist of several symbols.

(Method 6)

Method 6 relates to short NPRACH preamble transmission for a TDD NB-IoT system.

In addition, considering a NPRACH short format even in TDD of NB-IoT for similar reasons to why the NPRACH short format is implemented in TDD of legacy LTE, it is as follows.

The NPRACH short format may be considered for a TDD cell with a very small coverage and may be configured to be transmitted within symbols (i.e., the number of UpPTS symbols configured via a SIB) forming an UpPTS or in one UL subframe. In this instance, the corresponding preamble may be transmitted with a single-tone, or transmitted with a multi-tone. Hereinafter, the Method 6 is described in more detail by way of example.

Embodiment 1

Figure 35:
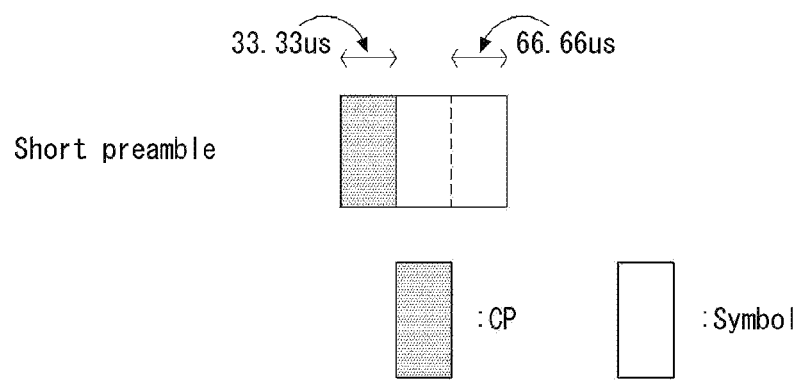
FIG. 35 illustrates an example of a short NPRACH preamble format proposed by the present specification.

For example, considering a NPRACH format that can be transmitted within UpPTS 3 symbols, as illustrated in FIG. 35, the NPRACH format may be configured to have 15 kHz subcarrier spacing and consist of two symbols of 66.66 us and a CP of 33.33 us.

FIG. 35 illustrates an example of a short NPRACH preamble format proposed by the present specification.

Even in this case, similar to the above methods, an implicit guard time may be configured to be longer than a CP length, in order to maintain a cell coverage due to the CP length.

That is, because a sum of lengths of a symbol group and the CP is 166.65 us (i.e., 66.66*2+33.33 (us)) and a length of the UpPTS 3 symbols is 214 us (i.e., 71.33*3 (us)), the implicit guard time is 47.33 us and the cell coverage due to the CP length can be maintained.

Figure 36:
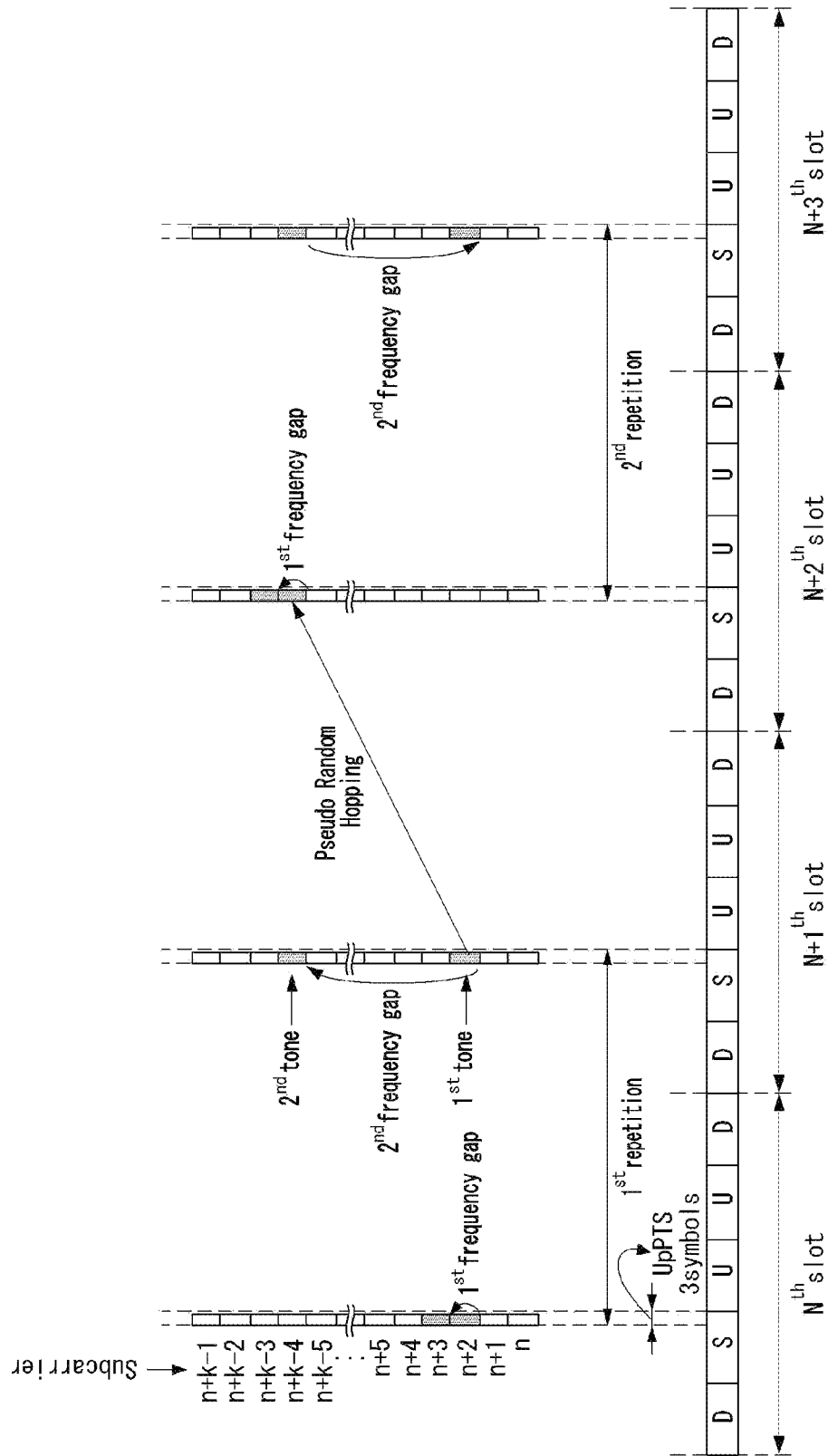
FIG. 36 illustrates another example of multi-tone NPRACH preamble transmission proposed by the present specification.

If a short NPRACH preamble is transmitted with a multi-tone (e.g., dual tone) and the multi-tone is a continuous/discontinuous dual tone scheme, it may be illustrated as the following FIG. 36.

FIG. 36 illustrates another example of multi-tone NPRACH preamble transmission proposed by the present specification.

Referring to FIG. 36, a total of k subcarriers from a subcarrier n to a subcarrier n+k−1 have been allocated as frequency resources for the short NPRACH preamble, and it illustrates how the NPRACH preamble is transmitted according to the situation of UL/DL configuration #1 of legacy LTE TDD.

A first frequency gap has a frequency gap equivalent to a subcarrier spacing in a continuous dual tone scheme, and a second frequency gap has a frequency gap equivalent to 6*subcarrier spacing in a discontinuous dual tone scheme.

If the short NPRACH preamble is transmitted using this method, there is a disadvantage in terms of PAPR. However, there is an advantage of a reduction in a latency for uplink synchronization of a UE that is included in a small cell coverage area controlled by the corresponding base station, or UEs close to the base station.

There is an advantage in that consecutive UL subframes can be allocated for NPRACH preamble transmission of other UEs by configuring the UEs close to the base station to be able to use a preamble with such a short length in a special subframe.

Embodiment 2

Figure 37:
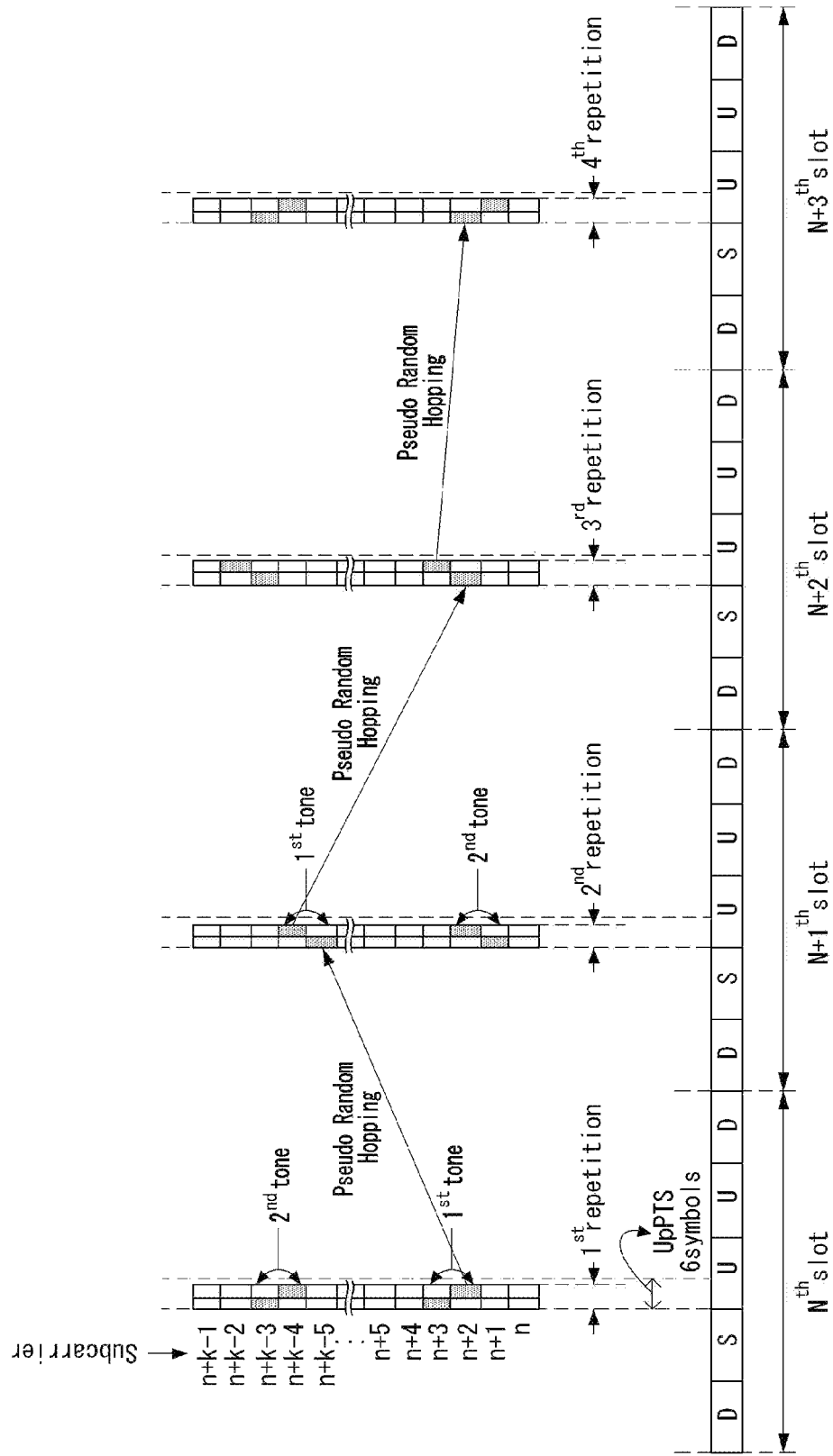
FIG. 37 illustrates another example of multi-tone NPRACH preamble transmission proposed by the present specification.

In addition, considering that the short NPRACH preamble format mentioned in FIG. 35 is transmitted within UpPTS 6 symbols, it is illustrated as the following FIG. 37.

Even in this case, similar to the above methods, an implicit guard time may be configured to be longer than a CP length, in order to maintain a cell coverage due to the CP length.

That is, if it is considered that a sum of lengths of a symbol group and a CP is 166.66 us (i.e., 66.66*2+33.33 (us)) and two symbol groups and the CP are consecutively transmitted, a sum of lengths of the two symbol groups and the CP may be 333.33 us, and a length of the UpPTS 6 symbols may be 428 us (i.e., 71.33*6 (us)). Therefore, the implicit guard time is 94.66 us, and the cell coverage due to the CP length can be maintained.

Referring to FIG. 37, a total of k subcarriers from a subcarrier n to a subcarrier n+k−1 have been allocated as frequency resources for a short NPRACH preamble, and it illustrates how the NPRACH preamble is transmitted according to the situation of UL/DL configuration #1 of legacy LTE TDD.

FIG. 37 illustrates another example of multi-tone NPRACH preamble transmission proposed by the present specification.

Similar to the Embodiment 1 of the Method 5 mentioned above, it may be considered that a first hopping of a legacy NPRACH is maintained as it is, and a second hopping appears as a dual tone.

In this case, a unit of repetition may be configured as a dual tone of two consecutive symbol groups, and may be configured to determine a tone to which a first tone will move through a pseudo random hopping and transmit a second tone away from the first tone by a certain frequency spacing as mentioned above. If it goes beyond a configured frequency resource region, it may be configured to wrap-around in the frequency resource region.

If the short NPRACH preamble is transmitted using this method, there is a disadvantage in terms of PAPR. However, there is an advantage of greatly reducing a latency for uplink synchronization of a UE that is included in a small cell coverage area controlled by the corresponding base station, or UEs close to the base station.

There is an advantage in that consecutive UL subframes can be allocated for NPRACH preamble transmission of other UEs by configuring the UEs close to the base station to be able to use a preamble with such a short length in a special subframe.

This embodiment has described the non-contiguous transmission as an example, but it is obvious that this embodiment can apply a concept similar to this to contiguous multi-tone NPRACH preamble transmission.

(Method 7)

Method 7 is to reuse a FDD NPRACH preamble format in a TDD NB-IoT system.

A shape of a NPRACH preamble that has been used in FDD is the same as FIG. 9 mentioned above.

It may be considered that the NPRACH preamble of the FDD is used as it is, but a specific portion (e.g., symbol boundary) of the NPRACH preamble is cut and is transmitted in each UL subframe.

In this instance, a method for transmitting the NPRACH preamble according to U/D configuration (i.e., according to the number and a combination of consecutive UL subframes) using a preamble corresponding to format 1 may be differently configured, and is illustrated as the following FIGS. 38 to 41.

That is, FIGS. 38 to 41 respectively illustrate other examples of NPRACH preamble transmission proposed by the present specification.

If this method is used, it is easy to detect the preamble because more energy is transmitted to the same tone. Further, because a numerology such as a CP length and a subcarrier spacing is the same as a FDD preamble, it may be a benefit in terms of cell coverage.

However, there may be a latency problem due to an increase in a unit of a single repetition. However, even if there is a loss in terms of latency due to characteristics of the NB-IoT system with many fixed UEs, it may be appropriate to use the corresponding method.

Even if the same effect can be obtained using format 0, the use of the format 1 with the long CP length may be more desirable for this method.

Characteristically, as illustrated in FIGS. 42 to 45, it may be configured so that the UE transmits the NPRACH preamble by delaying it by X us (e.g., 266.66 us).

In this instance, characteristically, a specific time duration (X) value may be an integer multiple of a length of each symbol constituting the NPRACH preamble.

FIGS. 42 to 45 respectively illustrate other examples of NPRACH preamble transmission proposed by the present specification.

In addition, it may be considered a transmission method using as it is the transmission format corresponding to the case where the number of consecutive UL SFs is one even in the U/D configuration in which consecutive UL SFs exist.

Figure 38:
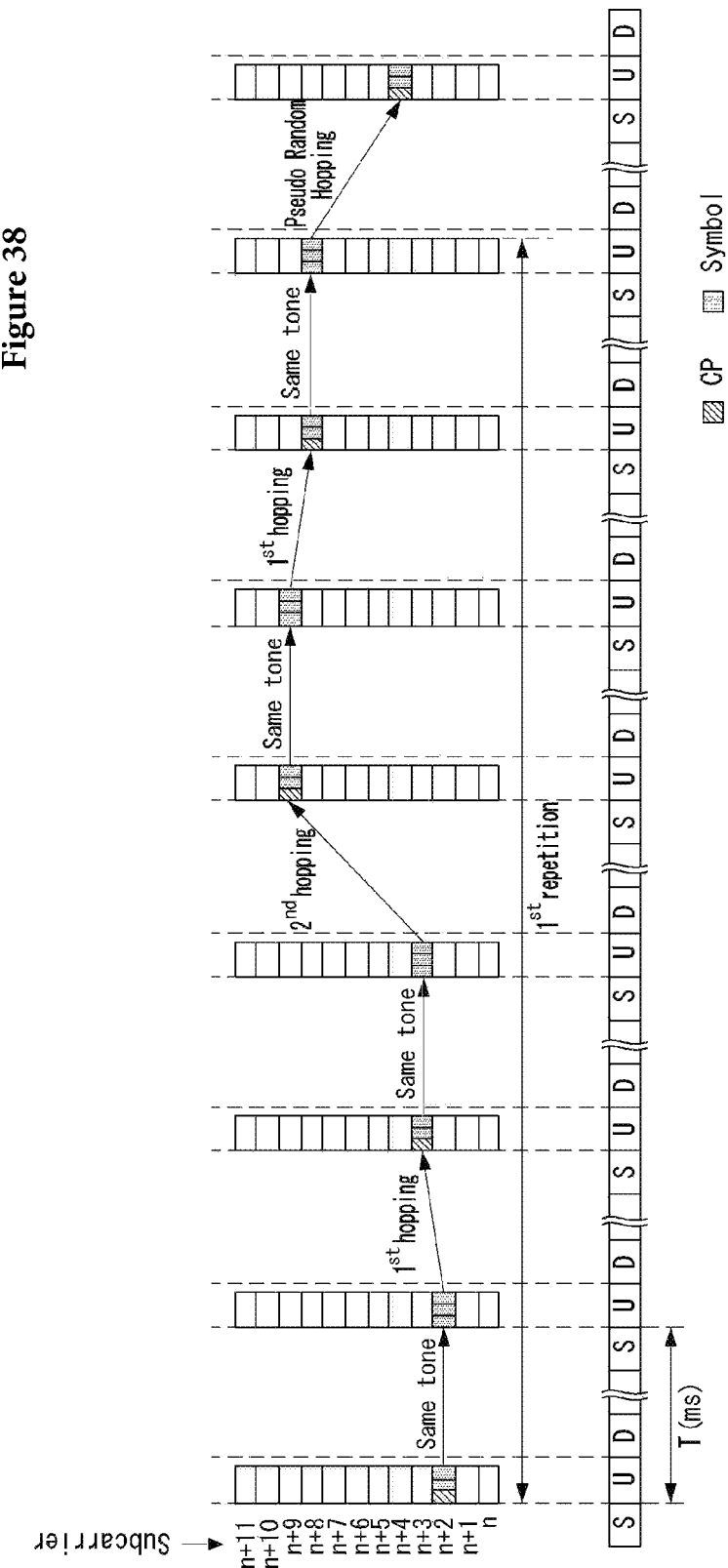
FIGS. 38 to 41 respectively illustrate other examples of NPRACH preamble transmission proposed by the present specification.
Figure 39:
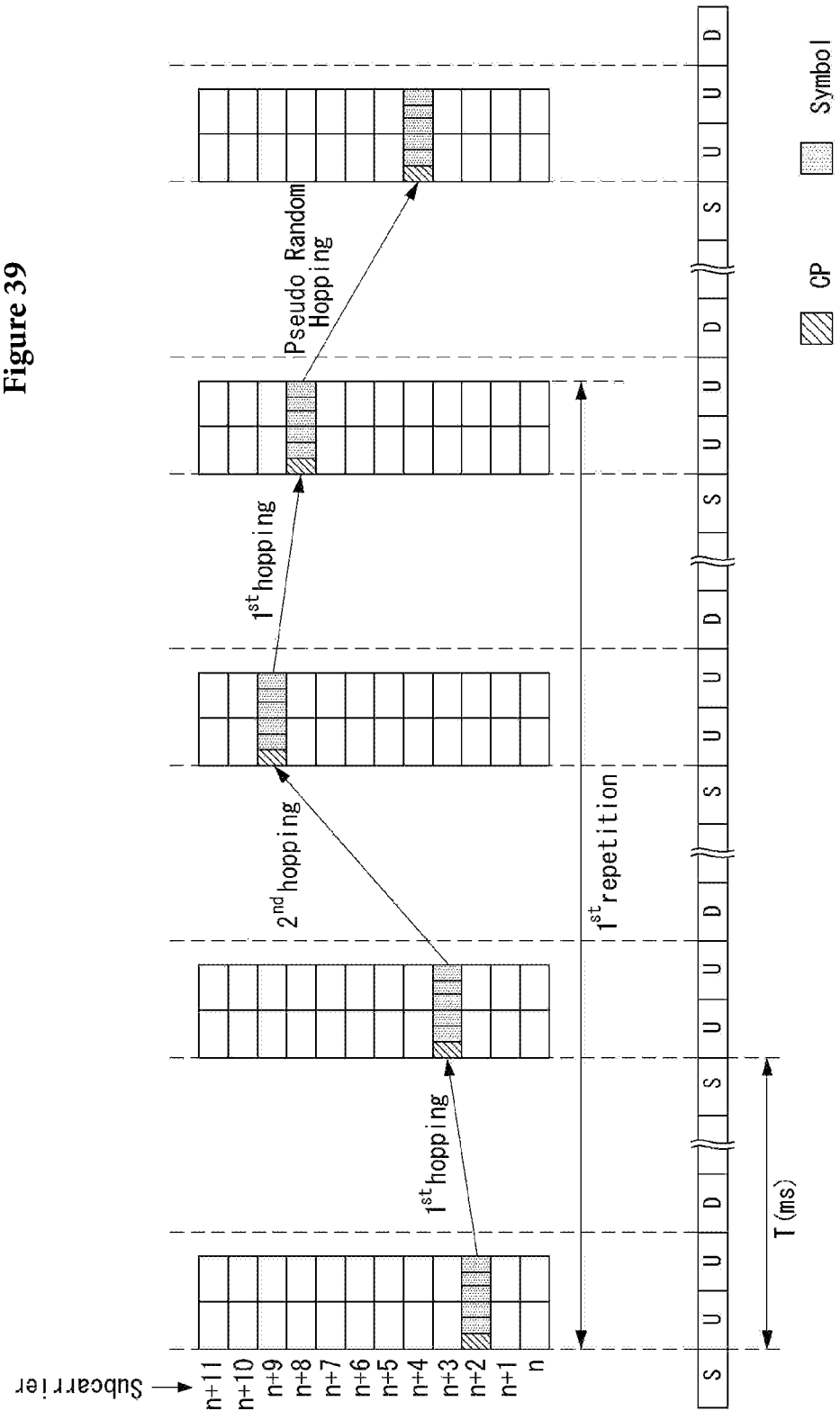
Figure 40:
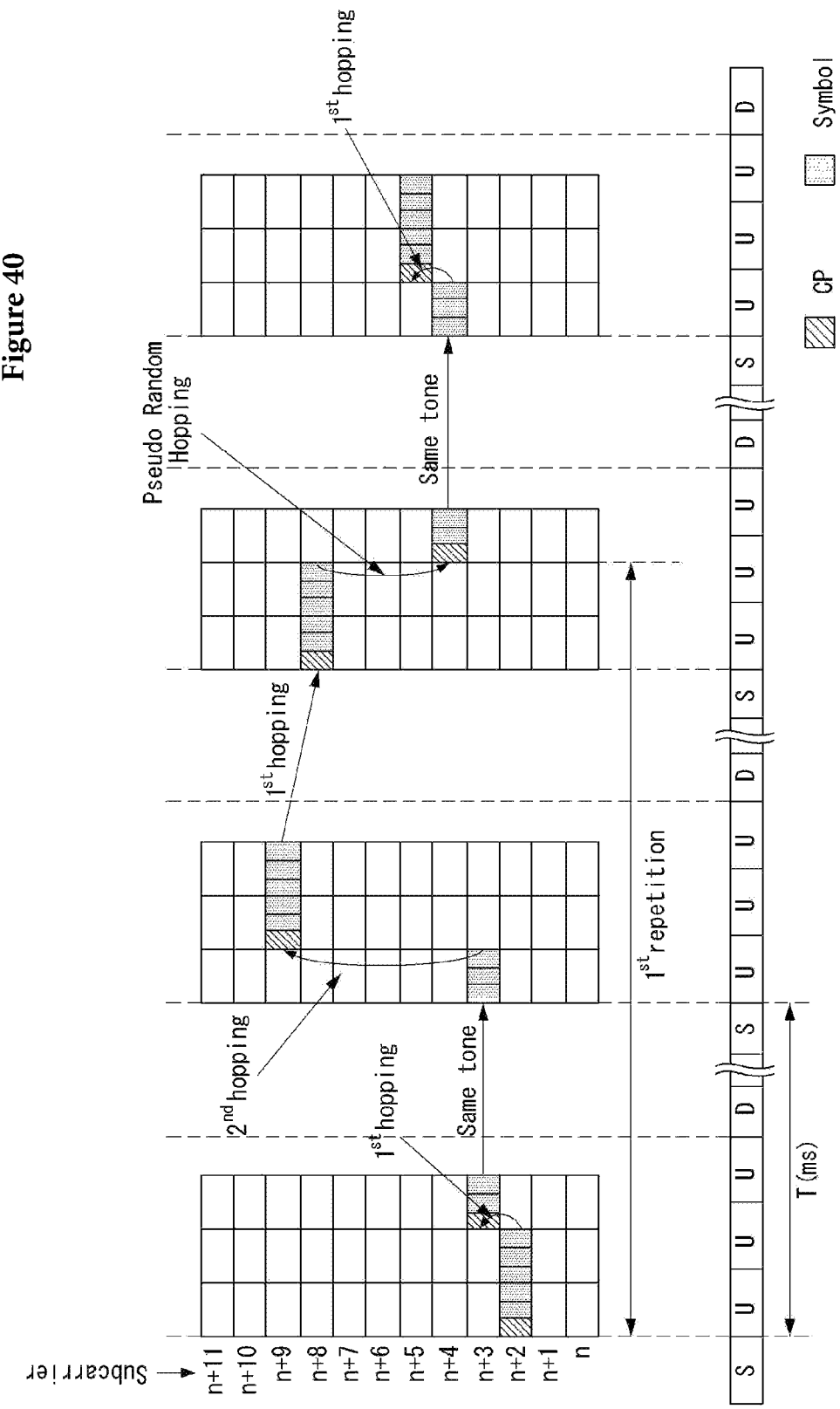
Figure 41:
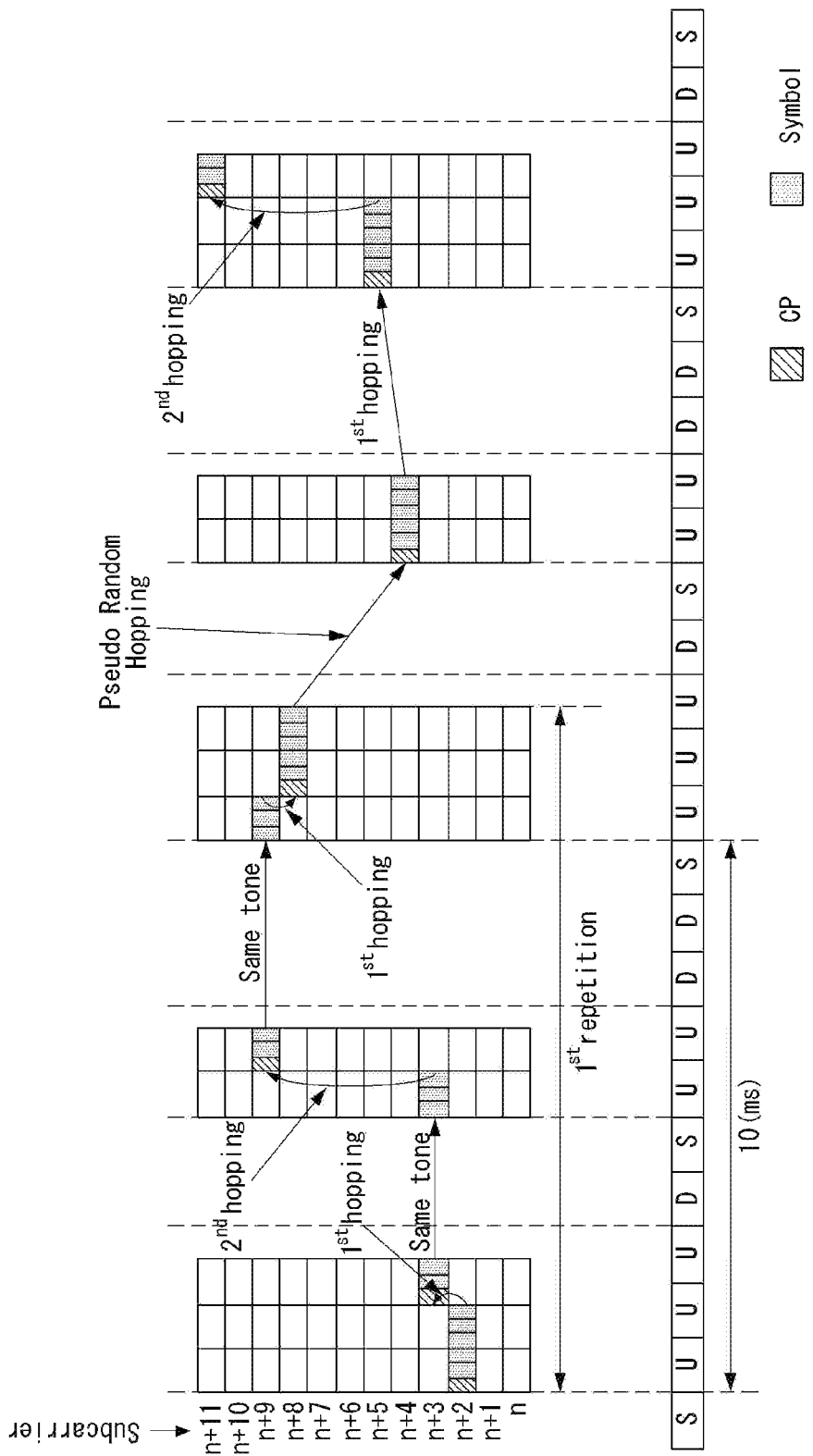
Figure 42:
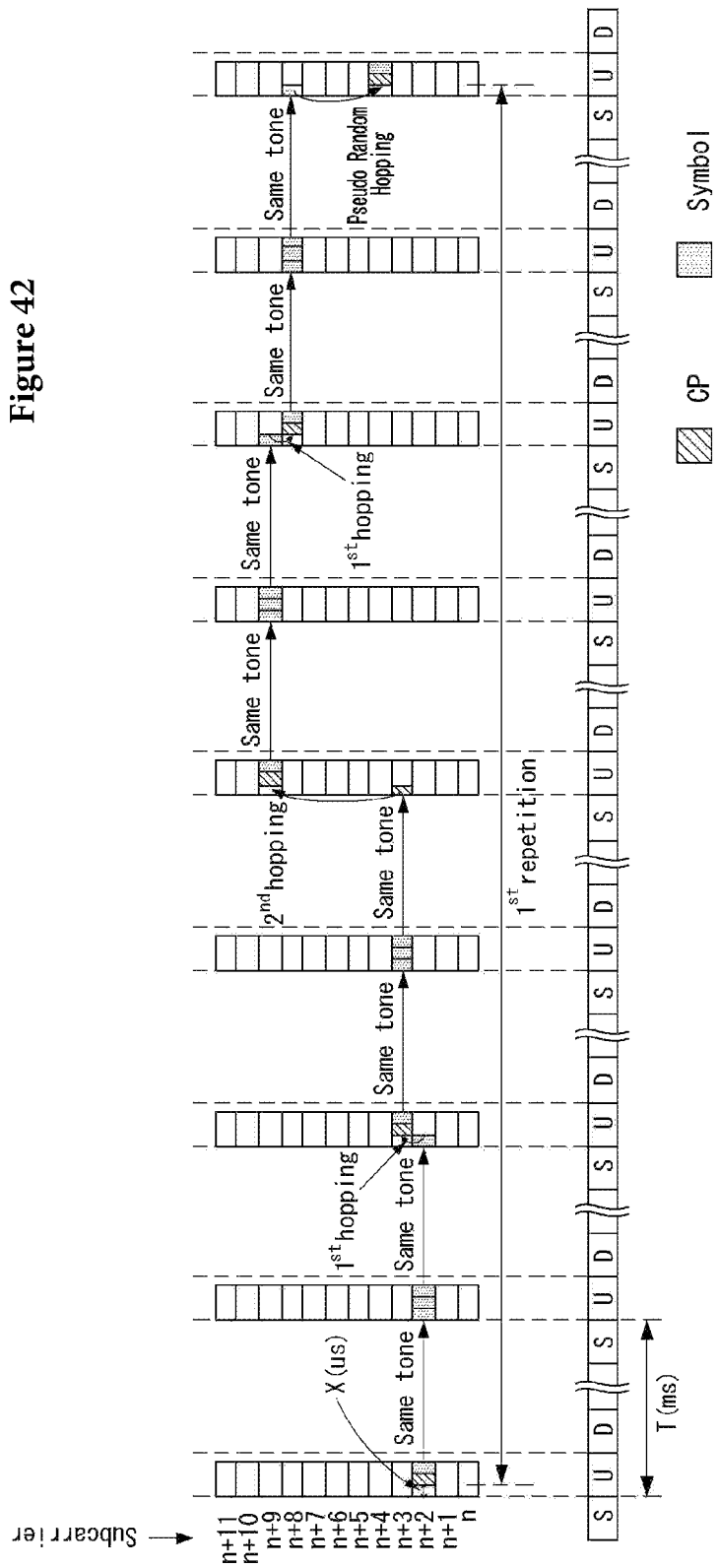
FIGS. 42 to 45 respectively illustrate other examples of NPRACH preamble transmission proposed by the present specification.
Figure 43:
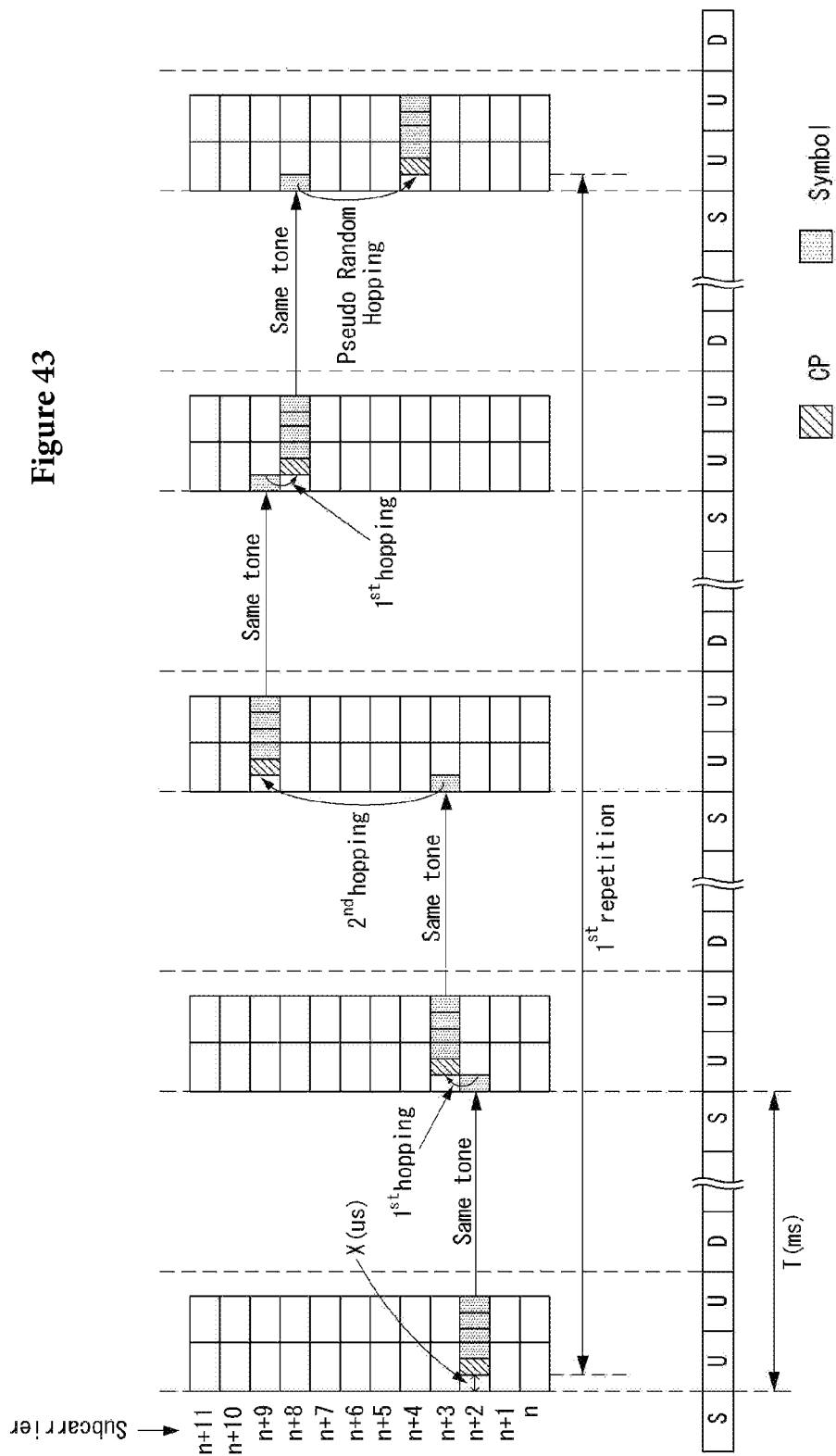
Figure 44:
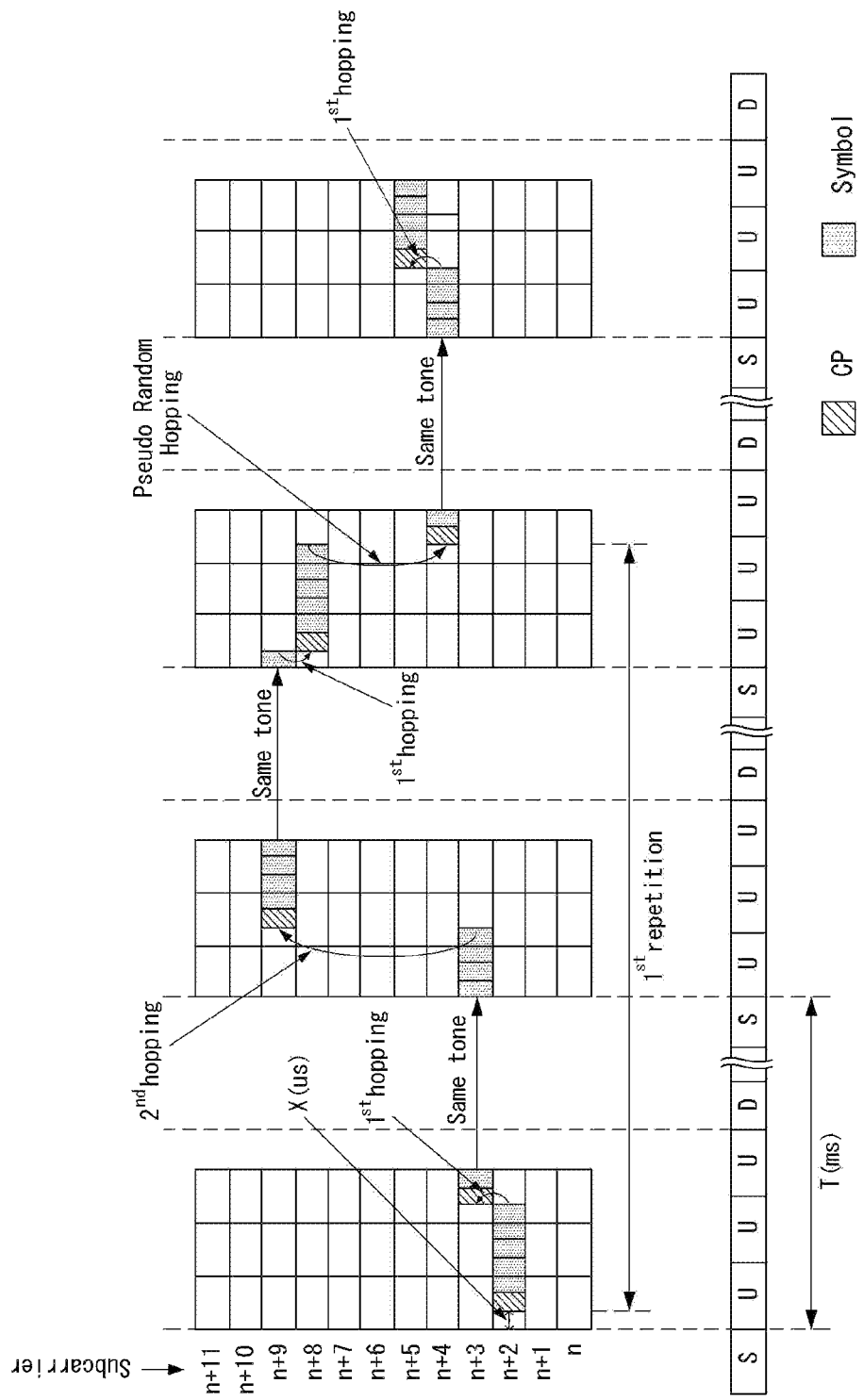
Figure 45:
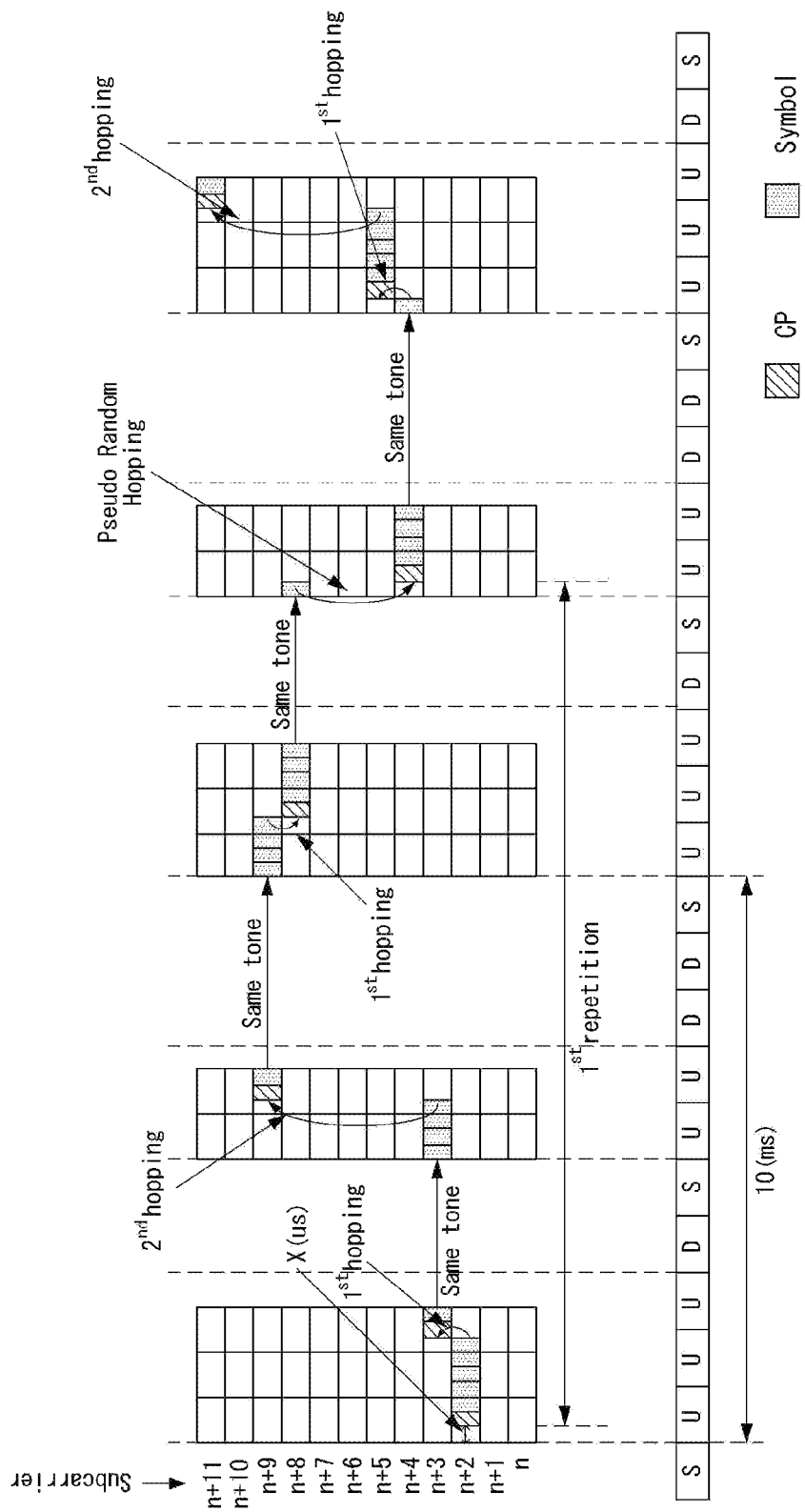
Figure 46:
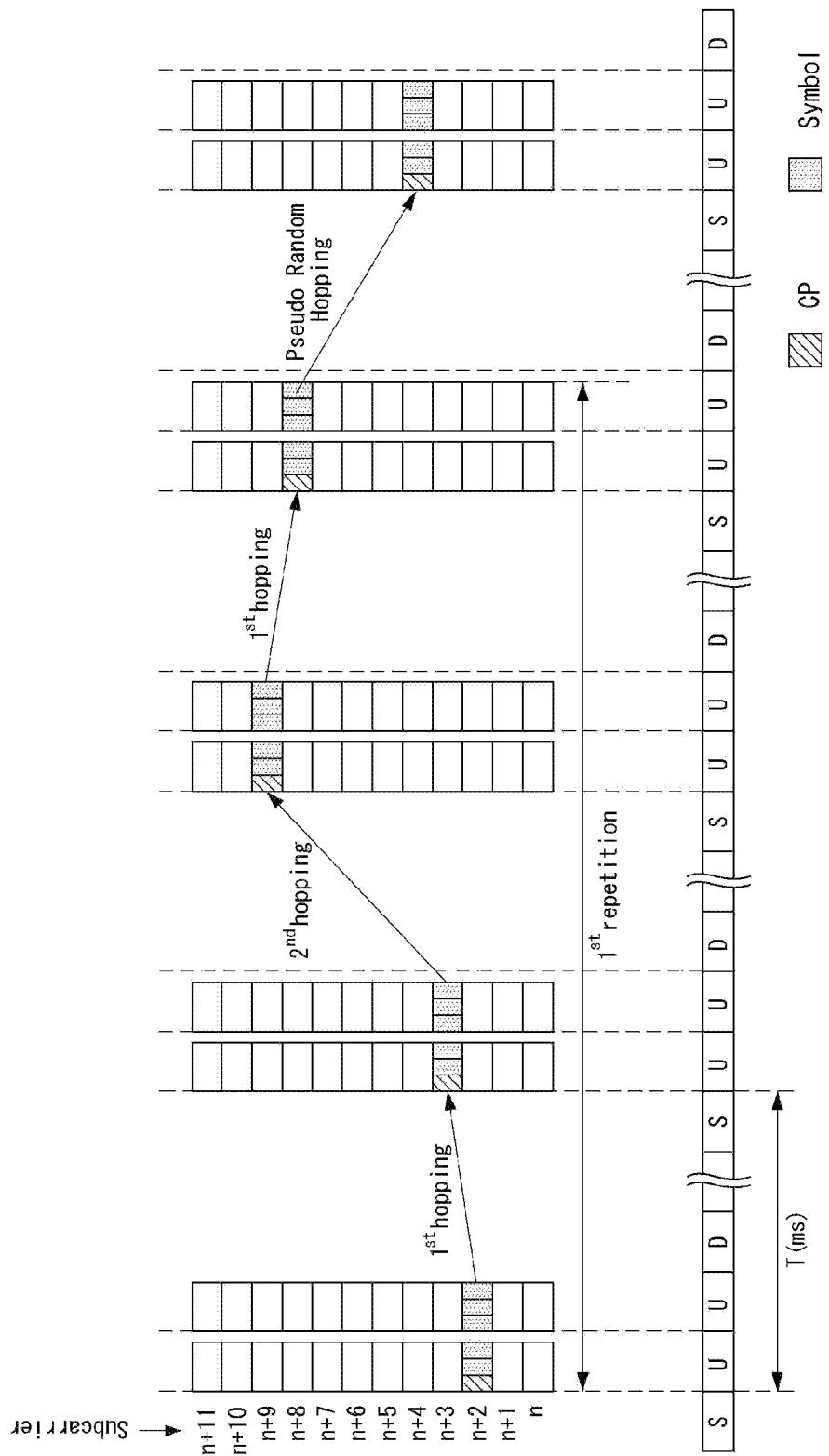
FIG. 46 illustrates another example of NPRACH preamble transmission proposed by the present specification.

That is, an example in which two consecutive UL SFs exist based on FIG. 38 may be illustrated as the following FIG. 46.

FIG. 46 illustrates another example of NPRACH preamble transmission proposed by the present specification.

Even when this method is used, the NPRACH preamble may be transmitted by delaying it by a specific time duration. In this instance, the X value may be an integer multiple of a length of each symbol constituting the NPRACH preamble.

In addition, it is obvious that a principle of the method can be used even in a different subcarrier spacing, a different number of symbols in a symbol group, a different symbol duration, and a different CP length from the FDD NPRACH preamble.

(Method 8)

Method 8 relates to a transmission method by combining NPRACH preamble transmission related multi-tone and single tone.

That is, the Method 8 is one of methods obtained by combining the above proposed methods and is a transmission method while repeating multi-tone transmission and single tone transmission.

Characteristically, it is contemplated to use contiguous multi-tone in the multi-tone transmission. This is because it is advantageous to use contiguous tones in terms of PAPR.

When this method is used, there is an advantage in terms of latency because a single repetition duration is shorter than when only the single tone is used.

Figure 47:
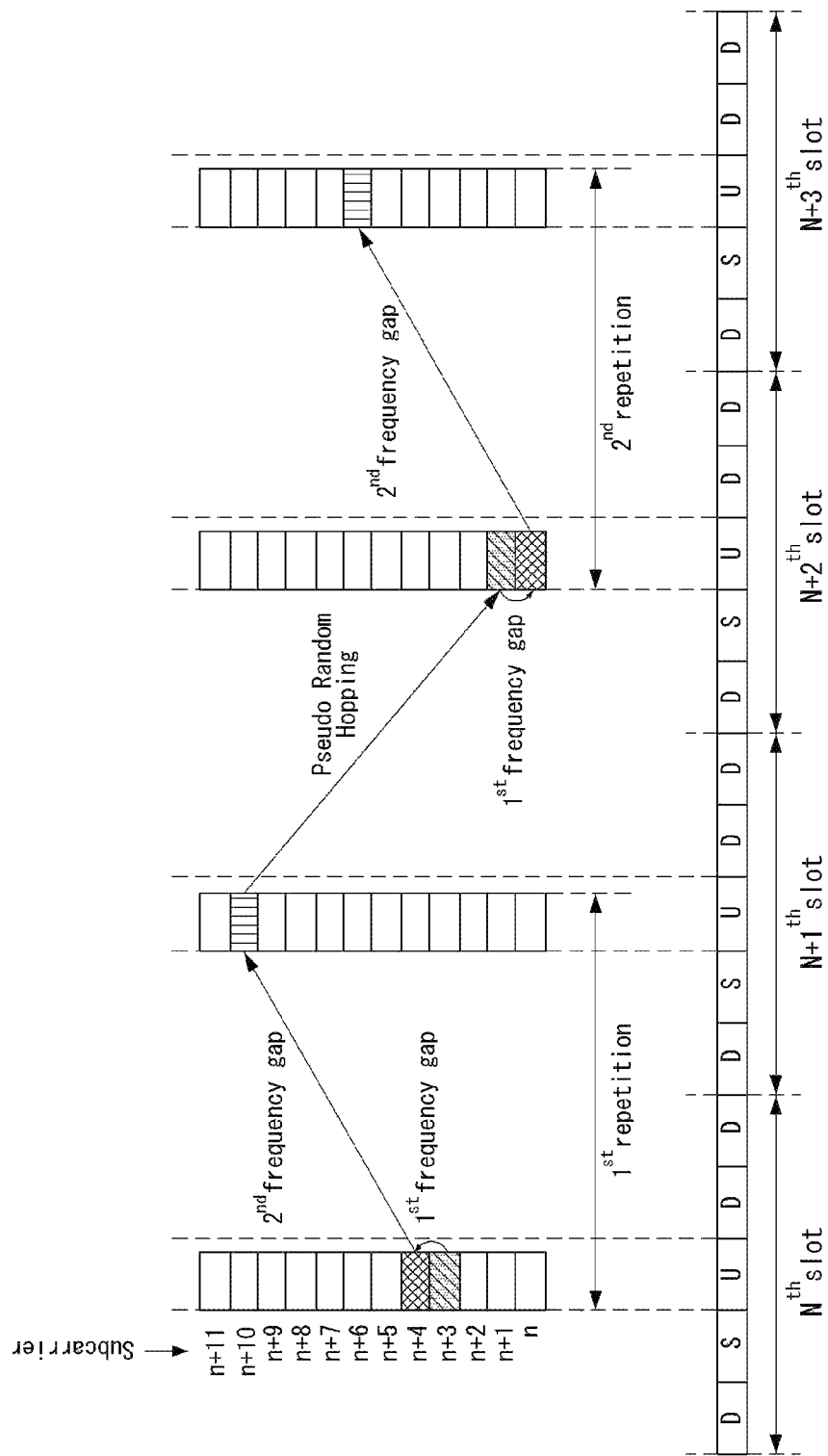
FIG. 47 illustrates another example of NPRACH preamble transmission proposed by the present specification.

A combination (multi-tone+single tone) transmission method of the multi-tone transmission and the single tone transmission for the case of the Embodiment 2 of the Method 2 (method for changing the number of symbols forming a symbol group of a NPRACH preamble to two) is illustrated as the following FIG. 47.

FIG. 47 illustrates another example of NPRACH preamble transmission proposed by the present specification.

In addition, it is obvious that a principle of the method can be used even in a different subcarrier spacing, a different number of symbols in a symbol group, a different symbol duration, and a different CP length from the FDD NPRACH preamble.

(Method 9)

Method 9 relates to comb type multi-tone transmission of a NPRACH preamble, wherein one symbol group includes K symbols.

That is, the Method 9 may arrange multi-tone in a comb type at intervals of K tones and may consider that K tones are repeated in the same form in a symbol group.

Because the method uses the same subcarrier spacing but shows a similar shape to using different numerologies, there is an advantage in a multi-tone case having a frequency gap of two or more tones.

Figure 48:
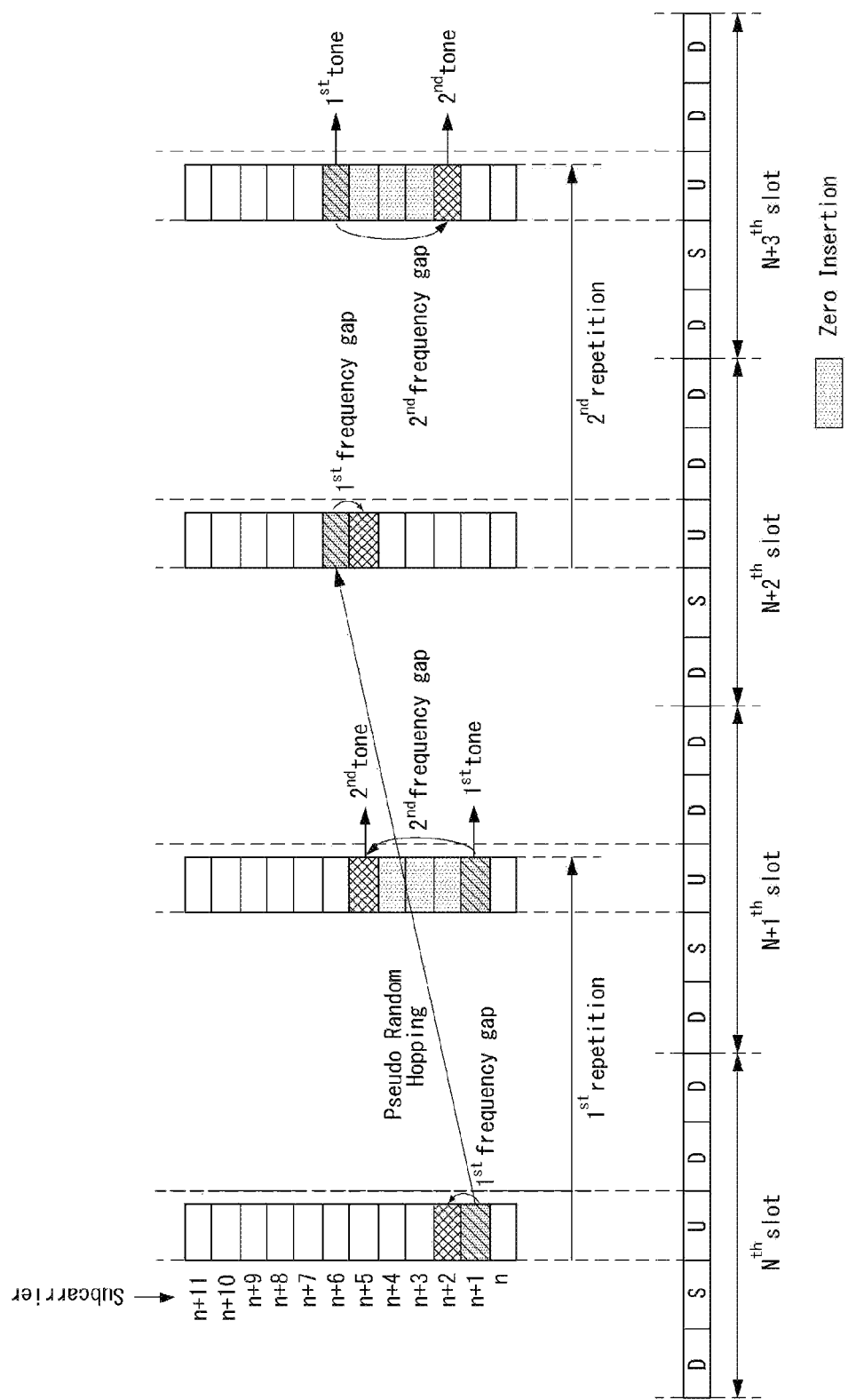
FIG. 48 illustrates another example of NPRACH preamble transmission proposed by the present specification.

A comb type multi-tone method for the case of the Embodiment 2 of the Method 2 (method for changing the number of symbols forming a symbol group of a NPRACH preamble to two) may be illustrated as the following FIG. 48.

FIG. 48 illustrates another example of NPRACH preamble transmission proposed by the present specification.

Figure 49:
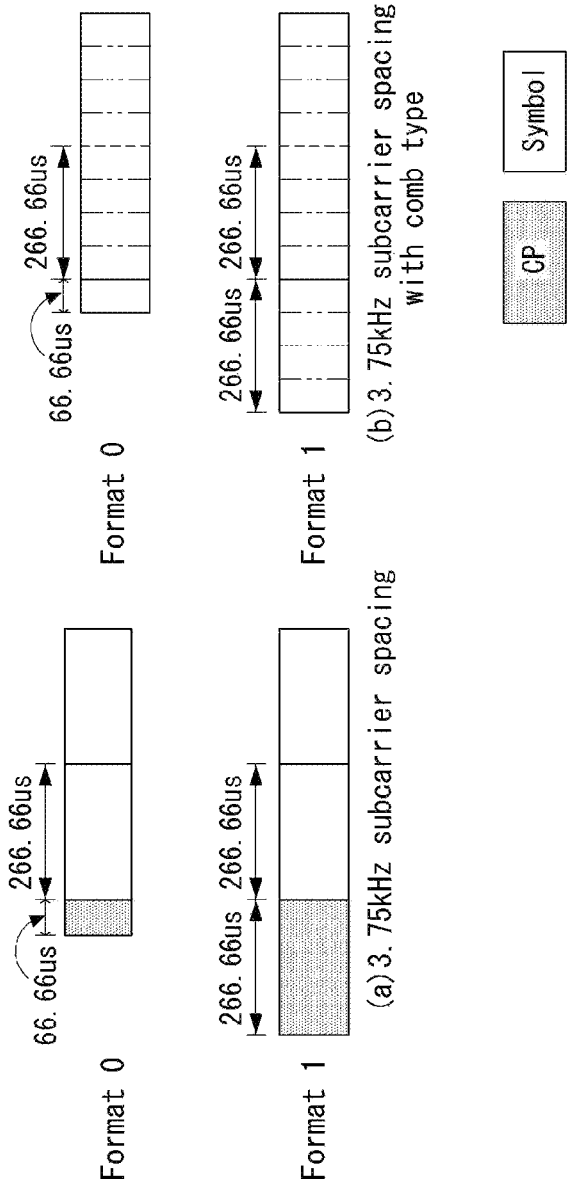
FIG. 49 illustrates an example of a symbol group shape according to FIG. 48.

In this instance, a symbol group shape may be illustrated as the following FIG. 49.

FIG. 49 illustrates an example of a symbol group shape according to FIG. 48.

In addition, the methods of changing the subcarrier spacing among the above-mentioned methods consider that a first hopping spacing and a second hopping spacing are also increased.

To overcome a shortage phenomenon of frequency resources generated in this case, a method, in which the second hopping spacing is not changed even if the first hopping spacing is changed, may be introduced.

More specifically, in a legacy NPRACH preamble, a subcarrier spacing is 3.75 kHz, the first hopping spacing is 3.75 kHz, and the second hopping spacing is 22.5 kHz (=6*3.75 kHz).

In this instance, if the subcarrier spacing is increased to 7.5 kHz by two times, the second hopping spacing may be configured to be held at 22.5 kHz (3*7.5 kHz) even if the first hopping spacing is 7.5 kHz.

Furthermore, the first hopping spacing (or first frequency gap) does not need to be always equal to the subcarrier spacing. The first hopping spacing may have a spacing equivalent to a certain specific partial subcarrier spacing less than the subcarrier spacing, or may be greater than the subcarrier spacing.

The second hopping spacing (or second frequency gap) does not need to be always held at six times the subcarrier spacing or 22.5 kHz. It is obvious that the second hopping spacing may be greater or less than the corresponding value.

In addition, the above-mentioned methods may consider a method of interchanging the first hopping spacing and the second hopping spacing.

If four symbol groups are included in one repetition unit and are called T1, T2, T3, and T4, respectively, a method of interchanging the transmission order (i.e., frequency resource location) between symbol groups may be considered as illustrated in FIG. 50.

Because T2 and T3 are TDD in the above presented methods, the number of consecutive UL SFs is insufficient, which inevitably causes UL SFs to be transmitted non-consecutively.

When such a method is used, there may be a difference in a second hopping spacing (e.g., 6*subcarrier spacing) between consecutively transmitted symbol groups, and there may be a difference in a first hopping spacing (e.g., subcarrier spacing) between non-consecutively transmitted symbol groups.

Because the second hopping affects accuracy compared to the first hopping, it may be advantageous in terms of performance upon consecutive transmission.

FIG. 50 illustrates an example of a method of interchanging the transmission order between symbol groups of a NPRACH preamble proposed by the present specification.

In FIG. 50, an option A is a method of interchanging T2 and T3, an option B is a method of interchanging T1 and T3, and an option C is a method of interchanging T1 and T4.

In addition, two or more NPRACH preamble formats may be made as in the legacy NB-IoT and may be configured per CE level by the base station. However, the base station may be configured to independently configure a numerology and a CP length of a NPRACH preamble, the number of symbols in a symbol group, etc. according to the CE level.

That is, it may be configured such that the base station configures each of the above presented methods to the UE per each CE level, and the UE itself selects and transmits a NPRACH preamble according to the CE level of the UE.

Further, the base station may be configured to configure frequency resources not to overlap each other per CE level (or per NPRACH format).

In addition, multi-tone resources capable of transmitting a multi-tone NPRACH preamble are defined so that they do not overlap other multi-tone resources even in one tone, and thus it may be configured so that there is no ambiguity when the base station performs the NPRACH preamble detection.

Further, code division multiplexing (CDM) between the UEs needs to be considered by scrambling a different value on each tone considering the multi-tone NPRACH preamble, and a sequence that is usable in this case may be configured to come in the form similar to an UL demodulation reference signal (DMRS).

The scrambling sequence can be a PN sequence.

In addition, the following phase pre-compensation method may be considered for the purpose of reusing a base station receiver algorithm that has been used to detect a single tone NPRACH preamble (i.e., in terms of a reduction in receiver complexity).

Figure 51:
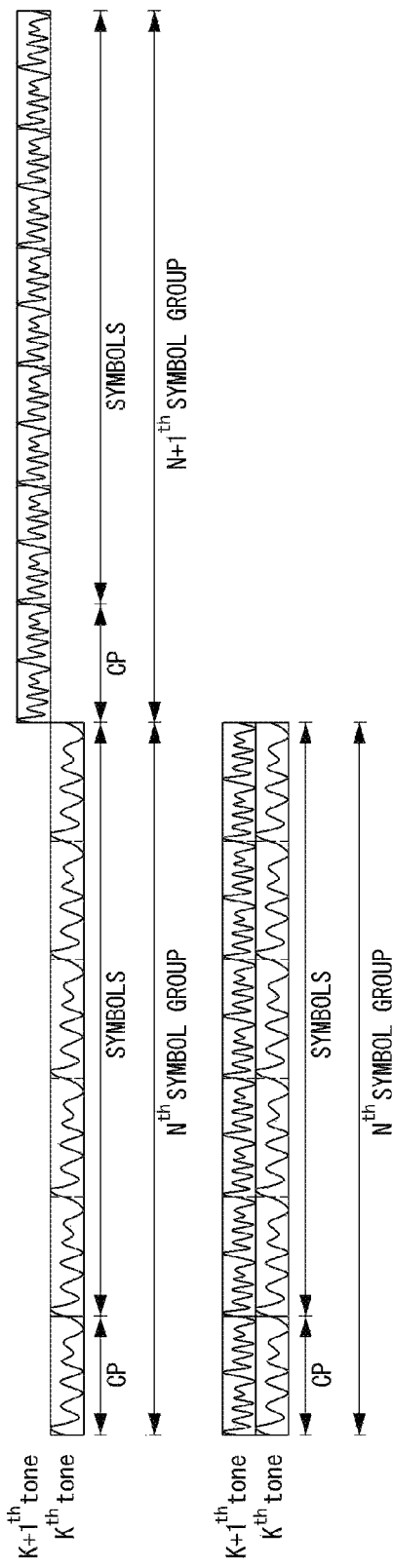
FIG. 51 illustrates an example of a phase pre-compensation method for multi-tone transmission of a NPRACH preamble.

As illustrated in FIG. 51, the phase pre-compensation method is performed so that a phase of a symbol group transmitted to a (K+1)th tone in a Nth symbol group when a NPRACH preamble is transmitted with a multi-tone is the same as a phase that intends to be transmitted to a (K+1)th tone in a (N+1)th symbol group with a single tone.

If the phase pre-compensation method is performed, there is an advantage in that the base station can use an existing single tone NPRACH preamble detection algorithm as it is.

FIG. 51 illustrates an example of a phase pre-compensation method for multi-tone transmission of a NPRACH preamble.

Figure 52:
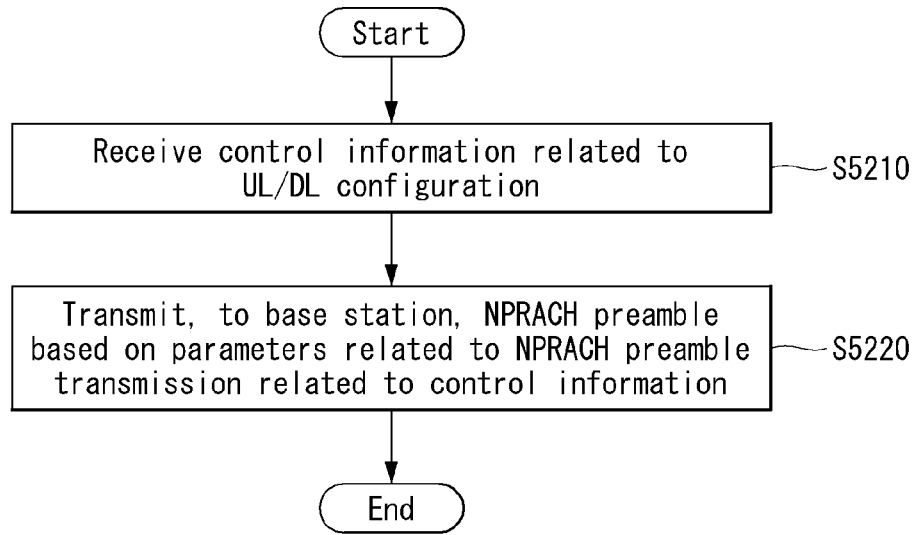
FIG. 52 is a flow chart illustrating an operation of a UE for transmitting a NPRACH preamble proposed by the present specification.

FIG. 52 is a flow chart illustrating an operation of a UE for transmitting a NPRACH preamble proposed by the present specification.

More specifically, FIG. 52 illustrates an operation of a UE transmitting a narrowband physical random access channel (NPRACH) preamble in a narrow band (NB)-Internet of things (IoT) system supporting a frame structure type 2.

The NPRACH preamble used in the present specification includes at least one preamble, and one preamble may mean symbol group(s) included in a specific duration.

Here, the specific duration may represent one repetition unit.

The one preamble may include four or six symbol groups in a NB-IoT TDD system.

First, the UE receives, from a base station, control information related to an uplink-downlink configuration in S5210.

The control information related to the UL/DL configuration includes information about UL/DL configuration(s) supported by the base station.

Particulars about the UL/DL configuration refer to Table 1 and a related description.

Afterwards, the UE transmits, to the base station, the NPRACH preamble based on parameters related to a NPRACH preamble transmission related to the received control information in S5220.

The NPRACH preamble may include one or more symbol groups.

One symbol group may include one cyclic prefix (CP) and at least one symbol.

The parameters related to the NPRACH preamble transmission may include a first parameter representing a number of symbols included in one symbol group and a second parameter representing a length of the CP included in the one symbol group.

The first parameter and the second parameter may be configured to be different from a third parameter and a fourth parameter respectively corresponding to the first parameter and the second parameter.

The third parameter and the fourth parameter represent parameters related to a NPRACH preamble transmission supported in a frame structure type 1.

That is, the third parameter represents a number of symbols included in one symbol group supported in FDD (or frame structure type 1), and the fourth parameter represents a length of a CP included in the one symbol group supported in the FDD.

Further, parameters related to the NPRACH preamble may be differently configured according to uplink-downlink configuration information supported by the base station.

The uplink-downlink configuration information may include at least one UL/DL configuration of UL/DL configurations (indexes 0 to 6) stated in Table 1.

The third parameter and the fourth parameter may have a value less than the first parameter and the second parameter, respectively.

In particular, a value of the third parameter may be a natural number less than 5.

The symbol groups may be transmitted through a first frequency hopping and a second frequency hopping.

A value of the second frequency hopping may be six times a value of the first frequency hopping.

For example, the value of the first frequency hopping may be 1, and the value of the second frequency hopping may be 6.

The parameters related to the NPRACH preamble transmission may further include a fifth parameter representing a number of consecutive symbol groups included in one preamble and a sixth parameter representing a total number of symbol groups included in the one preamble.

Here, the one preamble includes symbol groups included in a specific duration and may include four or six symbol groups.

The specific duration may be represented by a repetition unit, a preamble repetition unit, or the like.

For example, a value of the fifth parameter may be 2, and a value of the sixth parameter may be 4.

The detailed description thereof refers to the Method 3 mentioned above.

Overview of Device to which the Present Invention is Applicable

Figure 53:
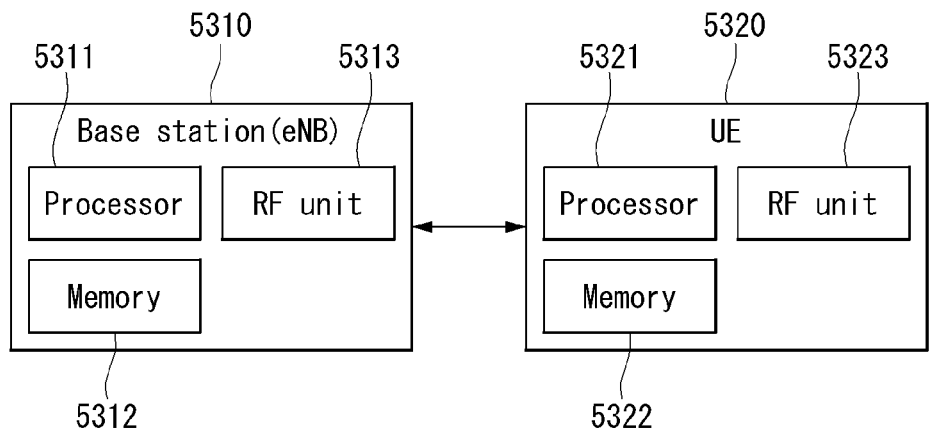
FIG. 53 illustrates a block configuration diagram of a wireless communication device to which methods proposed by the present specification are applicable.

FIG. 53 illustrates a block configuration diagram of a wireless communication device to which methods proposed by the present specification are applicable.

Referring to FIG. 53, a wireless communication system includes a base station 5310 and a plurality of UEs 5320 located in a base station area.

The base station and the UE each may be represented as a radio device.

The base station 5310 includes a processor 5311, a memory 5312, and a radio frequency (RF) module 5313. The processor 5311 implements functions, processes, and/or methods proposed in FIGS. 1 to 52. Layers of a radio interface protocol may be implemented by the processor 5311. The memory 5312 is connected to the processor 5311 and stores various types of information for driving the processor 5311. The RF module 5313 is connected to the processor 5311 and transmits and/or receives a radio signal.

The UE 5320 includes a processor 5321, a memory 5322, and a RF module 5323.

The processor 5321 implements functions, processes, and/or methods proposed in FIGS. 1 to 52. Layers of a radio interface protocol may be implemented by the processor 5321. The memory 5322 is connected to the processor 5321 and stores various types of information for driving the processor 5321. The RF module 5323 is connected to the processor 5321 and transmits and/or receives a radio signal.

The memories 5312 and 5322 may be inside or outside the processors 5311 and 5321 and may be connected to the processors 5311 and 5321 through various well-known means.

Further, the base station 5310 and/or the UE 5320 may have a single antenna or multiple antennas.

Figure 54:
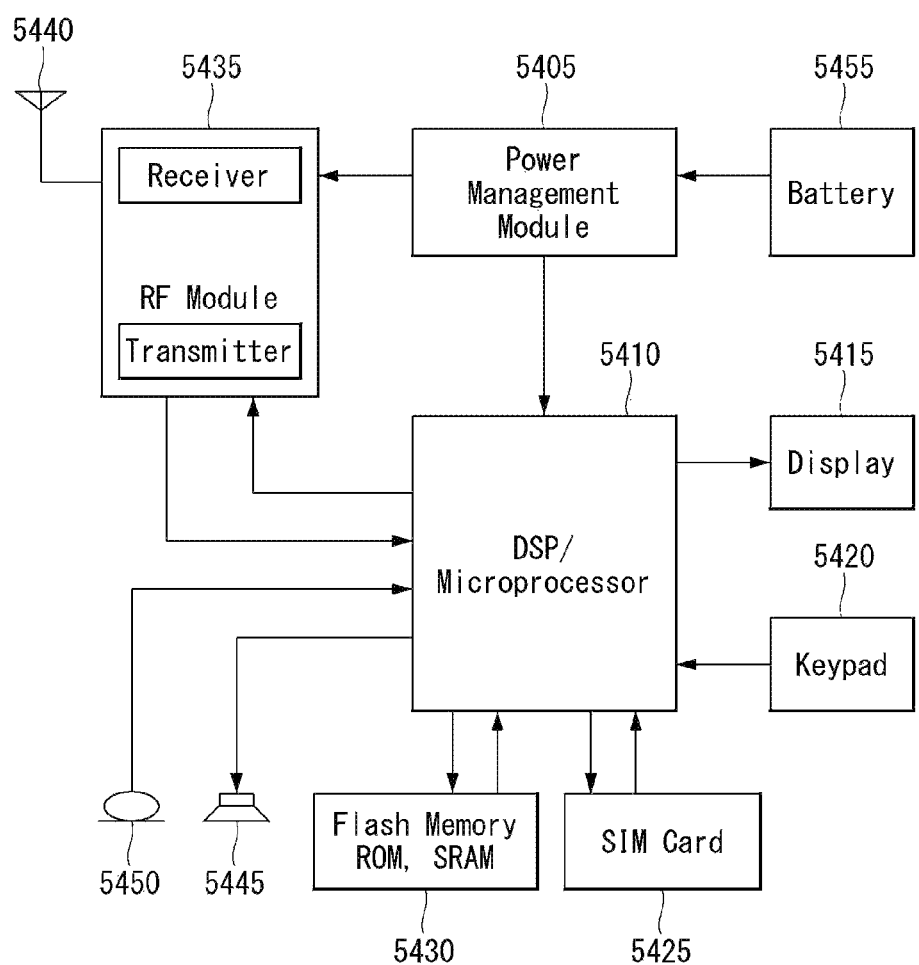
FIG. 54 illustrates a block configuration diagram of a communication device according to an embodiment of the present invention.

FIG. 54 illustrates a block configuration diagram of a communication device according to an embodiment of the present invention.

In particular, FIG. 54 illustrates in more detail the UE illustrated in FIG. 53.

Referring to FIG. 54, the UE may include a processor (or digital signal processor (DSP)) 5410, an RF module (or RF unit) 5435, a power management module 5405, an antenna 5440, a battery 5455, a display 5415, a keypad 5420, a memory 5430, a subscriber identification module (SIM) card 5425 (which is optional), a speaker 5445, and a microphone 5450. The UE may also include a single antenna or multiple antennas.

The processor 5410 implements functions, processes, and/or methods proposed in FIGS. 1 to 52. Layers of a radio interface protocol may be implemented by the processor 5410.

The memory 5430 is connected to the processor 5410 and stores information related to operations of the processor 5410. The memory 5430 may be inside or outside the processor 5410 and may be connected to the processors 5410 through various well-known means.

A user inputs instructional information, such as a telephone number, for example, by pushing (or touching) buttons of the keypad 5420 or by voice activation using the microphone 5450. The processor 5410 receives and processes the instructional information to perform an appropriate function, such as to dial the telephone number. Operational data may be extracted from the SIM card 5425 or the memory 5430. Further, the processor 5410 may display instructional information or operational information on the display 5415 for the user's reference and convenience.

The RF module 5435 is connected to the processor 5410 and transmits and/or receives an RF signal. The processor 5410 delivers instructional information to the RF module 5435 in order to initiate communication, for example, transmit a radio signal configuring voice communication data. The RF module 5435 consists of a receiver and a transmitter to receive and transmit the radio signal. The antenna 5440 functions to transmit and receive the radio signal. Upon reception of the radio signal, the RF module 5435 may transfer a signal to be processed by the processor 5410 and convert the signal into a baseband. The processed signal may be converted into audible or readable information output via the speaker 5445.

Figure 55:
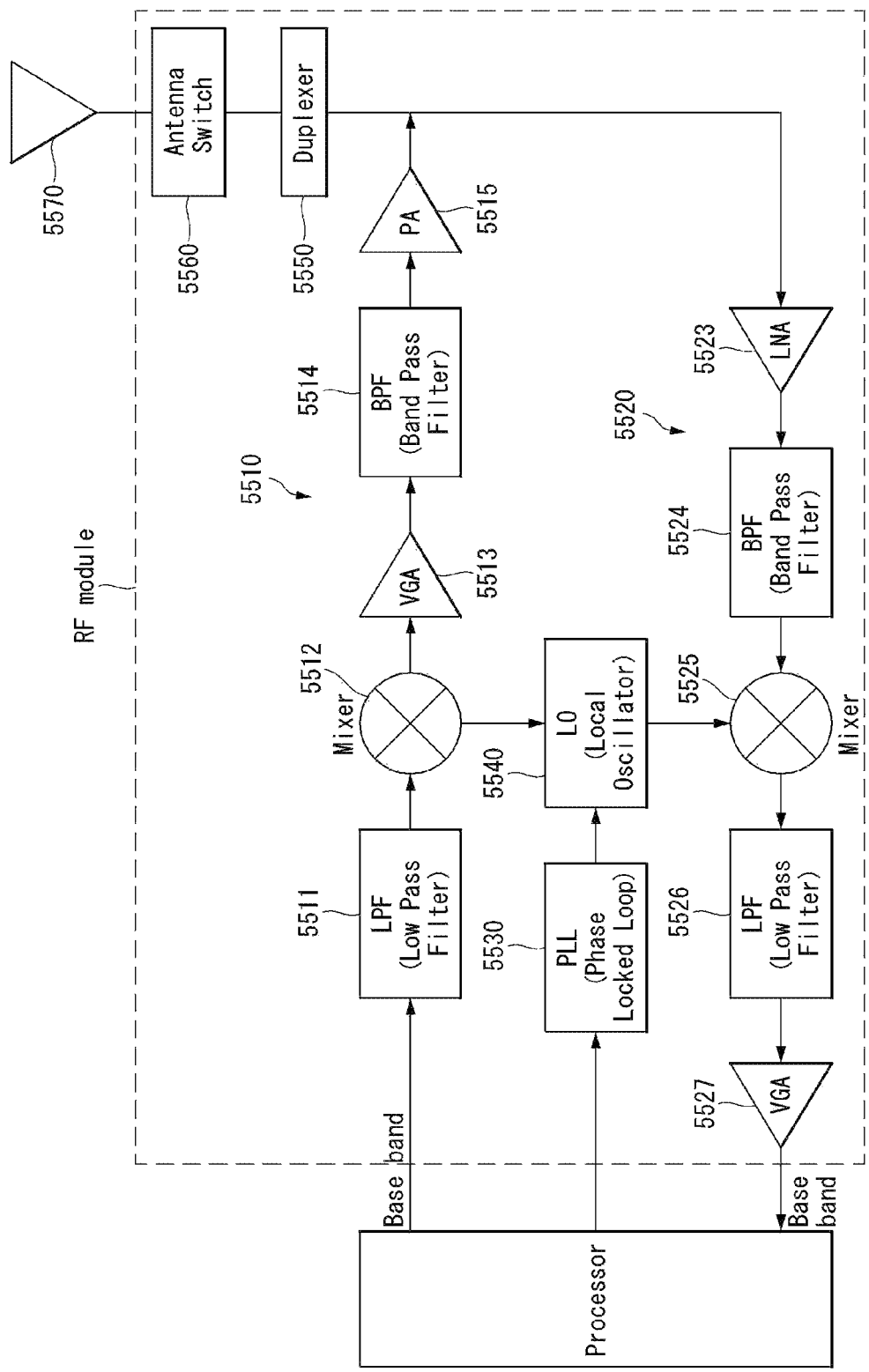
FIG. 55 illustrates an example of a RF module of a wireless communication device to which a method proposed by the present specification is applicable.

FIG. 55 illustrates an example of a RF module of a wireless communication device to which a method proposed by the present specification is applicable.

More specifically, FIG. 55 illustrates an example of an RF module that can be implemented in a frequency division duplex (FDD) system.

First, in a transmission path, the processor illustrated in FIGS. 53 and 54 processes data to be transmitted and provides an analog output signal to a transmitter 5510.

In the transmitter 5510, the analog output signal is filtered by a low pass filter (LPF) 5511 to remove images caused by a digital-to-analog conversion (ADC), is up-converted from a baseband to an RF by an up-converter (mixer) 5512, and is amplified by a variable gain amplifier (VGA) 5513, and the amplified signal is filtered by a filter 5514, is additionally amplified by a power amplifier (PA) 5515, is routed through duplexer(s) 5550/antenna switch(es) 5560, and is transmitted through an antenna 5570.

Further, in a reception path, the antenna 5570 receives signals from the outside and provides the received signals, and the signals are routed through the antenna switch(es) 5560/duplexers 5550 and are provided to a receiver 5520.

In the receiver 5520, the received signals are amplified by a low noise amplifier (LNA) 5523, are filtered by a bans pass filter 5524, and are down-converted from the RF to the baseband by a down-converter (mixer) 5525.

The down-converted signal is filtered by a low pass filter (LPF) 5526 and is amplified by a VGA 5527 to obtain an analog input signal, and the analog input signal is provided to the processor illustrated in FIGS. 53 and 54.

Further, a local oscillator (LO) generator 5540 generates transmitted and received LO signals and provides them to the up-converter 5512 and the down-converter 5525, respectively.

In addition, a phase locked loop (PLL) 5530 receives control information from the processor to generate the transmitted and received LO signals at appropriate frequencies and provides control signals to the LO generator 5540.

The circuits illustrated in FIG. 55 may be arranged differently from the configuration illustrated in FIG. 55.

Figure 56:
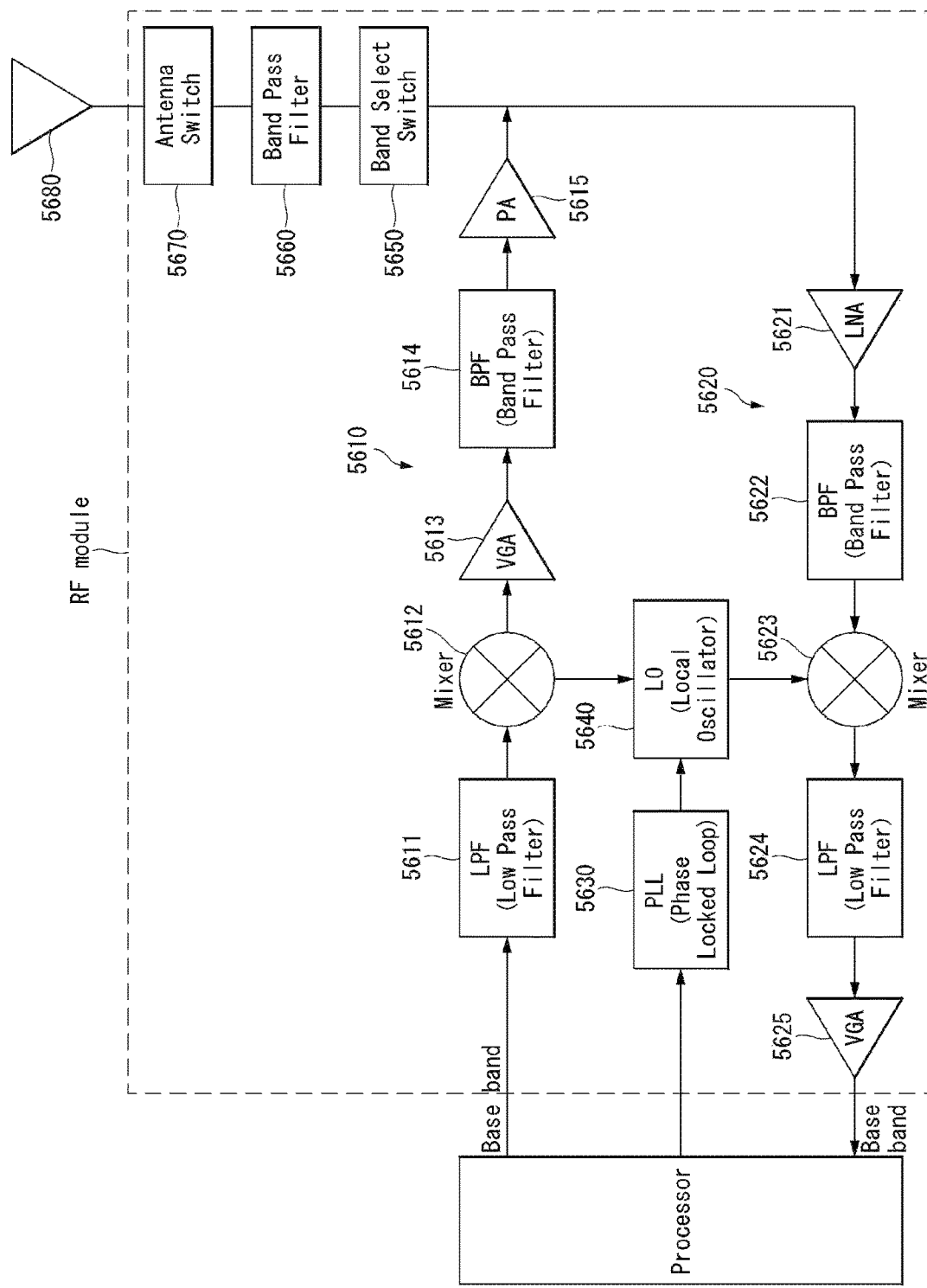
FIG. 56 illustrates another example of a RF module of a wireless communication device to which a method proposed by the present specification is applicable.

FIG. 56 illustrates another example of a RF module of a wireless communication device to which a method proposed by the present specification is applicable.

More specifically, FIG. 56 illustrates an example of an RF module that can be implemented in a time division duplex (TDD) system.

A transmitter 5610 and a receiver 5620 of the RF module in the TDD system have the same structure as the transmitter and the receiver of the RF module in the FDD system.

Hereinafter, only the structure of the RF module of the TDD system that differs from the RF module of the FDD system will be described, and the same structure will refers to the description of FIG. 55.

A signal amplified by a power amplifier (PA) 5615 of the transmitter 5610 is routed through a band select switch 5650, a band pass filter (BPF) 5660, and antenna switch(es) 5670 and is transmitted via an antenna 5680.

Further, in a reception path, the antenna 5680 receives signals from the outside and provides the received signals, and the signals are routed through the antenna switch(es) 5670, the band pass filter 5660, and the band select switch 5650 and are provided to the receiver 5620.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

Although the present invention has been described focusing on examples applying to the 3GPP LTE/LTE-A system, it can be applied to various wireless communication systems other than the 3GPP LTE/LTE-A system.

The invention claimed is:

1. A method for transmitting, by a user equipment, a narrowband physical random access channel (NPRACH)

preamble in a narrow band (NB)-Internet of things (IoT) system supporting time division duplexing (TDD), the method comprising:
- receiving, from a base station, first information for a NPRACH configuration; and
- transmitting, to the base station, the NPRACH preamble based on the received first information,
- wherein the NPRACH preamble is repeatedly transmitted as a plurality of preamble repetition units, with each preamble repetition unit consisting of a plurality of symbol groups, and with each symbol group consisting of one cyclic prefix (CP) and at least one symbol,
- wherein not all symbols groups comprising the each preamble repetition unit are contiguous in time,
- wherein a subcarrier spacing for the NPRACH preamble is configured as 3.75 kHz,
- wherein (i) a number of symbols included in each symbol group and (ii) a length of the CP included in each symbol group depend on an uplink-downlink configuration that is related to controlling in which subframes uplink or downlink transmissions take place in a frame, and
- wherein the number of symbols in each symbol group is less than 5, and the length of the CP in each symbol group is shorter than a length of one symbol of each symbol group.

2. The method of claim 1,
wherein the plurality of symbol groups are transmitted using a frequency-hopping.

3. The method of claim 2,
wherein each preamble repetition unit consists of four symbol groups.

4. The method of claim 3,
wherein a first two symbol groups of each preamble repetition unit are contiguous in time, and wherein a second two symbol groups of the each preamble repetition unit are contiguous in time.

5. The method of claim 4,
wherein the first two symbol groups and the second two symbol groups are discontinuous in time.

6. The method of claim 1, further comprising:
receiving, from the base station, second information for the uplink-downlink configuration.

7. The method of claim 6,
wherein a plurality of preamble formats in which the length of CP and the number of symbols comprising the each symbol group are configured differently are predefined, and
wherein a specific preamble format applied to the NPRACH preamble is determined based on the uplink-downlink configuration.

8. The method of claim 6,
wherein a number of symbol groups comprising each preamble repetition unit is configured based on the second information.

9. The method of claim 1,
wherein the length of the CP is shorter than a length of a CP of a NPRACH preamble for frequency division duplexing, FDD.

10. A user equipment (UE) configured to transmit narrowband physical random access channel (NPRACH) preamble in a narrow band (NB)-Internet of things (IoT) system supporting a frame structure type 2, the UE comprising:
- a radio frequency (RF) module configured to transmit and receive a radio signal; and
- a processor configured to control the RF module,
- wherein the processor is configured to:
- receive, from a base station, first information for a NPRACH configuration; and
- transmit, to the base station, the NPRACH preamble based on the received first information,
- wherein the NPRACH preamble is repeatedly transmitted as a plurality of preamble repetition units, with each preamble repetition unit consisting of a plurality of symbol groups, and with each symbol group consisting of one cyclic prefix (CP) and at least one symbol,
- wherein not all symbols groups comprising the each preamble repetition unit are contiguous in time,
- wherein a subcarrier spacing for the NPRACH preamble is configured as 3.75 kHz,
- wherein (i) a number of symbols included in each symbol group and (ii) a length of the CP included in each symbol group depend on an uplink-downlink configuration that is related to controlling in which subframes uplink or downlink transmissions take place in a frame, and
- wherein the number of symbols in each symbol group is less than 5, and the length of the CP in each symbol group is shorter than a length of one symbol of each symbol group.

11. The UE of claim 10, wherein the operations further comprising:
receiving, from the base station, second information for the uplink-downlink configuration.

12. The UE of claim 11,
wherein a plurality of preamble formats in which the length of CP and the number of symbols comprising the each symbol group are configured differently are predefined, and
wherein a specific preamble format applied to the NPRACH preamble is determined based on the uplink-downlink configuration.

13. The UE of claim 11,
wherein a number of symbol groups comprising each preamble repetition unit is configured based on the second information.

14. The UE of claim 10,
wherein each preamble repetition unit consists of four symbol groups.

15. The UE of claim 14,
wherein a first two symbol groups of each preamble repetition unit are contiguous in time, and wherein a second two symbol groups of the each preamble repetition unit are contiguous in time.

16. The UE of claim 15,
wherein the first two symbol groups and the second two symbol groups are discontinuous in time.

* * * * *